United States Patent
Asano et al.

(10) Patent No.: US 9,188,721 B2
(45) Date of Patent: *Nov. 17, 2015

(54) OPTICAL MODULE AND DISPLAY DEVICE

(75) Inventors: Eiji Asano, Mihara (JP); Akiko Tomita, Mihara (JP); Daijiro Kodama, Mihara (JP); Masahiro Goto, Kashiwa (JP); Hiroshi Sekiguchi, Tokyo-To (JP); Hiroshi Yamamoto, Kawaguchi (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 272 days.

This patent is subject to a terminal disclaimer.

(21) Appl. No.: 13/643,000

(22) PCT Filed: Nov. 2, 2011

(86) PCT No.: PCT/JP2011/075319
§ 371 (c)(1),
(2), (4) Date: Oct. 23, 2012

(87) PCT Pub. No.: WO2012/060419
PCT Pub. Date: May 10, 2012

(65) Prior Publication Data
US 2013/0039031 A1    Feb. 14, 2013

(30) Foreign Application Priority Data

Nov. 2, 2010 (JP) .................. 2010-246649
Nov. 2, 2010 (JP) .................. 2010-246672
Nov. 10, 2010 (JP) .................. 2010-251735
Nov. 12, 2010 (JP) .................. 2010-253726
Mar. 24, 2011 (JP) .................. 2011-066067

(51) Int. Cl.
*G02F 1/1335* (2006.01)
*G02B 5/30* (2006.01)
*G02B 5/02* (2006.01)

(52) U.S. Cl.
CPC ............ *G02B 5/3025* (2013.01); *G02B 5/0242* (2013.01); *G02F 2001/133607* (2013.01)

(58) Field of Classification Search
CPC .... G02B 5/3025; G02B 1/105; G02B 5/0242; G02B 5/0221; G02F 1/1335; G02F 1/133504
USPC ......... 362/19, 97.1, 611, 613; 349/64, 65, 62, 349/96
See application file for complete search history.

(56) References Cited

U.S. PATENT DOCUMENTS 7,133,091 B2    11/2006    Ohsumi
7,268,844 B2 *  9/2007    Yu .................................. 349/113

(Continued)

FOREIGN PATENT DOCUMENTS

JP    09-258013 A1    10/1997
JP    2005-017355 A1    1/2005

(Continued)

OTHER PUBLICATIONS

Chinese Office Action (With English Translation), Chinese Application No. 201180005230.1, dated Jan. 2, 2014 (7 pages).

(Continued)

*Primary Examiner* — Karabi Guharay
(74) *Attorney, Agent, or Firm* — Burr & Brown, PLLC

(57) ABSTRACT

An optical module includes a polarizing plate and a light emitter disposed in a position facing the polarizing plate. The polarizing plate includes a polarizer and a protective film joined to the polarizer. The protective film has a light control function that changes the traveling direction of light. The light emitter is disposed in a position directly facing the protective film of the polarizing plate.

12 Claims, 36 Drawing Sheets

(56) References Cited

U.S. PATENT DOCUMENTS

| | | | |
|---|---|---|---|
| 8,619,212 B2* | 12/2013 | Asano et al. ............ 349/62 |
| 2003/0156233 A1 | 8/2003 | Ohsumi | |
| 2005/0206806 A1* | 9/2005 | Yu ............................ 349/64 |
| 2009/0202819 A1 | 8/2009 | Asahi et al. | |
| 2009/0296021 A1* | 12/2009 | Lee et al. ............... 349/64 |
| 2013/0143028 A1 | 6/2013 | Asahi et al. | |

FOREIGN PATENT DOCUMENTS

| | | |
|---|---|---|
| JP | 2006-133385 A1 | 5/2006 |
| JP | 2007-133236 A1 | 5/2007 |
| JP | 2008-076478 A1 | 4/2008 |
| JP | 2008-262133 A1 | 10/2008 |
| JP | 2009-086244 A1 | 4/2009 |
| JP | 2009-217258 A1 | 9/2009 |
| JP | 2009-301014 A1 | 12/2009 |
| JP | 2010-008475 A1 | 1/2010 |
| JP | 2010-008509 A1 | 1/2010 |
| JP | 2010-072630 A1 | 4/2010 |
| JP | 2010-086770 A1 | 4/2010 |
| JP | 2010-164931 A1 | 7/2010 |
| JP | 2010-204502 A1 | 9/2010 |

OTHER PUBLICATIONS

Chinese Office Action (Application No. 201180005230.1) dated Jul. 11, 2014 (with English translation).

International Search Report dated Jan. 17, 2012 (with English translation).

* cited by examiner

OPTICAL MODULE AND DISPLAY DEVICE

TECHNICAL FIELD

The present invention relates to an optical module including a polarizing plate including a polarizer, and a light emitter disposed in a position facing the polarizing plate.

BACKGROUND ART

An optical module, having a polarizing plate including a polarizer, and a light emitter(s) disposed in a position facing the polarizing plate, is incorporated and used in an optical device these days. Such an optical module is typically used in a display device, in particular a liquid crystal display device. The liquid crystal display device includes a liquid crystal display panel, and a surface light source device which functions as a backlight.

As shown in FIG. 40, the surface light source device includes a light source including light emitters, and a number of optical sheets for changing the traveling direction of light from the light emitters, and is designed to be capable of illuminating the liquid crystal display panel with desired optical characteristics. In the exemplary surface light source device shown in FIG. 40, a diffusion plate A, a lower diffusion sheet B, a light condensing sheet C and an upper diffusion sheet D are arranged in this order, starting from the member nearest to the light emitters 26 of the light source 25. The light condensing sheet C has a function (light condensing function) that narrows down the traveling direction of light to the front direction, thereby increasing the front direction luminance. On the other hand, the diffusion plate A, the lower diffusion sheet B and the upper diffusion sheet D have a light diffusing function that diffuses light from the light emitters 26 of the light source 25, thereby obscuring the images of the light emitters 26.

On the other hand, the liquid crystal display panel includes a liquid crystal cell 11 capable of controlling the orientation of a liquid crystal for each pixel, a lower polarizing plate 13 disposed on the light entrance side of the liquid crystal cell 11, and an upper polarizing plate 12 disposed on the light exit side of the liquid crystal cell 11, as shown in FIG. 40. The pair of polarizing plates 12, 13 includes a polarizer which transmits light of a particular polarization component and absorbs light of a component(s) other than the particular polarization component, and a protective film, bonded to the polarizer, for protecting the polarizer.

In general, the protective film is comprised of a mere light transmissive film due to cost constraints and does not positively exert an optical effect on transmitted light. There is a known protective film to which an optical function is imparted, but only to such an extent that the surface of the protective film, on the side not facing a polarizer, is matted, because of the constraints of the adhesion to the polarizer and the polarizer-protecting function (see e.g. JP 9-258013A).

However, a sufficient light diffusing function cannot be imparted to a protective film merely by matting the one surface of the protective film. Therefore, as shown in FIG. 40, it has been necessary for the conventional display device to have a number of optical sheets on the light entrance side of the polarizing plate.

The inclusion of a number of optical sheets in a surface light source device (display device) may cause various problems. Firstly, an increase in the number of optical sheets directly increases the production cost of the display device. Further, assembly of a surface light source device (display device) using a large number of optical sheets necessitates troublesome positioning between the optical sheets and between the optical sheets and light emitters, which may also increase the production cost of the display device.

Each optical sheet does not transmit all the incident light: part of the incident light is reflected by the optical sheet. Light reflected by an optical sheet may be reflected e.g. by a reflective plate 21 (see FIG. 40) provided behind the light emitters 26, or by another optical sheet and can thus be reused. However, every time light is reflected by an optical sheet, part of the light is absorbed by the optical sheet. Such a loss of light by reflection considerably increases even when the number of optical sheets merely increases by one. Thus, the use of a number of optical sheets in a surface light source device (display device) will significantly lower the efficiency of the use of light emitted by the light emitters of a light source.

An optical sheet can be heated by heat from light emitters, which may cause deformation of the optical sheet, such as bending, deflection or warpage. In such a case, adjacent optical sheets can make contact with or rub against each other in a surface light source device (display device) having a number of optical sheets. A contact area between optical sheets cannot exert the intended optical effect. Furthermore, there is a fear of the contact area being visible. In addition, rubbing between optical sheets can cause scratching in the sheet(s) or produce debris, leading to poor display image quality.

SUMMARY OF THE INVENTION

The present invention has been made in view of the above situation. It is therefore an object of the present invention to deal with problems caused by an optical sheet(s) provided between a polarizing plate and a light emitter(s).

A first optical module according to the present invention comprises: a polarizing plate including a polarizer and a protective film joined to the polarizer, the protective film having a light control function that changes a traveling direction of light; and a light emitter disposed in a position directly facing the protective film of the polarizing plate.

A second optical module according to the present invention comprises: a polarizing plate including a polarizer and a protective film joined to the polarizer, the protective film having a light control function that changes a traveling direction of light; and a light guide plate which receives light from a light emitter and which is disposed in a position directly facing the protective film of the polarizing plate.

A third optical module according to the present invention comprises: a polarizing plate including a polarizer and a protective film joined to the polarizer, the protective film having a light control function that changes a traveling direction of light; and a light emitter disposed in a position deviated, in a direction parallel to a film plane of the protective film, from an area directly facing the protective film of the polarizing plate, wherein the light emitter and the polarizing plate are positioned such that light emitted by the light emitter can directly enter the protective film of the polarizing plate, or light emitted by the light emitter, after undergoing a change in the traveling direction by a reflective plate, can enter the protective film of the polarizing plate, or light emitted by the light emitter can directly enter the protective film of the polarizing plate and light emitted by the light emitter, after undergoing a change in the traveling direction by a reflective plate, can enter the protective film of the polarizing plate.

In the first to third optical modules according to the present invention, the protective film may include a matrix of a resin material and a diffusing component dispersed in the matrix. In the first to third optical modules according to the present invention, the refractive index of the diffusing component may be lower than the refractive index of the matrix. In the first to third optical modules according to the present invention, the protective film may have a light diffusing layer including a matrix of a resin material and a diffusing component dispersed in the matrix, and a resin layer containing no diffusing component. In the first to third optical modules according to the present invention, the light diffusing layer may be disposed nearer to the polarizer than the resin layer is. Further, in the first to third optical modules according to the present invention, the protective film may have unit optical elements which form a surface of the protective film opposite to a side facing the polarizer; and the unit optical elements may be contained in the resin layer.

In the first to third optical modules according to the present invention, no optical interface may exist between the matrix of the light diffusing layer and the resin layer.

In the first to third optical modules according to the present invention, the protective film may have unit optical elements which form a surface of the protective film opposite to a side facing the polarizer, i.e. a surface of the protective film, facing the light emitter or the light guide plate. In the first to third optical modules according to the present invention, the unit optical elements may be arranged in an arrangement direction; and each unit optical element may extend in a direction, the direction intersecting the arrangement direction of the unit optical elements and being parallel to the film plane of the protective film.

In the first optical module according to the present invention, the protective film may have unit optical elements which form a surface of the protective film facing light emitters and are arranged in an arrangement direction; each unit optical element may extend in a direction, the direction intersecting the arrangement direction of the unit optical elements and being parallel to the film plane of the protective film; and, when viewed in a direction parallel to a normal direction of a plate plane of the polarizing plate, the unit optical elements may be arranged in a direction parallel to an arrangement direction of the light emitters.

In the first to third optical modules according to the present invention, the protective film may have irregularities, formed due to the presence of the diffusing component, in a surface of the protective film opposite to a side facing the polarizer, i.e. in a surface of the protective film, facing the light emitter or the light guide plate.

In the first to third optical modules according to the present invention, the protective film may have irregularities, formed by shaping, in a surface of the protective film opposite to a side facing the polarizer, i.e. in a surface of the protective film, facing the light emitter or the light guide plate.

In the first to third optical modules according to the present invention, the protective film may be an extrudate produced by extrusion molding.

In the first to third optical modules according to the present invention, the protective film may be produced by shaping of a UV curable resin on a film substrate.

In the first to third optical modules according to the present invention, the protective film may have a haze value of not less than 60% and not more than 90%.

In the first to third optical modules according to the present invention, the protective film may have a moisture permeability of not less than 10 $g/m^2 \cdot 24$ hr, as measured at a temperature of 40° C. and a humidity of 90% RH for 24 hours.

In the first to third optical modules according to the present invention, the polarizing plate may further include an intermediate film disposed between the protective film and the polarizer.

In the first to third optical modules according to the present invention, the polarizing plate may further include an adhesive layer disposed between the protective film and the polarizer. In the first to third optical modules according to the present invention, the adhesive layer may include an adhesive and a diffusing component dispersed in the adhesive.

In the first to third optical modules according to the present invention, the light source may include a single linear light emitting part composed of a single linearly-extending light emitter, or a single linear light emitting part composed of point-like light emitters arranged linearly.

In the first optical module according to the present invention, two-dimensionally arranged light emitters may be provided in positions directly facing the protective film of the polarizing plate. In a preferred embodiment of the first optical module according to the present invention, the protective film has unit optical elements which form a surface of the protective film facing the light emitters; the unit optical elements are two-dimensionally arranged and constitute a fly's eye lens; the light emitters are arranged in a first arrangement direction and are also arranged in a second arrangement direction intersecting the first arrangement direction; and when viewed in a direction parallel to a normal direction of a plate plane of the polarizing plate, the unit optical elements are arranged in a direction parallel to the first arrangement direction of the light emitters and are also arranged in a direction parallel to the second arrangement direction of the light emitters.

A display device according to the present invention comprises any one of the above-described first to third optical modules according to the present invention.

The display device according to the present invention may further comprise a liquid crystal cell laminated to the polarizing plate of the optical module.

The display device according to the present invention may further comprise a liquid crystal cell laminated to the polarizing plate of the optical module and having a pixel array; the protective film may have a plurality of unit optical elements which form a surface of the protective film opposite to a side facing the polarizer, i.e. a surface of the protective film, facing the light emitter or the light guide plate; and when viewed in a direction parallel to a normal direction of a plate plane of the polarizing plate, the unit optical elements of the protective film may be arranged in a direction intersecting the pixel array of the liquid crystal cell.

A polarizing plate according to the present invention comprises: a polarizer; and a protective film joined to the polarizer, the protective film having a light control function that changes the traveling direction of light.

In the polarizing plate according to the present invention, the protective film may include a matrix of a resin material and a diffusing component dispersed in the matrix. In the polarizing plate according to the present invention, the refractive index of the diffusing component may be lower than the refractive index of the matrix resin. In the polarizing plate according to the present invention, the protective film may have a light diffusing layer comprising a matrix of a resin material and a diffusing component dispersed in the matrix, and a resin layer containing no diffusing component. In the polarizing plate according to the present invention, the light diffusing layer may be disposed nearer to the polarizer than the resin layer is. Further, in the polarizing plate according to the present invention, the protective film may have unit optical elements that form a surface of the protective film opposite to a side facing the polarizer; and the unit optical elements may be contained in the resin layer.

In the polarizing plate according to the present invention, no optical interface may exist between the matrix of the light diffusing layer and the resin layer.

In the polarizing plate according to the present invention, the protective film may have unit optical elements that form a surface of the protective film opposite to a side facing the polarizer. In the polarizing plate according to the present invention, the unit optical elements may be arranged in an arrangement direction, and each unit optical element may extend in a direction, the direction intersecting the arrangement direction of the unit optical elements and being parallel to the film plane of the protective film.

In the polarizing plate according to the present invention, the protective film may have irregularities, formed due to the presence of the diffusing component, in a surface of the protective film opposite to a side facing the polarizer.

In the polarizing plate according to the present invention, the protective film may have irregularities, formed by shaping, in a surface of the protective film opposite to a side facing the polarizer.

In the polarizing plate according to the present invention, the protective film may be an extrudate produced by extrusion molding.

The polarizing plate according to the present invention may further include an intermediate film disposed between the protective film and the polarizer.

The polarizing plate according to the present invention may further include an adhesive layer disposed between the protective film and the polarizer. In the polarizing plate according to the present invention, the adhesive layer may include an adhesive and a diffusing component dispersed in the adhesive.

A protective film according to the present invention is a protective film for a lower polarizing plate, which is to be joined to a polarizer to form a lower polarizing plate and which has a light control function that changes the traveling direction of light.

According to the present invention, a light control function that changes the traveling direction of light is imparted to a protective film joined to a polarizer. This enables a light emitter(s) to be disposed in a position directly facing the protective film of a polarizing plate. Thus, no optical sheet can be disposed between the polarizing plate and the light emitter(s). Problems which would occur due to the presence of an optical sheet(s) can therefore be avoided.

BRIEF DESCRIPTION OF THE DRAWINGS

FIG. 46 is a diagram showing the results of a simulation of the angular distribution of luminance, conducted on a model 1 using a light diffusing film a;

FIG. 48 is a diagram showing the results of a simulation of the angular distribution of luminance, conducted on a model 2 using a light diffusing film a;

FIG. 50 is a diagram showing the results of a simulation of the angular distribution of luminance, conducted on a model 3 using a light diffusing film a;

FIG. 52 is a diagram showing the results of a simulation of the angular distribution of luminance, conducted on a model 4 using a light diffusing film a;

FIG. 54 is a diagram illustrating the light diffusing properties of the light diffusing film a, being a graph showing the angular distribution of luminance as measured on the light exit surface of the light diffusing film a when parallel light rays, traveling in the front direction, enter the light diffusing film a.

DETAILED DESCRIPTION OF THE INVENTION

Figure 1:
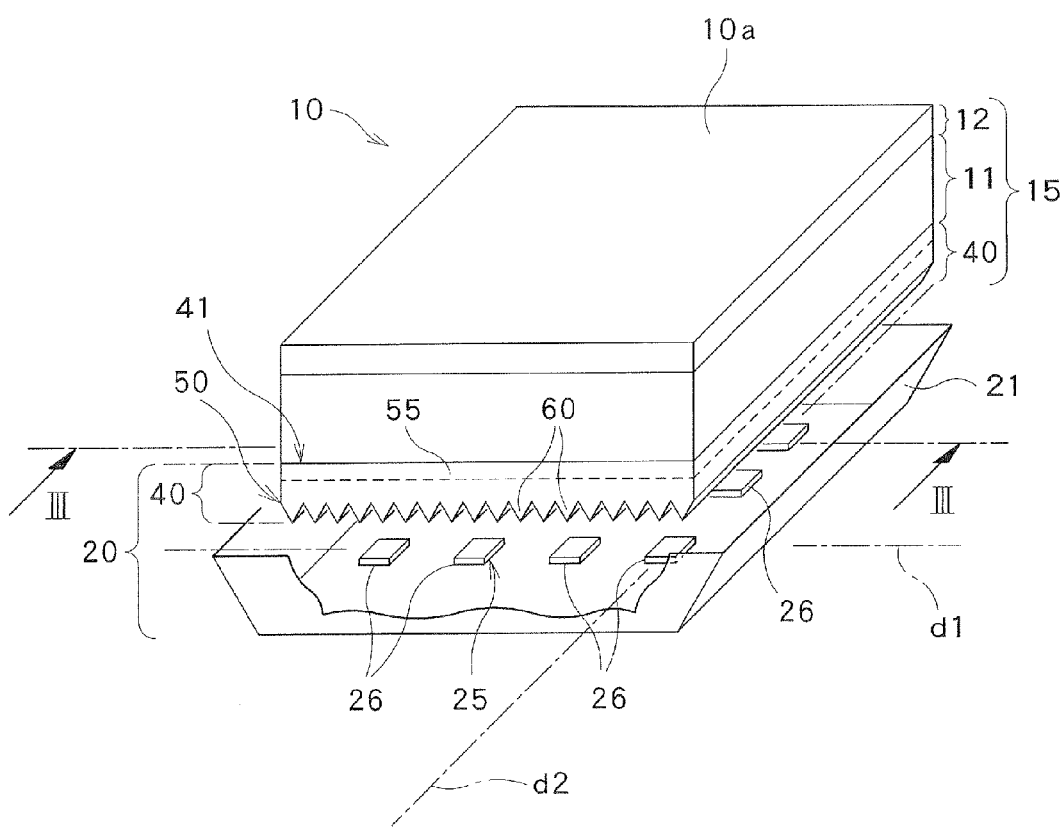
FIG. 1 is a perspective view showing the schematic construction of a display device and an optical module, illustrating an embodiment of the present invention.

Preferred embodiments of the present invention will now be described with reference to the drawings. In the drawings attached to the present specification, for the sake of illustration and easier understanding, scales, horizontal to vertical dimensional ratios, etc. are exaggeratingly modified from those of the real things.

Figure 2:
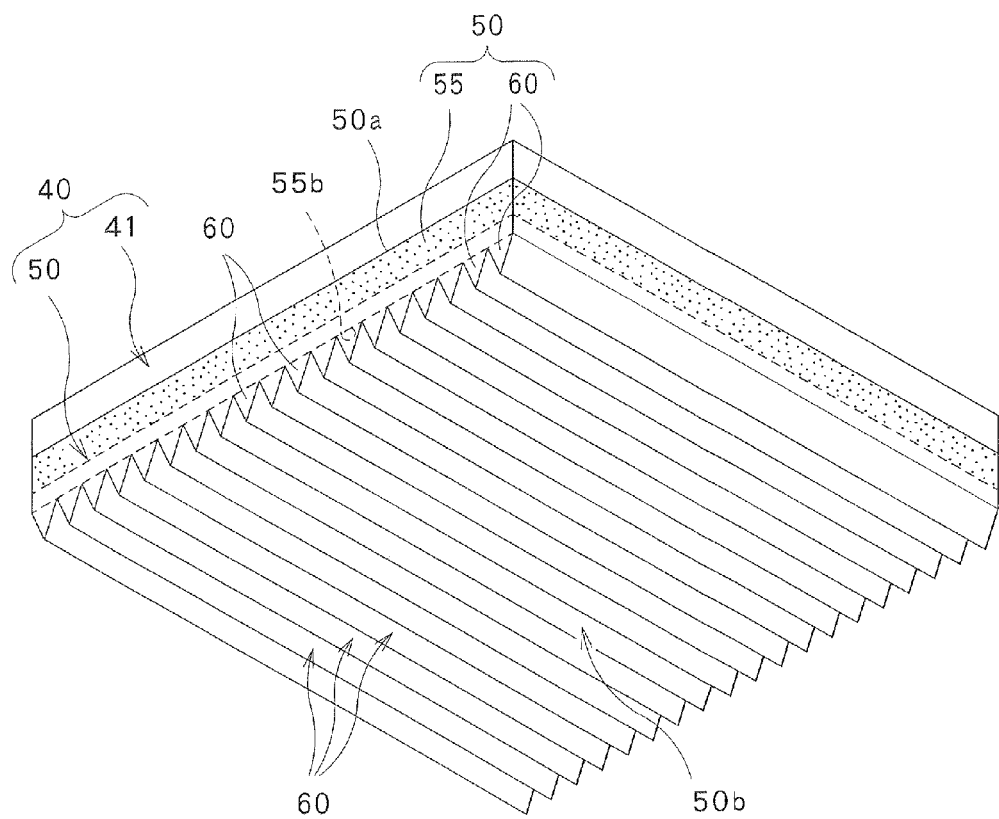
FIG. 2 is a perspective view showing a polarizing plate (lower polarizing plate) incorporated in the optical module of FIG. 1.
Figure 3:
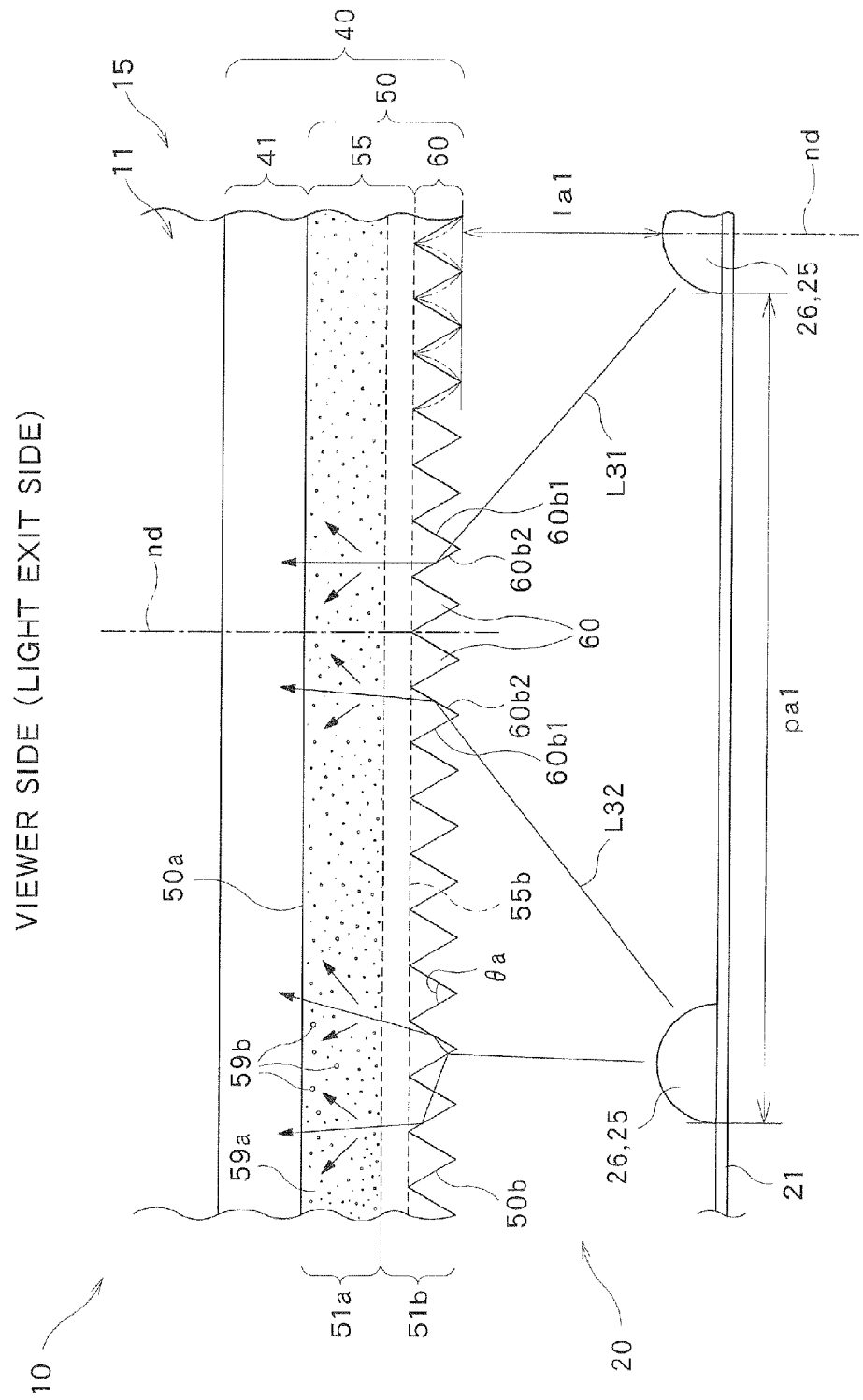
FIG. 3 is a cross-sectional view taken along the line of FIG. 1, illustrating a function of the display device and the optical module.

FIGS. 1 through 4 are diagrams illustrating an embodiment of the present invention. Of these, FIG. 1 is a perspective view showing the schematic construction of a display device and an optical module. FIG. 2 is a perspective view showing a polarizing plate of the optical module, and FIG. 3 is a diagram illustrating the function of the optical module.

The display device 10 shown in FIG. 1 is a liquid crystal display device and includes a liquid crystal display panel 15, a light source 25 disposed on the back side (opposite to the viewer side) of the liquid crystal display panel 15, and a reflective plate 21 that covers the light source 25 from the back. The light source 25 includes a plurality of light emitters 26, and illuminates the liquid crystal display panel 15 from the back. On the other hand, the liquid crystal display panel 15 functions as a shutter that controls transmission and blocking of light, emitted by the light emitters 26 of the light source 25, for each pixel to form an image.

The liquid crystal display panel 15 includes a pair of polarizing plates 12, 40 and a liquid crystal cell 11 interposed between the polarizing plates 12, 40, as will be described in more detail later. The light entrance-side polarizing plate 40 of the pair of the polarizing plates of the liquid crystal display panel 15, and the light emitters 26 of the light source 25 constitute an optical module 20. In order to distinguish one of the pair of the polarizing plates contained in the liquid crystal display panel 15 from the other, the light entrance-side polarizing plate 40 will be hereinafter referred to as "lower polarizing plate" and the light exit-side polarizing plate 12 as "upper polarizing plate" regardless of the position of the display device 10.

The display device 10 is configured as a direct-light type liquid crystal display device: the light emitters 26 of the light source 25 are disposed in positions directly facing the liquid crystal display panel 15 along the front direction nd. Thus, the light emitters 26 of the light source 25 are disposed in positions directly facing the lower polarizing plate 40, which is located on the innermost light entrance side of the liquid crystal display panel 15, in the front direction nd. That is to say, no member exists between the light emitters 26 of the light source 25 and the lower polarizing plate 40 located on the innermost light entrance side of the liquid crystal display panel 15. Light emitted by the light emitters 26 can therefore directly enter the lower polarizing plate 40.

Various known light emitters, e.g. cold cathode fluorescent lamps, can be used as the light emitters 26 of the light source 25. In the illustrated embodiment, the light source 25 is comprised of light emitting diodes (LEDs) 26. As will be understood from FIG. 1, the light emitters 26 are arranged two-dimensionally on a virtual plane. Thus, the light emitters 26 are arranged on a virtual plane not only in one direction but in a two-dimensional area. In particular, in the embodiment illustrated in FIG. 1, the light emitters 26 of the light source 25 are arranged in a first arrangement direction d1 and are also arranged in a second arrangement direction d2 perpendicular to the first arrangement direction.

The reflective plate 21 is a member for directing light, emitted by the light emitters 26 of the light source 25, toward the liquid crystal display panel 15. The reflective plate 21, at least its inside surface, is made of a material having a high reflectance, such as a metal.

The term "light exit side" herein refers to downstream side (viewer side, upper side in FIG. 1) in the traveling direction of light that travels from the light emitters 26 of the light source 25 toward a viewer, passing through the liquid crystal display panel 15, without turning back. The term "light entrance side" herein refers to upstream side in the traveling direction of light that travels from the light emitters 26 of the light source 25 toward a viewer, passing through the liquid crystal display panel 15, without turning back.

The terms "sheet", "film" and "plate" are not used herein to strictly distinguish them from one another. Thus, the term "sheet" includes a member which can also be called a film or plate. For instance, a "protective film" includes a member which can also be called a "protective sheet".

The term "sheet plane (film plane, plate plane)" herein refers to a plane which coincides with the planar direction of an objective sheet-like member when taking a perspective and overall view of the sheet-like member. In this embodiment the panel plane of the liquid crystal display panel 15, the plate plane of the lower polarizing plate 40, the film plane of the bellow-described protective film 50, etc. are parallel to each other. The term "front direction" herein refers to a direction parallel to the normal direction nd of the display surface 10a of the display device 10 and, in this embodiment, parallel to the normal direction of the plate plane of the lower polarizing plate 40.

Terms used herein to specify a shape or a geometric condition, such as "parallel", "perpendicular", "symmetrical", etc., should not be bound to their strict sense, and should be construed to include equivalents or resemblances from which the same optical function or effect can be expected.

The liquid crystal display panel 15 will now be described. As described above, the liquid crystal display panel 15 includes the pair of polarizing plates 12, 40 and the liquid crystal cell 11 interposed between the polarizing plates 12, 40. The polarizing plates 12, 40 have a function (absorption-type polarization separation function) that resolves incident light into two orthogonal polarization components, and transmits one polarization component and absorbs the other polarization component.

The liquid crystal cell 11 includes a pair of transparent substrates and a liquid crystal layer provided between the transparent substrates. An electric field can be applied to each pixel area of the liquid crystal layer. The orientation of a pixel area of the liquid crystal layer changes upon the application of an electric field. For example, a polarization component in a particular direction (parallel to the transmission axis), which has passed through the lower polarizing plate 40 disposed on the light entrance side, turns by 90 degrees when it passes through those pixel areas of the liquid crystal layer of the liquid crystal cell 11 to which an electric field is being applied, whereas the polarization component maintains its polarization direction when it passes through those pixel areas of the liquid crystal layer to which no electric field is being applied. Thus, transmission through or absorption and blocking by the upper polarizing plate 12, disposed on the light exit side of the lower polarizing plate 40, of the polarization component which has passed through the lower polarizing plate 40, can be controlled by application or no application of an electric field to each pixel area of the liquid crystal layer.

The lower polarizing plate 40 will now be described in greater detail with reference to FIGS. 2 and 3. The lower polarizing plate 40 includes a polarizer 41 capable of exerting an absorption-type polarization separation function, and a protective film 50 bonded to the polarizer 41. As shown in FIG. 3, the protective film 50 is laminated to the polarizer 41 on the side not facing the liquid crystal cell 11, i.e. the light entrance side, so as to protect the polarizer 41 from the outside.

An adhesive layer (not shown), disposed between and adjacent to the polarizer 41 and the protective film 50, may be provided for bonding the polarizer 41 and the protective film 50 together. Various types of known adhesives can be used to form the adhesive layer for increasing the adhesion between the polarizer 41 and the protective film 50. For example, a water-based adhesive including a polyvinyl alcohol resin as a main component may be used to form the adhesive layer. Adhesion herein refers to a concept including sticking and gluing. Similarly, an adhesive herein includes a sticking agent, a glue and a bonding agent.

A variety of polarizers have heretofore been developed, and any of these can be used as the polarizer 41. For example, a polyvinyl alcohol film can be used as a base material for the polarizer 41. The polarizer 41 based on a polyvinyl alcohol film can be produced by absorbing or dyeing the polyvinyl alcohol film with a dichroism pigment, such as iodine or a dye, followed by uniaxial stretching for orientation of the film. Light absorption anisotropy can thus be imparted to the polarizer 41.

The protective film 50 will now be described. The protective film 50 of this embodiment has a light control function that changes the traveling direction of light. As well shown in FIGS. 2 and 3, the light entrance-side surface 50b of the protective film 50 is configured as an optical element surface (prism surface) formed by unit optical elements (unit prisms) 60 arranged side by side. The optical element surface enables the protective film 50 to exert a light condensing function (light collecting function). The protective film 50 has a diffusing component 59b dispersed in a binder resin, and the diffusing component 59b allows the protective film 50 to exert a light diffusing function. The construction of the protective film 50 will now be described in more detail.

The term "unit optical element" herein refers to an element which functions to exert an optical function, such as refraction or reflection, on light and to thereby change the traveling direction of the light. The terms "unit optical element", "unit shaped element", "unit prism" and "unit lens" are not used herein to strictly distinguish them from one another. Similarly, the terms "prism" and "lens" are not used herein to strictly distinguish them from one another.

As well shown in FIG. 3, the protective film 50 includes a sheet-like body portion 55, and unit optical elements 60 arranged side by side on the light entrance-side surface 55b of the body portion 55b. Each unit optical element 60 extends in a direction which intersects the arrangement direction of the unit optical elements 60 and is parallel to the film plane of the protective film 50. The unit optical elements 60 all have the same construction. In this embodiment, when viewed in a direction parallel to the normal direction of the plate plane of the lower polarizing plate 40, the unit optical elements 60 are arranged in a direction parallel to the first arrangement direction d1 (see FIG. 1) of the light emitters 26.

The liquid crystal display panel 15 has a large number of pixels. The liquid crystal display panel 15 forms an image by controlling transmission and blocking of light for each pixel. When viewed in a direction parallel to the normal direction of the plate plane of the lower polarizing plate 40, the unit optical elements 60 are preferably arranged in a direction intersecting the arrangement direction of the pixels of the liquid crystal cell 11 of the liquid crystal display panel 15, i.e. in a direction inclined from or perpendicular to the arrangement direction of the pixels. In particular, when viewed in a direction parallel to the normal direction of the plate plane of the lower polarizing plate 40, the arrangement direction of the unit optical elements 60 intersects the arrangement direction of the pixels of the liquid crystal cell 11 preferably at an angle of not less than 1° and less than 45°, more preferably at an angle of not less than 5° and not more than 30°. This can effectively obscure a moire pattern (interference pattern) produced by interference between the periodicity associated with the regular arrangement of the pixels and the periodicity associated with the regular arrangement of the unit optical elements 60. From the viewpoint of obscuring a moire pattern, the arrangement pitch of the unit optical elements 60 is preferably not more than 30 μm.

The cross-section shown in FIG. 3 is a cross-section parallel to both the arrangement direction of the unit optical elements 60 and the normal direction of the film plane of the protective film 50 (hereinafter simply referred to as "main cross-section"). As shown in FIG. 3, each unit optical element has a triangular shape in the main cross-section. In particular, in the illustrated embodiment, the cross-sectional shape of each unit optical element 60 in the main cross-section is an isosceles triangle which is symmetrical with respect to the normal direction of the film plane of the protective film 50. The apex angle θa (see FIG. 3) at the top apex of the isosceles triangle may be, for example, not less than 15° and not more than 100° in view of the light condensing function (light collecting function).

As described above, the protective film 50 has the diffusing component 59b which allows the protective film 50 to exert a light diffusing function. More specifically, the protective film 50 includes a light diffusing layer 51a including a resin matrix 59a, and the diffusing component 59b dispersed in the matrix 59a.

As well shown in FIG. 3, the protective film 50 of this embodiment has the light diffusing layer 51a and a resin layer 51b not containing the diffusing component 59b. In the illustrated embodiment, the resin layer 51b is disposed nearer to the light entrance side than the light diffusing layer 51a is. That is to say, the light diffusing layer 51a is disposed nearer to the polarizer 41 than resin layer 51b is.

The resin layer 51b consists of the unit optical elements 60 and the light entrance-side portion of the body portion 55. The light diffusing layer 51a, on the other hand, is adjacent to the resin layer 51b and constitutes the light exit-side portion of the body portion 55. Due to the below-described production method, no optical interface exists between the matrix 59a of the light diffusing layer 51a and the resin layer 51b. Thus, in the protective film 50, light from the resin layer 51b enters the light diffusing layer 51a without being subjected to any optical action.

Various resin materials having excellent optical properties, e.g. a polycarbonate resin, can be used for the resin layer 51b and the matrix 59a of the light diffusing layer 51a.

The diffusing component 59b dispersed in the light diffusing layer 51a, on the other hand, may be composed of particulate matter having a different refractive index from that of the matrix 59a or particulate matter which itself has reflective properties. The particulate matter may be a metal compound or a porous material containing a gas, or may even be air bubbles. No particular limitation is imposed on the particle shape of the diffusing component 59b of particulate matter. Thus, the diffusing component 59b need not necessarily have a spherical particle shape as in the illustrated embodiment, and may have various particle shapes, such as a spheroidal shape or a linear shape.

Owing to the light diffusing layer 51a containing the diffusing component 59b, the protective film 50 can exert a light diffusing function. The degree of the light diffusing function of the protective film 50, produced by the diffusing component 59b, can be adjusted in a very wide range by arbitrarily setting the resin material of the matrix 59a, the thickness of the matrix 59a, the construction (particle shape, particle size, refractive index, etc.) of the diffusing component 59b, the concentration of the diffusing component 59b, etc. In particular, the haze value of the protective film 50 can be set at a level which will not usually be reached by merely matting (roughening) the surface of a protective film, e.g. in the range of not less than 60% and not more than 90%. As demonstrated by the below-described experimental results, it has been found through the present inventors' studies that when the refractive index of the diffusing component 59b is made lower than the refractive index of the matrix 59a that holds the diffusing component, it becomes possible to reduce loss of light and more efficiently use light from the light source 25, thus making it possible to achieve both high front direction luminance and wide viewing angle.

The light entrance-side surface 50b of the protective film 50, constituting the light entrance-side surface of the lower polarizing plate 40 and also constituting the light entrance surface of the liquid crystal display panel 15, is formed as an optical element surface defined by the unit optical elements 60. On the other hand, the light exit-side surface 50a of the protective film 50 is formed as a flat surface. This makes it possible to stably laminate and bond the protective film 50 and the polarizer 41 together while preventing entrainment of e.g. air.

The term "flat", used for the polarizer 41-facing surface 50a of the protective film 50, herein refers to such a degree of flatness as to ensure stable lamination and bonding of the protective film 50 and the polarizer 41. For example, the polarizer 41-facing surface 50a of the protective film 50 can be regarded as flat if the ten-point average roughness Rz of the surface 50a, measured according to JIS B0601 (1982), is not more than 1.0 μm.

Because the light exit-side surface 50a of the protective film 50 is flat despite the inclusion of the diffusing component 59b in the protective film 50, the protective film 50 and the polarizer 41 can be laminated and bonded together by so-called "water bonding". In particular, the protective film 50 and the polarizer 41 are laminated together in the presence of water or an aqueous solution (or suspension) containing an appropriate additive such as a surfactant. This method can laminate the protective film 50 and the polarizer 41 together while preventing entrainment of foreign matter such as air. It is possible to positively bond the protective film 50 and the polarizer 41 together by adding an adhesive (e.g. glue) to the water or the aqueous solution (or suspension) or by providing an adhesive layer on at least one of the protective film 50 and the polarizer 41 in advance.

In order to promote removal of moisture from the protective film 50 and the polarizer 41 after "water bonding", the protective film 50 preferably has a moisture permeability of not less than 10 g/m$^{2 \cdot}$·24 hr, as measured at a temperature of 40° C. and a humidity of 90% RH. However, if the moisture permeability is too high, warpage or bending of the film can occur due to moisture absorption. The moisture permeability is therefore preferably not more than 400 g/m$^2$·24 hr, as measured at a temperature of 40° C. and a humidity of 90% RH. The moisture permeability herein refers to one determined by a cup method according to JIS Z0208.

The thus-constructed protective film 50 can be produced, for example, by co-extruding the light diffusing layer 51$a$ and the resin layer 51$b$, and shaping the unit optical elements 60. In the protective film 50 produced by such a method, no optical interface exits between the matrix 59$a$ of the light diffusing layer 51$a$ and the resin layer 51$b$. Thus, in the protective film 50, light from the resin layer 51$b$ enters the light diffusing layer 51$a$ without being subjected to an optical action. The light exit-side surface 50$a$ of the protective film 50, i.e. the surface of the light diffusing layer 51$a$, can be formed either as a flat surface or as an irregular surface having irregularities formed due to the presence of the diffusing component 59$b$ by adjusting the degree of cooling of an extrudate during forming of the extrudate into a sheet. The light exit-side surface 50$a$ of the protective film 50 will be formed as a flat surface when the degree of cooling of the extrudate is high. On the other hand, if the degree of cooling of the extrudate during molding is low, the extrudate will be cooled also after extrusion processing when no tension acts on the extrudate. Consequently, based on the difference in thermal expansion between the matrix 59$a$ and the diffusing component 59$b$, irregularities are formed due to the presence of the diffusing component 59$b$ in the light exit-side surface 50$a$ of the protective film 50, i.e. the surface of the light diffusing layer 51$a$.

The operation of the display device 10, mainly attributable to the protective film 50, will now be described with reference mainly to FIG. 3.

Referring to FIG. 3, light emitted by the light emitters 26 of the light source 25 travels toward the viewer side directly or after reflecting from the reflective plate 21, and enters the liquid crystal display panel 15. The lower polarizing plate 40 is provided on the innermost light entrance side of the liquid crystal display panel 15. The surface of the protective film 50 of the lower polarizing plate 40 is the innermost light entrance-side surface of the liquid crystal display panel 15.

As described above, the protective film 50 has a light condensing function that changes the traveling direction of light such that the angle of the traveling direction with respect to the front direction nd becomes smaller, and also has a light diffusing function that diffuses light. The light condensing effect (light collection effect) is exerted by the unit optical elements 60 of the protective film 50, while the light diffusing effect is mainly exerted by the light diffusing layer 51$a$ of the protective film 50. The unit optical elements 60 form the light entrance-side surface of the protective film 50, while the light diffusing layer 51$a$ is provided on the light exit side of the protective film 50. Thus, light that has entered the protective film 50 is first subjected to a light condensing action, and is then subjected to a light diffusing action.

As well shown in FIG. 3, the basic principle of the light condensing function of the unit optical elements 60 resides in causing lights L31, L32, which each have entered the one light entrance-side surface 60$b$1 of a unit optical element 60, to totally reflect at the other light exit-side surface 60$b$2, thereby decreasing the angle of the traveling direction of each light with respect to the front direction nd. The light condensing function of the unit optical elements 60 is thus exerted mainly on a light component parallel to the arrangement direction of the unit optical elements 60. As shown in FIG. 3, by appropriately designing the cross-sectional shape of the unit optical elements 60, the light condensing function of the unit optical elements 60 of the protective film 50 can be most effectively exerted in those areas of the unit optical elements 60 which contain positions each facing the midpoint between two adjacent light emitters 26 and which tend to exhibit low brightness.

Thus, the unit optical elements 60 not only condense a light component traveling along the arrangement direction of the unit optical elements 60 but also exert the function of reducing variation of brightness along the arrangement direction. Because the light condensing function of the unit optical elements 60 is exerted mainly on a light component parallel to the arrangement direction of the unit optical elements 60 as described above, variation of brightness along the arrangement direction of the light emitters 26 can be effectively reduced when the arrangement direction of the unit optical elements 60 is parallel to the arrangement direction of the light emitters 26 as in the embodiment illustrated in FIGS. 1 and 3. Thus, in the embodiment illustrated in FIG. 1, the first arrangement direction of the two-dimensionally arranged light emitters 26 is parallel to the arrangement direction of the unit optical elements 60, and therefore variation of brightness along the first arrangement direction can be eliminated and the in-plane distribution of luminance can be effectively equalized.

As described above, the unit optical elements 60 of the protective film 50 serve to increase the front direction luminance and to reduce variation of brightness (in-plane variation of luminance) due to the construction (arrangement) of the light emitters 26 of the light source 25. In addition, because the diffusing component 59$b$ is not contained in the unit optical elements 60 in this embodiment, the surface (prism surface) of the unit optical elements 60, which acts as the light entrance surface 60$b$1 and as the total reflection surface 60$b$2, can be formed with high accuracy as a smooth surface without irregularities due to the diffusing component 59$b$. This enables the unit optical elements 60 of the protective film 50 to exert the intended optical functions.

The degree of the light condensing function of the protective film 50 can be adjusted in a very wide range by arbitrarily setting the arrangement pitch pa1 of the light emitters 26, the distance la1 between the light emitters 26 and the protective film 50 in the normal direction of the film plane of the protective film 50, the shape of each unit optical element 60, the refractive index of the unit optical elements 60, etc.

Light that has entered the protective film 50 through the unit optical elements 60 travels from the resin layer 51$b$ to the light diffusing layer 51$a$ having a light diffusing function. The light diffusing layer 51$a$ includes the matrix 59$a$ and the diffusing component 59$b$ dispersed in the matrix 59$a$, and can exert a light diffusing function owing to the presence of the diffusing component 59$a$. The light diffusing effect of the light diffusing layer 51$a$, produced by the light diffusing component 59$b$, is far superior in the degree and the quality (uniformity of diffusion) to a light diffusing effect produced by matting of the surface of a protective film by shaping or by fixing of particulate matter on the surface.

Figure 14:
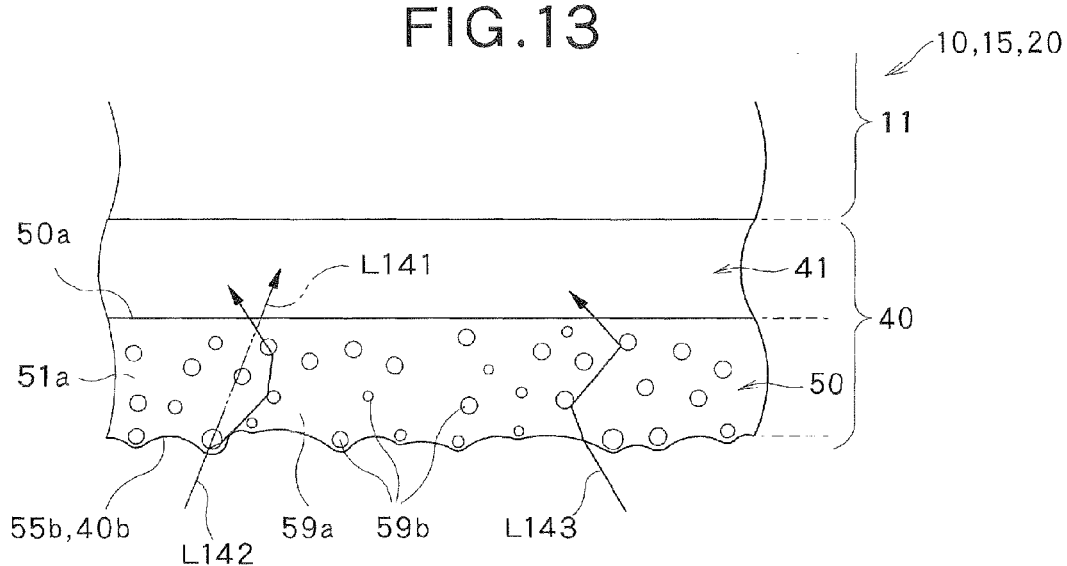
FIG. 14 is a diagram showing a liquid crystal display panel in the same cross-section as FIG. 3, illustrating yet another variation of the protective film.

Thus, in the case of a protective film merely having a matted surface, there exists light which passes through the protective film without a change in the traveling direction, like a light ray L141 shown by the two-dot chain line in FIG. 14. On the other hand, the diffusing component 59b is dispersed in the protective film 50 of this embodiment not only in the planar direction but also in the thickness direction. It is therefore highly possible that light rays L142, L143, which have entered the light diffusing layer 51a, will collide with the diffusing component 59 at least once and change its traveling direction. As described above, the degree of the light diffusing effect of the light diffusing layer 51a can be adjusted in a very wide range by arbitrarily setting the resin material of the matrix 59a, the thickness of the matrix 59a, the construction (particle shape, particle size, refractive index, etc.) of the diffusing component 59b, the concentration of the diffusing component 59b, etc.

In this manner, light from the surface light source device 20 can be diffused to some degree in the light diffusing layer 51a of the protective film 50. This can change the profile of the angular distribution of luminance, after condensing of light by the unit optical elements 60 of the protective film 50, to a gentler one. Further, by appropriately adjusting the degree of the light diffusing function of the light diffusing layer 51a of the protective film 50, it becomes possible to effectively even out the in-plane distribution of luminance due to the arrangement of the light emitters 26 along the first arrangement direction d1 and the second arrangement direction d2, thereby more securely preventing the images of the light emitters 26 from being visually observed.

Light that has been diffused by the light diffusing layer 51a of the protective film 50 travels toward the polarizer 41 of the lower polarizing plate 40, the liquid crystal cell 11 and the upper polarizing plate 12, which are located on the light exit side of the protective film 50. The liquid crystal cell 11 transmits light selectively for each pixel, so that a viewer can view an image on the liquid crystal display device 10.

According to this embodiment, the protective film 50, which is to be joined to the polarizer 41 and constitute the polarizing plate (lower polarizing plate) 40 in the optical module 20 incorporated in the display device 10, has an excellent light control function that can change the traveling direction of light. In particular, the protective film 50 can exert an excellent light diffusing function attributable to the diffusing component 59b dispersed in the matrix resin, and an excellent light condensing function attributable to the unit optical elements 60, projecting toward the light emitters 26 and forming the light entrance surface of the protective film 50. The excellent light control function of the protective film 50 makes it possible to delete optical sheets, such as the diffusion plate A, the lower diffusion sheet B, the light condensing sheet C and the upper diffusion sheet D, incorporated in the surface light source device of the conventional display device 1 shown in FIG. 40.

Thus, it becomes possible to significantly reduce the number of members (optical sheets) incorporated in a display device, leading to a direct and significant reduction in the production cost of the display device. Furthermore, it becomes possible to omit troublesome operations, such as positioning of optical sheets, which are necessary for assembly of a display device or a surface light source device. This can also reduce the production cost of the display device. In addition, deletion of members (optical sheets) from a display device can make the display device thinner.

While optical sheets, incorporated in the conventional display device, are members for correcting the traveling direction of light, the sheets unavoidably absorb part of incident light. In addition, in the conventional display device, most of light reflects from some optical sheet(s), and enters the display panel after reversing the traveling direction one or more times. Thus, in the conventional display device, a considerable amount of the light, emitted by the light emitters 26 of the light source 25, is absorbed by some optical sheet(s), and therefore cannot be used for display of images. According to the above-described embodiment of the present invention, on the other hand, the light emitters 26 of the light source 25 directly face the protective film 50 of the lower polarizing plate 40, i.e. without any member intervening between them. Therefore, light emitted by the light emitters 26 can directly enter the polarizing plate 40 of the liquid crystal display panel 15 and, if reflected, can re-enter the polarizing plate 40 after once reflecting from the reflective plate 21. The efficiency of the use of light emitted by the light emitters 26 can therefore be significantly increased. This also makes it possible to significantly broaden the viewing angle, as compared to the conventional display device, while maintaining the front direction luminance and without increasing the power of the light source 25.

In this embodiment the protective film 50 having a light control function (which changes the traveling direction of light) is joined to the polarizer 41 and constitutes the polarizing plate 40. In the thus-constructed display device, the number of air layers through which light passes is smaller as compared to the display devices shown in FIGS. 40 and 41, in which the light condensing sheet C and the upper diffusion sheet D are provided separately from the polarizing plate 13. Thus, light can be prevented from reflecting, in particular totally reflecting at the interface between an optical sheet and an air layer and traveling toward a light source. This can increase the efficiency of the use of light.

Figure 4:
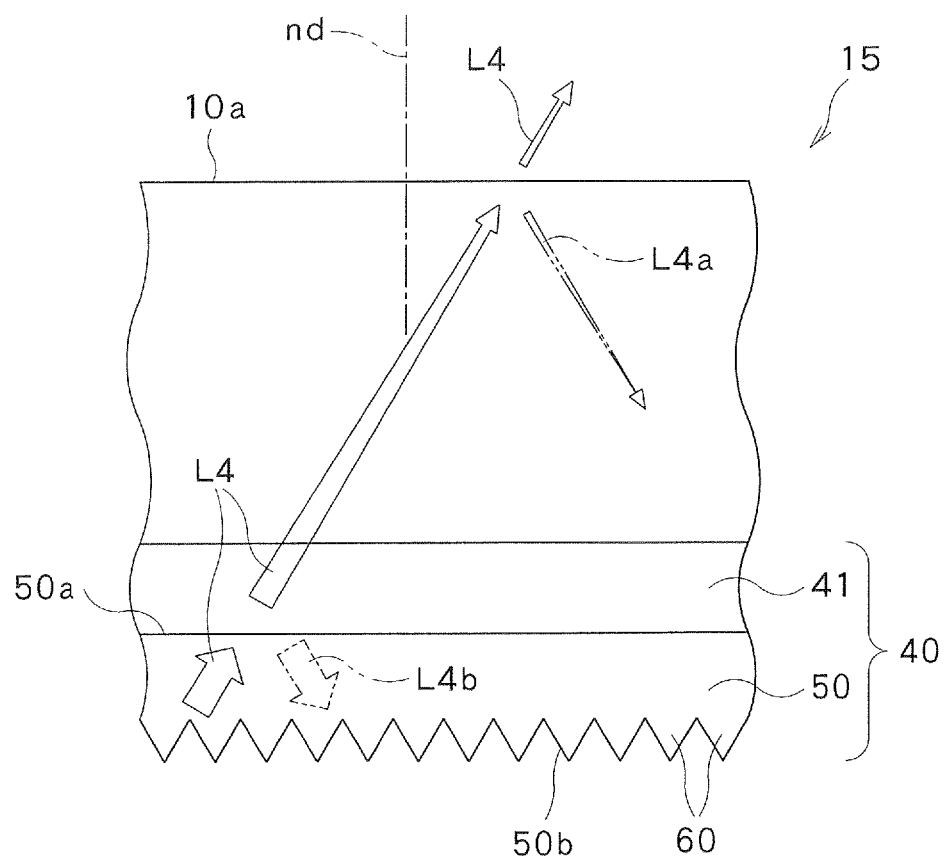
FIG. 4 is a schematic view of a liquid crystal display panel.

In particular, in this embodiment the protective film 50, having the unit optical elements 60 which can exert a light condensing function, is joined to the polarizer 41 and constitutes the polarizing plate 40. It has been found through the present inventors' studies that the use of such a protective film can more stably increase the efficiency of the use of light from the light source 25. The following may be considered in this regard:

As schematically shown in FIG. 4, when no air layer exists between the protective film 50 and the polarizer 41, the interface between the protective film 50 and the polarizer 41 can transmit light L4 from the light emitters 26 of the light source 25 at a very high transmittance. However, when the traveling direction of the light L4, traveling from the protective film 50 to the polarizer 41, is highly inclined from the front direction nd, the light L4, if it does not significantly change the traveling direction later, will be totally reflected at the interface which is formed between an air layer and, in the illustrated case where the light travels in the liquid crystal display panel 15, the display surface 10a. In theory, such light L4a can be later reflected at some interface and can be reused. Actually, however, most of such light traveling in the liquid crystal display panel is absorbed by the polarizer 41 of the lower polarizing plate 40, the liquid crystal display cell 11 including a color filter, or the upper polarizing plate when the light passes through these members. Therefore, it is not possible to effectively reuse light after it travels back and forth in the liquid crystal display panel 15. Thus, when the traveling direction of the light L4, traveling in the protective film 50, is highly inclined from the front direction nd, the efficiency of the use of the light is rather high if an air layer exists between the protective film 50 and the polarizer 41 and the light is reflected at the interface between the protective film 50 and the air layer (see light L4b in FIG. 4).

On the other hand, when the protective film 50 has the unit optical elements 60 which can exert a light condensing function as in this embodiment, such a loss of light can be avoided and the efficiency of the use of light from the light source 25 can be more stably increased. It has been found through the present inventors' studies that when the half-value angle (angle formed between a measurement direction in which the measured luminance is one-half of the peak luminance and the normal direction of the film plane of the protective film 50) in the angular distribution of luminance, attributable to light which has been condensed by the unit optical elements 60 and travels in the protective film 50, in a plane parallel to both the arrangement direction of the unit optical elements 60 and the normal direction nd of the film plane of the protective film 50, is not more than the critical angle of total reflection for light that exits the light exit surface 50a of the protective film 50 and enters an air layer on the assumption that the air layer exists adjacent to the protective film 50, the efficiency of the use of source light can be significantly increased by bonding the protective film 50 to the polarizer 41.

Figure 40:
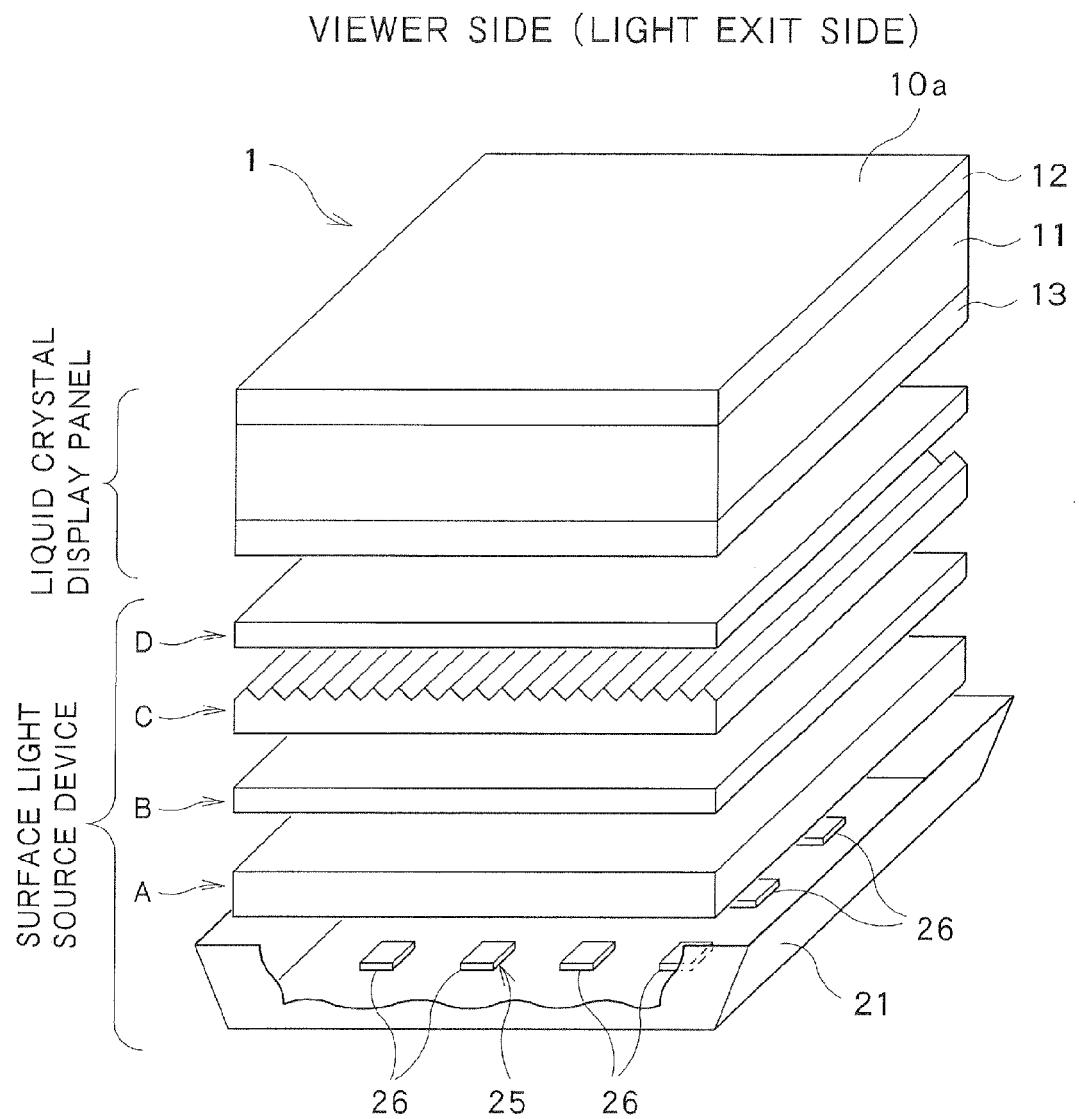
FIG. 40 is a perspective view corresponding to FIG. 1, illustrating a conventional display device.

According to this embodiment, no optical sheet is disposed between the light emitters 26 of the light source 25 and the protective film 50 of the polarizing plate 40. This can avoid problems, such as poor display image quality, caused by deformation of an optical sheet, such as bending, deflection or warpage. In the conventional display device, as shown in FIG. 40, the member (diffusion plate A) that directly faces the light emitters has a large thickness so that it will not deform by heat from the light emitters, and that the member can block transfer of heat to the other members (diffusion sheet, light condensing sheet, etc.) lying on the light exit side of the member. The use of the diffusion plate A having a large thickness incurs a high material cost, leading to an increased production cost for the display device. Furthermore, a need exists to install a support mechanism in a surface light source device when incorporating the thick diffusion plate A into the surface light source device. On the other hand, in this embodiment the protective film 50 which directly faces the light emitters 26 is laminated to the liquid crystal display panel 15 and constitutes part of the polarizing plate 40. Thus, the protective film 50 is directly supported by the liquid crystal display panel 15. Therefore, there is no need for a special support mechanism for the protective film 50. Further, deformation of the protective film 50 is restrained by the liquid crystal display panel 15. The thickness of the protective film 50 can therefore be determined solely from the viewpoint of its desired optical function and polarizer-protecting function. This can reduce the production cost of the display device 10.

In this embodiment the protective film 50 having a light control function (which changes the traveling direction of light) is joined to the polarizer 41 and thus is stably supported. In the display devices shown in FIGS. 40 and 41, on the other hand, it is necessary to hold the light condensing sheet C and the upper diffusion sheet D after performing their positioning with respect to the other components. Thus, the display device 10 and the liquid crystal display panel 15 according to this embodiment are excellent and far superior in their resistance to problems caused, for example, by vibration during their handling such as transportation, or by a change in the environmental conditions (temperature, humidity, etc.) in the location where the device is installed. This can effectively prevent defects at the tops of the unit shaped elements 60 having a fine structure, enabling the protective film 50 to exert the intended optical functions.

In addition, as demonstrated by the below-described experimental results, it has been found through the present inventors' studies that when the refractive index of the diffusing component 59b is made lower than the refractive index of the matrix 59a that holds the diffusing component, it becomes possible to reduce loss of light and more efficiently use light from the light source 25, thus making it possible to achieve both high front direction luminance and wide viewing angle. While the mechanism in this regard is not fully clarified, the following is considered as one of the main causes.

When the refractive index of the diffusing component 59b is lower than the refractive index of the matrix 59a, light traveling in the matrix 59a can be totally reflected at the interface between the diffusing component 59b and the matrix 59a. Such total reflection is more likely to occur when the refractive index difference between the diffusing component 59b and the matrix 59a is not less than 0.10, preferably not less than 0.14. Unlike mere reflection at an interface with different refractive indices and reflection caused solely by the reflective action of the surface of a diffusing component particle, the total reflection does not entail a loss of light by reflection. Thus, the loss of light, caused by diffusion of light in the light diffusing layer 51a of the protective film 50, can be effectively reduced. This enables the light diffusing layer 51a to exert a light diffusing function which is very excellent in the degree and the quality (uniformity of diffusion). This also makes it possible to use light, emitted by the light emitters 26 of the light source 25, with very high efficiency. It is, therefore, conceivable that when the refractive index of the diffusing component 59b is lower than the refractive index of the matrix 59a, sufficient optical properties, in particular sufficient brightness (sufficient luminance) and sufficient viewing angle, can be ensured more stably on the display surface 10a of the display device 10. In addition, variation of brightness (luminance variation) can be more stably eliminated. The present invention, however, is not bound to such a theory.

In the conventional display device 1 shown in FIG. 40, the light source 25, the reflective plate 21, the liquid crystal cell 11 and the upper polarizing plate 12 may each have the same construction as that of the above-described embodiment of the present invention.

Various changes and modifications may be made to the above-described embodiment. Some variations will now be described with reference to the relevant drawings. In the drawings referred to in the following description, the same reference numerals will be used for the same members or components as used in the above-described embodiment, and a duplicate description thereof will be omitted.

Figure 6:
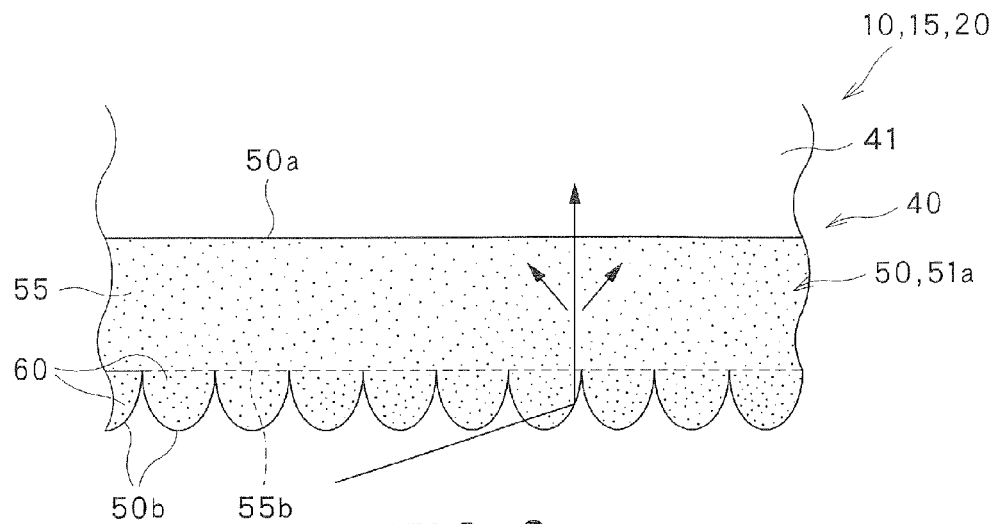
FIG. 6 is a diagram showing a polarizing plate in the same cross-section as FIG. 3, illustrating a variation of the protective film.
Figure 7:
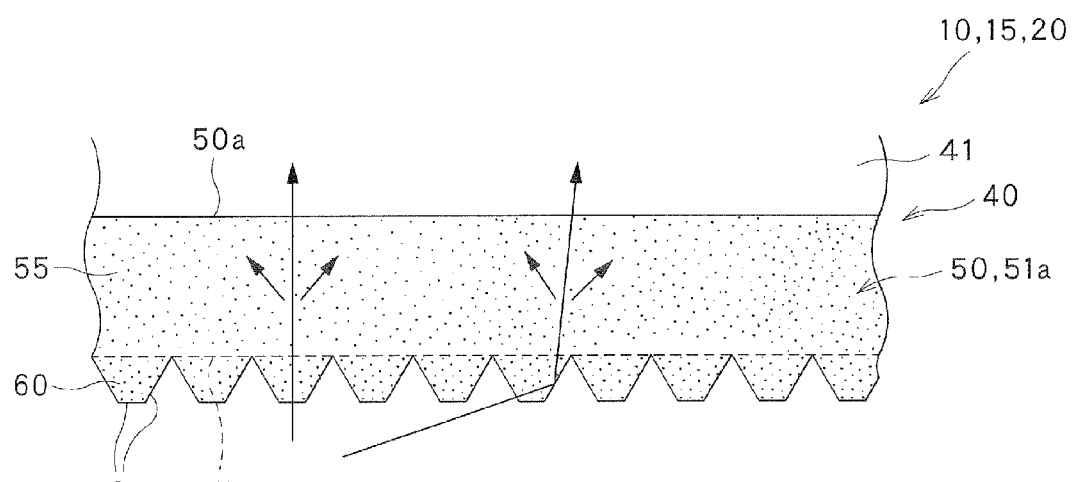
FIG. 7 is a diagram showing a polarizing plate in the same cross-section as FIG. 3, illustrating another variation of the protective film.

In the above-described embodiment the protective film 50, constituting the polarizing plate 40, includes the light diffusing layer 51a consisting of the resin matrix 59a and the diffusing component 59b dispersed in the matrix 59a, and the resin layer 51b not containing the diffusing component 59b and consisting solely of a resin material. In other words, the diffusing component 59b is dispersed only in part of the protective film 50. However, as shown in FIGS. 6 and 7, it is also possible to disperse the diffusion component 59b throughout the protective film 50. In that case, the protective film 50 consists solely of the light diffusing layer 51a consisting of the resin matrix 59a and the diffusing component 59b dispersed in the matrix 59a; and the unit optical elements 60 constitute part of the light diffusing layer 51a. The protective film 50 of this embodiment has the advantage that the degree of the light diffusing effect can be more freely adjusted.

Though in the above-described embodiment the cross-sectional shape of each unit optical element 60 of the protective film 50 in the main cross-section is a triangle, the unit optical elements 60 may have any desired cross-sectional shape. For example, the cross-sectional shape of each unit optical element 60 of the protective film 50 in the main cross-section may be a triangular shape having a chamfered top apex. Further, as shown by the two-dot chain lines in FIG. 3, the above-described triangular cross-sectional shape of the unit optical element 60 may be modified such that the two sides, extending from the body portion 55, are outwardly bulging curved lines.

Further, as shown in FIG. 6, the unit optical elements 60 may have a curved contour in the main cross-section of the protective film 50. That is to say, the light entrance surface of each unit optical element 60 may be configured as a curved surface. For instance, in the main cross-section of the protective film 50, the unit optical elements 60 may each have a shape corresponding to a part of an ellipse (e.g. semiellipse) or a part of a circle (e.g. semicircle). Further, in the main cross-section of the protective film 50, the unit optical elements 60 may each have the shape of a truncated triangle, as shown in FIG. 7. For instance, in the main cross-section of the protective film 50, the unit optical elements 60 may each have an isosceles trapezoidal shape as shown in FIG. 7 or a shape corresponding to an isosceles trapezoid whose shorter base is altered into a curved line.

As with the above-described embodiment, the protective films 50 shown in FIGS. 6 and 7 can be produced by extrusion molding.

Though in the above-described embodiment the unit optical elements 60 are arranged one-dimensionally on the body portion 55, i.e. the linear unit optical elements 60 are arranged in parallel on the body portion 55, it is also possible to arrange point-like unit optical elements 60 two-dimensionally on the body portion 55 such that the unit optical elements 60 constitute a so-called fly's eye lens (or microlenses). In that case, the unit optical elements 60 may be arranged either regularly or irregularly on the body portion 55. When the point-like unit optical elements 60 are arranged regularly and two-dimensionally on the body portion 55, the first arrangement direction of the unit optical elements 60 may be made parallel to the first arrangement direction d1 (see FIG. 1) of the light emitters 26, and the second arrangement direction of the unit optical elements 60 may be made parallel to the second arrangement direction d2 (see FIG. 1) of the light emitters 26. Examples of the shape of the point-like unit optical elements 60, constituting a fly's eye lens (or microlenses), include a part of a sphere (e.g. hemisphere), a part of a spheroid (e.g. hemispheroid), a circular cone, a polygonal pyramid such as a square pyramid, a truncated circular cone, a truncated polygonal pyramid such as a truncated square pyramid, etc.

Figure 8:
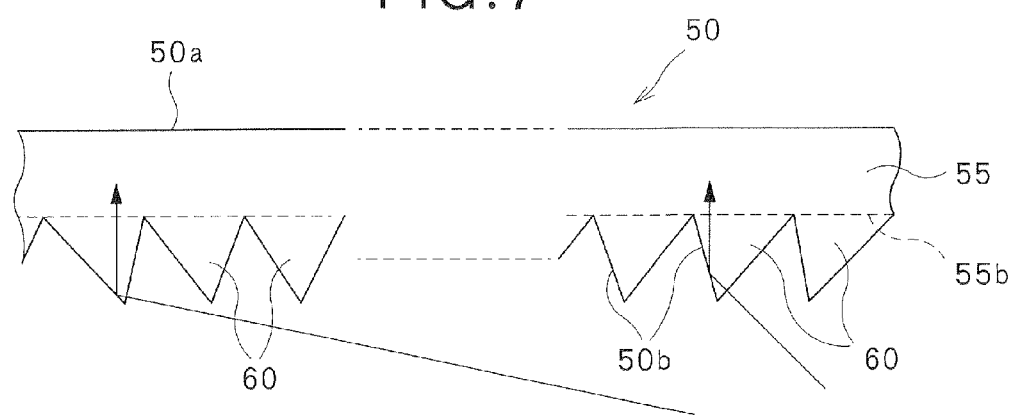
FIG. 8 is a diagram illustrating yet another variation of the protective film in the same cross-section as FIG. 3.
Figure 9:
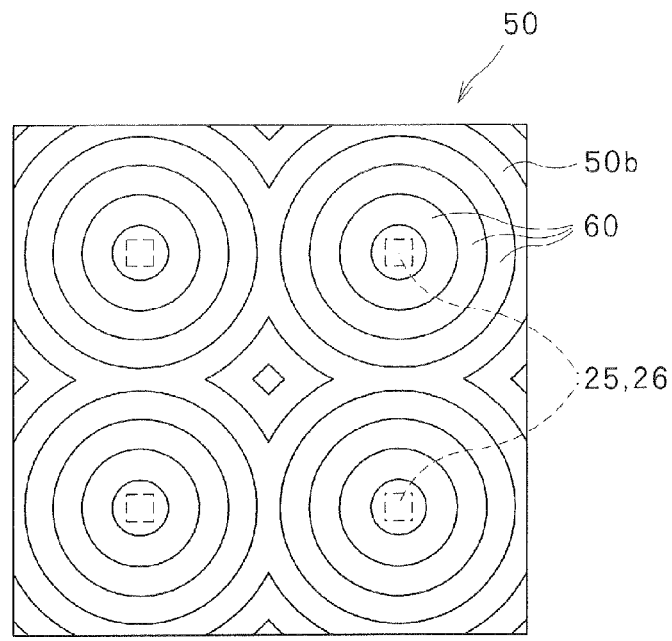
FIG. 9 is a plan view of yet another variation of the protective film, illustrating the arrangement of unit optical elements in the variation.
Figure 10:
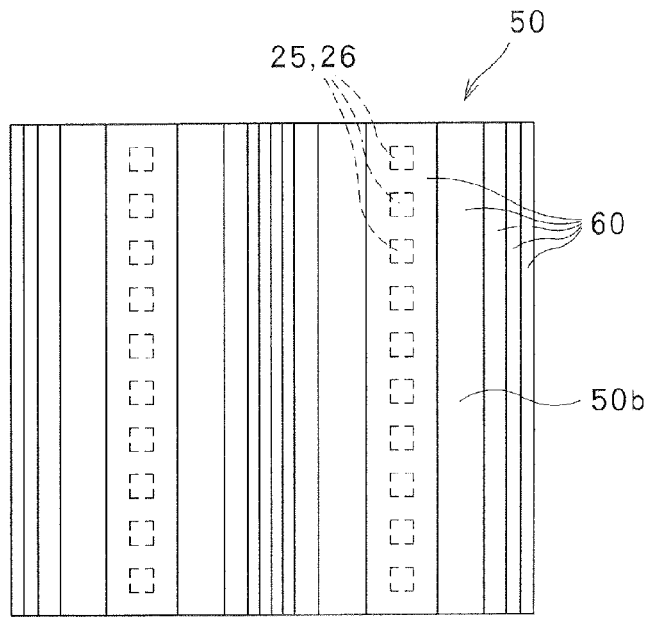
FIG. 10 is a plan view of yet another variation of the protective film, illustrating the arrangement of unit optical elements in the variation.

Though in the above-described embodiment the unit optical elements 60 of the protective film 50 all have the same construction, it is possible to use unit optical elements 60 having different cross-sectional shapes as shown in FIG. 8. As will be understood from FIG. 3, the traveling direction of light, which is emitted by a light emitter 26 of the light source 25 and directly enters the protective film 50, changes with the distance from the light emitter 26 to an incident position on the protective film 50 in a direction parallel to the film plane of the protective film 50. In the embodiment shown in FIG. 8, the cross-sectional shape of each unit optical element 60 changes depending on the distance from a light emitter 26 to the unit optical element 60. Thus, a number of unit optical elements 60 of the protective film 50 can constitute a so-called Fresnel lens. The Fresnel lens formed by unit optical elements 60 may be either a circular Fresnel lens as shown in FIG. 9 or a linear Fresnel lens as shown in FIG. 10, depending on the arrangement of light emitters 26. In the embodiment shown in FIG. 9, light emitters 26 are arranged two-dimensionally, and each circular Fresnel lens is provided for each light emitter 26. In the embodiment shown in FIG. 10, point-like light emitters 26 are arranged in parallel lines, and each linear Fresnel lens is provided for each line. The linear arrangement shown in FIG. 10 may be preferably used also in combination with linear light emitters 26, such as cold cathode fluorescent lamps as will be described later with reference to FIGS. 23 through 25.

Figure 11:
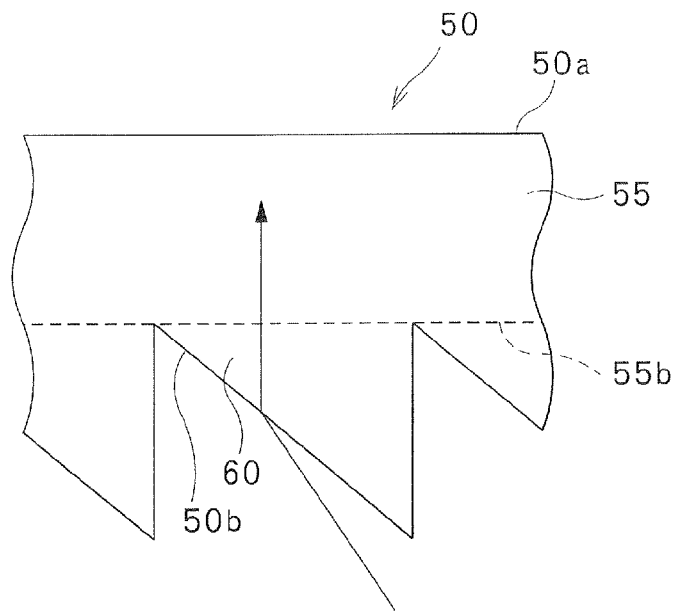
FIG. 11 is a diagram showing a protective film in the same cross-section as FIG. 8, illustrating a variation of the unit optical elements.
Figure 12:
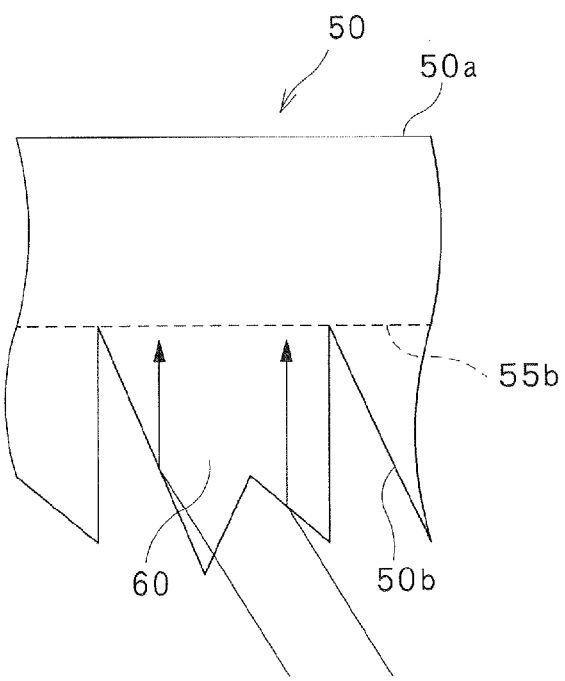
FIG. 12 is a diagram showing a protective film in the same cross-section as FIG. 8, illustrating another variation of the unit optical elements.

Though in the above-described embodiment the unit optical elements 60 exert a light condensing function by changing the traveling direction of light through total reflection of the light, it is also possible to design unit optical elements 60 to change the traveling direction of light through refraction of the light as shown in FIG. 11. Further, it is possible to design the unit optical elements 60 of the protective film 50 so that some unit optical elements 60 change the traveling direction of light through refraction of the light, and the other unit optical elements 60 change the traveling direction of light through reflection of the light. Further, as shown in FIG. 12, it is possible to design each unit optical element 60 to have both a light reflecting function and a light refracting function.

Though in the above-described embodiment the protective film 50 has both a light diffusing function and a light condensing function, the protective film 50 does not need to have a light diffusing function if it is used in an environment where light from the light emitters 26 is sufficiently scattered. Thus, there is no need to use the light diffusing component 59b in the protective film 50. Similarly, the protective film 50 does not need to have a light condensing function if it is used in an environment where light from the light emitters 26 is sufficiently condensed. Thus, there is no need to provide the unit optical elements 60 for the protective film 50.

Figure 13:
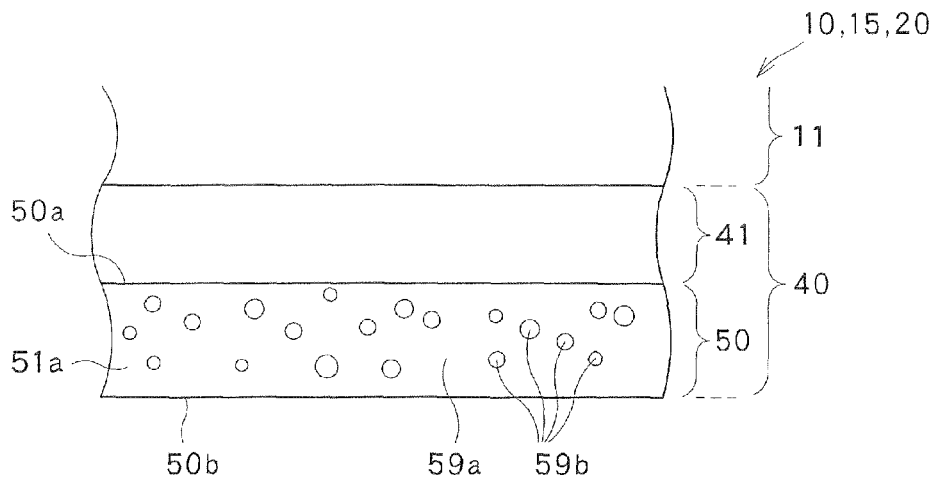
FIG. 13 is a diagram showing a liquid crystal display panel in the same cross-section as FIG. 3, illustrating yet another variation of the protective film.
Figure 15:
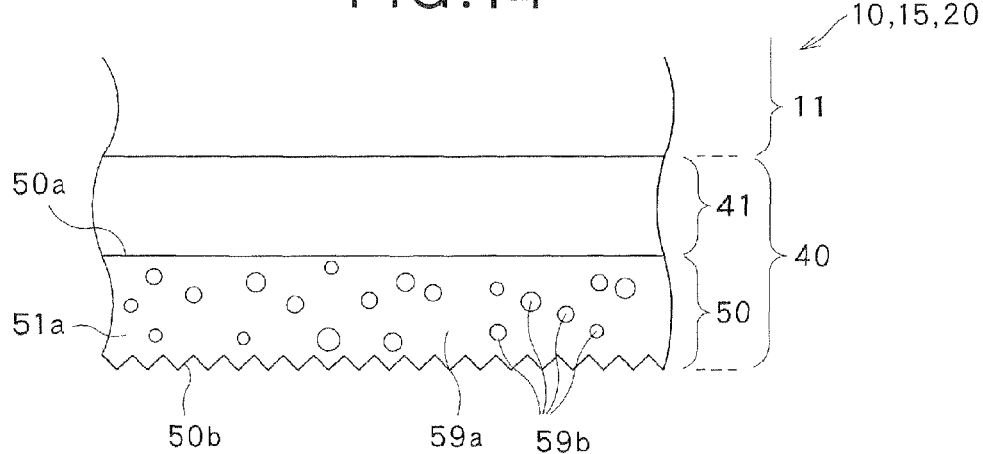
FIG. 15 is a diagram showing a liquid crystal display panel in the same cross-section as FIG. 3, illustrating yet another variation of the protective film.
Figure 16:
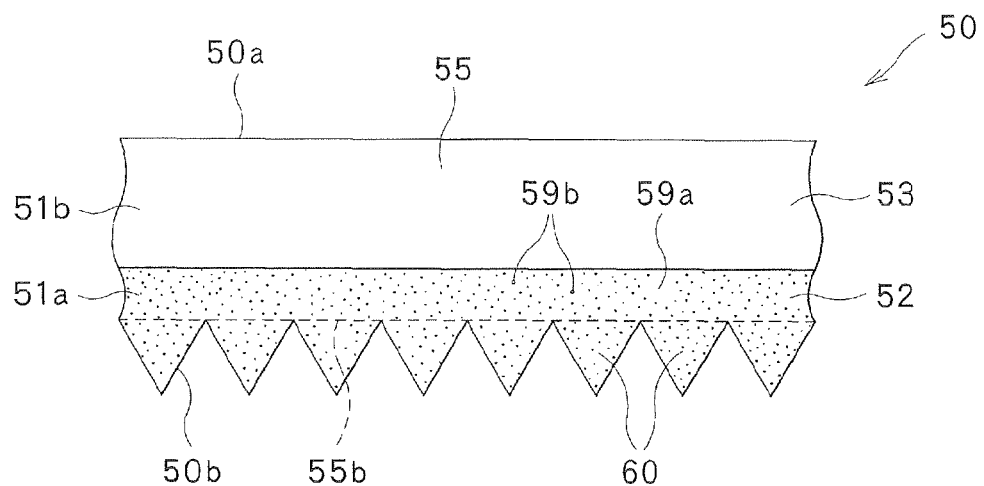
FIG. 16 is a diagram showing a liquid crystal display panel in the same cross-section as FIG. 3, illustrating yet another variation of the protective film.

FIGS. 13 through 15 show protective films 50 which are each not provided with the unit optical elements 60. Thus, the protective films 50 shown in FIGS. 13 through 15 each consist solely of the light diffusing layer 51a containing the diffusing component 59b, so that the protective films 50 can effectively exert a light condensing function. In the embodiment shown in FIG. 13, both the light exit-side surface 50a and the light entrance-side surface 50b of the protective film 50 are configured as a flat surface. The protective film 50 shown in FIG. 13 can be produced as an extrudate obtained by extrusion processing.

In the embodiment shown in FIG. 14, the light exit-side surface 50a of the protective film 50 is configured as a flat surface, whereas the light entrance-side surface 50b of the protective film 50 is configured as an irregular surface. The irregularities of the light entrance-side surface 50b are formed due to the presence of the diffusing component 59b dispersed in the matrix 59a, i.e. due to exposure of particles of the diffusing component 59b on the surface or protrusion of the contours of particles of the diffusing component 59b from the surface. The protective film 50 shown in FIG. 14 can be produced as an extrudate obtained by extrusion processing. When producing the protective film 50 shown in FIG. 14 by extrusion processing, the degree of cooling of the extrudate from its one surface during the processing is made low. In this case, the resin material of the matrix 59a thermally contracts by cooling after the extrudate is released from a molding roll, causing particles of the diffusing component 59b to protrude from the surface. The light entrance-side surface 50b of the protective film 50, which is the one surface of the extrudate, can thus be formed as an irregular surface. On the other hand, the light exit-side surface 50a of the protective film 50, which is the other surface of the extrudate, can be formed as a flat surface by sufficiently cooling the other surface of the extrudate during extrusion processing.

In the embodiment shown in FIG. 15, the light exit-side surface 50a of the protective film 50 is configured as a flat surface, whereas the light entrance-side surface 50b of the protective film 50 is configured as an irregular surface. The irregularities of the light entrance-side surface 50b are formed by shaping. The protective film 50 can be produced by extrusion processing using a molding roll having a three-dimensional pattern in the peripheral surface. When the light entrance-side surface 50b of the protective film 50 has surface irregularities formed by shaping, the light entrance-side surface 50b either may not have surface irregularities formed due to the presence of the diffusing component 59b (as in the embodiment shown in FIG. 13) or may have, in addition to the irregularities formed by shaping, surface irregularities formed due to the presence of the diffusing component 59b (as in the embodiment shown in FIG. 14).

The protective film 50 can be produced also by a method other than extrusion, such as injection molding. FIGS. 16 through 19 show exemplary protective films 50 which can be produced by a method comprising applying a resin, such as an ionizing radiation-curable resin, onto a substrate film 53, and molding the resin into a desired shape. The protective film 50 shown in FIG. 16 can be produced by shaping of a resin containing the diffusing component 59b on the substrate film 53. In the protective film 50 shown in FIG. 16, the unit optical elements 60, whose surfaces form the light entrance-side surface 50b, form part of the light diffusing layer 51a, and the resin portion 51b consisting of the substrate film 53 is provided on the light exit side of the light diffusing layer 51a.

Figure 17:
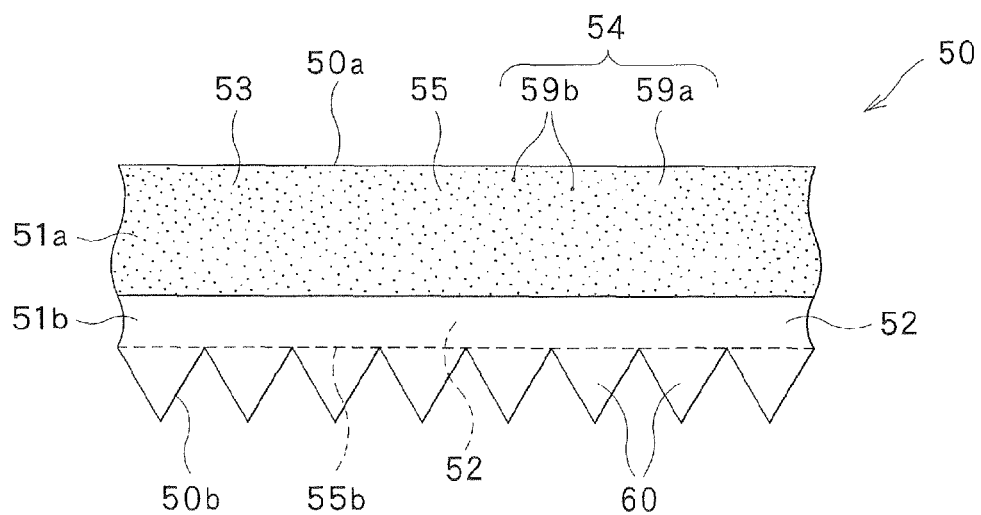
FIG. 17 is a diagram showing a liquid crystal display panel in the same cross-section as FIG. 3, illustrating yet another variation of the protective film.

The protective film 50 shown in FIG. 17 can be produced by shaping of a resin on the substrate film 53 containing the diffusing component 59b and which is to constitute the light diffusing layer 51a. An extrudate, for example, can be used as the substrate film 53 containing the diffusing component 59b and which is to constitute the light diffusing layer 51a.

Figure 18:
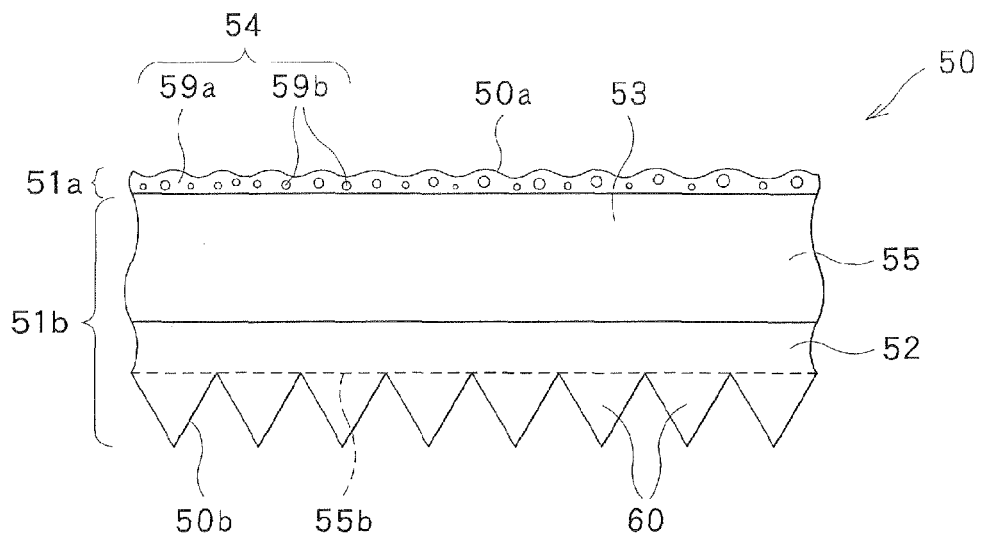
FIG. 18 is a diagram showing a liquid crystal display panel in the same cross-section as FIG. 3, illustrating yet another variation of the protective film.

In the embodiment shown in FIG. 18, the unit optical elements 60 are formed by shaping of a resin on the substrate film 53. A matte layer 54 having an irregular surface is formed in the light exit-side surface 50a of the substrate film 53, the opposite side from the unit optical elements 60. The matte layer 54 consists of the diffusing component 59b and a resin material (e.g. an ionizing radiation-curable resin) which serves as a binder resin. The matte layer 54 constitutes the light diffusing layer 51a with the binder resin material serving as the matrix 59a. The matter layer 54 may be formed on the substrate film 53 either before or after shaping of the unit optical elements 60.

Figure 19:
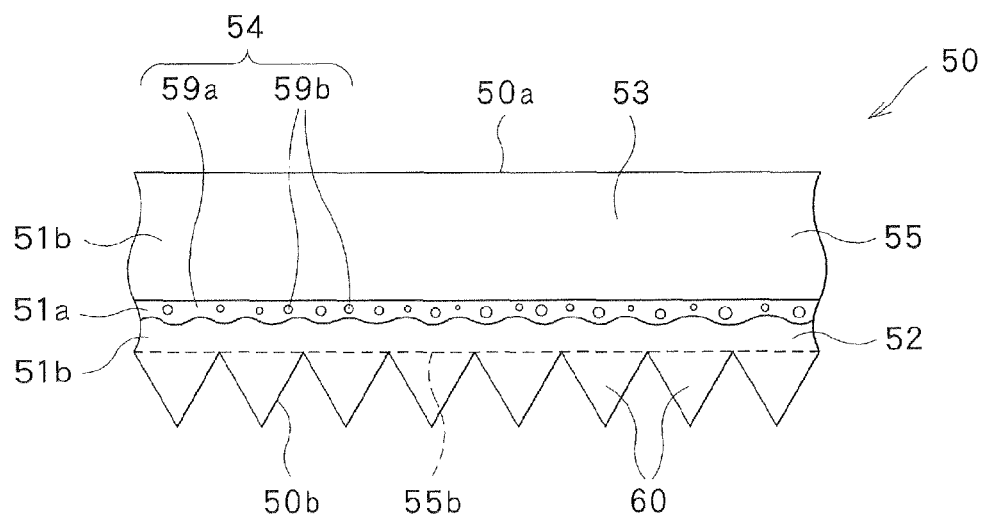
FIG. 19 is a diagram showing a liquid crystal display panel in the same cross-section as FIG. 3, illustrating yet another variation of the protective film.

In the embodiment shown in FIG. 19, the matte layer 54 consisting of the diffusing component 59b and a resin material (matrix 59a) which serves as a binder resin, is formed between the substrate film 53 and a resin material which forms the unit optical elements 60. Thus, in the embodiment shown in FIG. 19, the matter layer 54 is formed on the substrate film 53, and the unit optical elements 60 are formed on the matte layer 54.

When forming such a protective film 50 by molding of a resin which has been applied onto the substrate film 53, the resin on the substrate film 53 may form, in addition to the unit optical elements 60, a land portion 52 lying between the substrate film 53 and the unit optical elements 60 and covering the substrate film 53, as shown in FIGS. 16 through 19. The land portion 52 constitutes part of the body portion 55 of the protective film 50.

Figure 20:
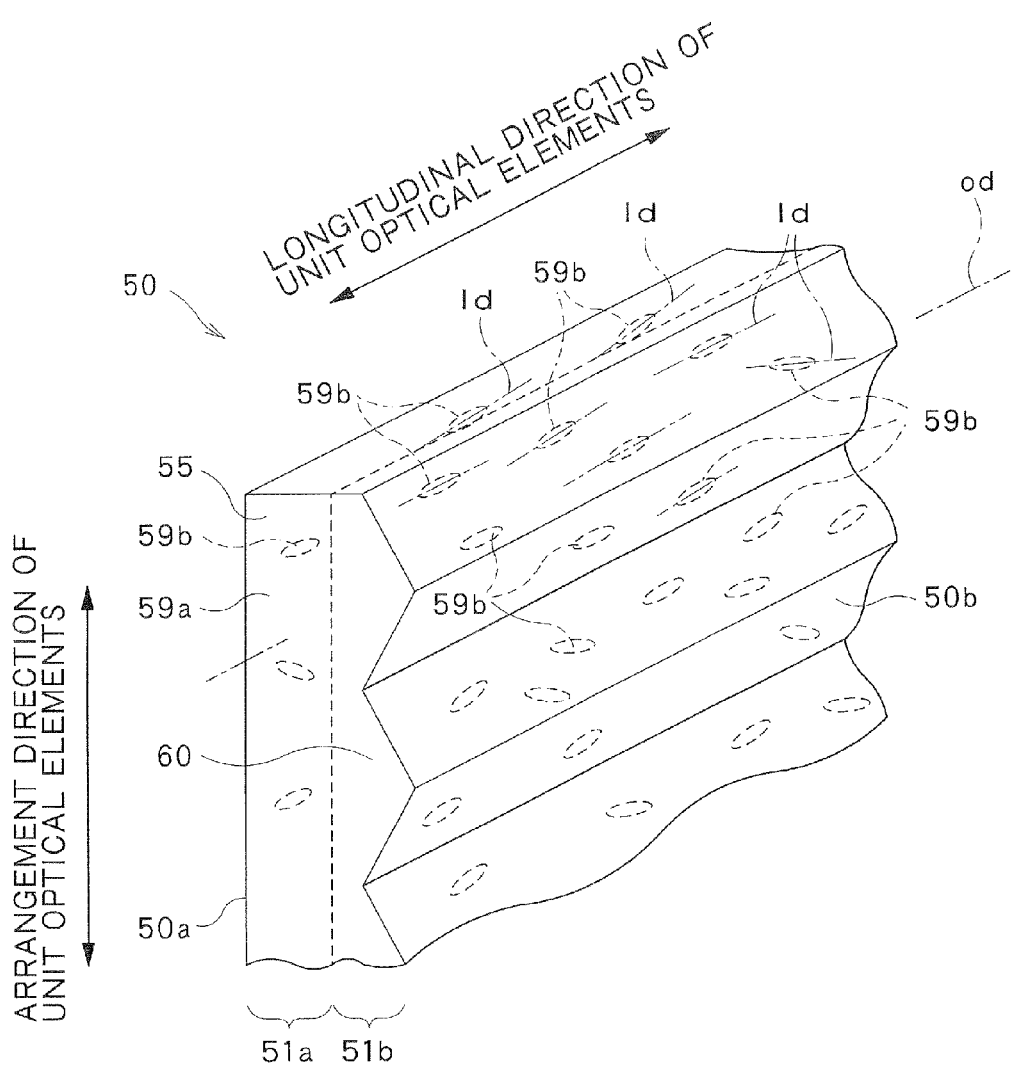
FIG. 20 is a perspective view illustrating yet another variation of the protective film.

The protective films 50 according to the above-described embodiments may have either an isotropic light diffusing function or an anisotropic light diffusing function. For example, as shown in FIG. 20, an anisotropic light diffusing function can be imparted to a protective film 50 by disposing particles (including fibers) of a diffusing component 59b, each having a longitudinal direction ld, in the protective film 50 such that the particles of the diffusing component 59b are oriented in a predetermined direction od. The longitudinal direction of a particle of the diffusing component 59b is herein defined as the direction in which the particle has the longest length. The expression "particles of a diffusing component 59b, each having a longitudinal direction ld, are oriented in a predetermined direction od" herein indicates that the angle between the longitudinal direction ld of each particle of the diffusing component 59b and the predetermined direction od is not less than 0° and not more than 45°, thus meaning that the particles of the diffusing component 59b are disposed with directional regularity with respect to the predetermined direction od.

The protective film 50 shown in FIG. 20 can be produced by the above-described extrusion processing using particles of the diffusing component 59b, each having a longitudinal direction, as a material together with a resin material for the matrix 59a. When the particles of the diffusing component 59b, together with the resin material, pass through a die of an extruder, the particles are directed under a high pressure such that the longitudinal direction ld aligns with the extrusion direction (machine direction). Consequently, the particles of the diffusing component 59b in the extrudate are dispersed such that they are oriented in the particular direction od. The orientation direction of the diffusing component 59b is parallel to the longitudinal direction of the linear unit optical elements 60 arranged in parallel.

The particles of the diffusing component 59b, each having a longitudinal direction ld, may be of various particle shapes, such as a plate-like shape, a rice-like shape, an acicular shape, a scale-like shape, a microplate-like shape, etc. An example of such a diffusing component 59b is air bubbles having an average aspect ratio (average value of the ratio of the length of a particle of the diffusing component 59b in the longitudinal direction ld to the length of the particle in a direction perpendicular to the longitudinal direction) of not less than 1.5 and not more than 50 and an average particle diameter (average value of the volume equivalent diameters of particles of the diffusing component 59b) of not less than 0.5 μm and not more than 100 μm. Other examples of the diffusing component 59b may include organic fibers, e.g. heat-resistant organic fibers such as aramid fibers, wholly aromatic polyester fibers and polyimide fibers; inorganic fibers, e.g. fibrous fillers such as glass fibers, silica fibers, alumina fibers and zirconia fibers; a thin plate-like filler (mica); and amorphous fillers, e.g. inorganic white pigments such as silica, calcium carbonate, magnesium hydroxide, clay, talc and titanium dioxide.

A particle of the diffusing component 59b having a longitudinal direction ld has a stronger light diffusing effect in a direction perpendicular to the longitudinal direction than in a direction parallel to the longitudinal direction. Accordingly, in the embodiment shown in FIG. 20 in which the particles of the diffusing component 59b, each having a longitudinal direction ld, are oriented in a direction parallel to the longitudinal direction of the unit optical elements 60, the light diffusing function of the light diffusing layer 51a of the protective film 50 is stronger in a direction parallel to the arrangement direction of the unit optical elements 60 than in a direction parallel to the longitudinal direction of the unit optical elements 60. Thus, in the embodiment shown in FIG. 20, the direction in which the light condensing effect of the protective film 50 is mainly exerted coincides with the direction in which the light diffusing function is mainly exerted. Accordingly, the profile of the angular distribution of luminance can be made gentler selectively in a plane in which the light condensing function of the unit optical elements 60 is exerted. This eliminates the need to excessively diffuse light that has entered the protective film 50, enabling efficient use of light.

Figure 23:
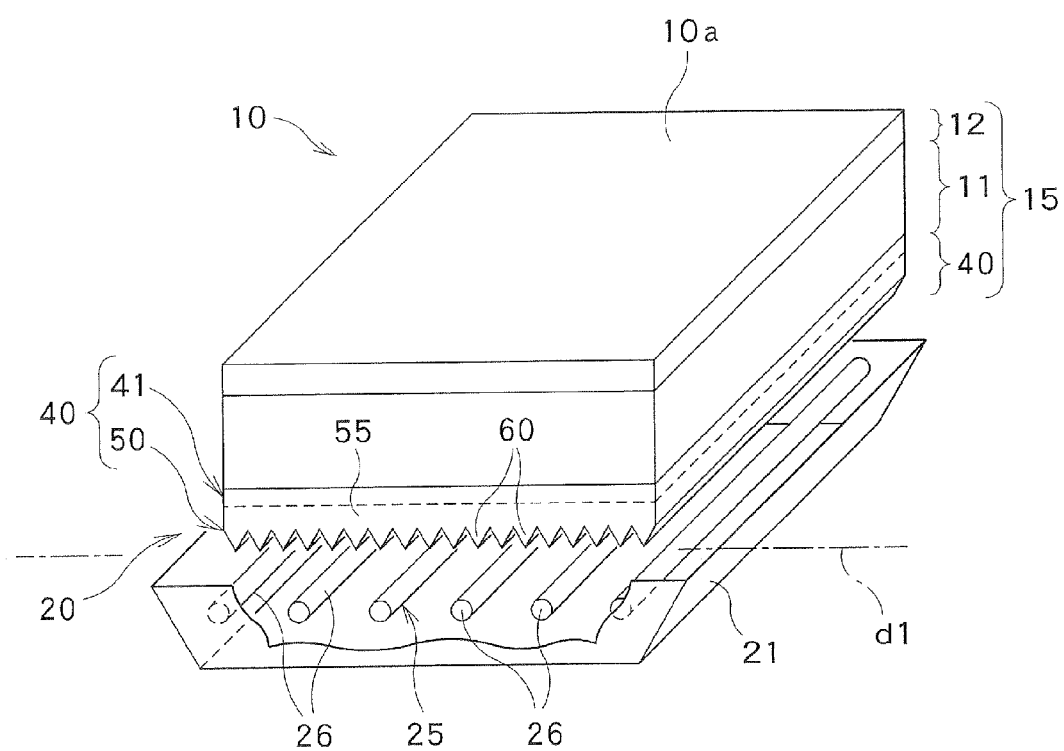
FIG. 23 is a diagram corresponding to FIG. 1, illustrating a variation of the light emitter of the light source.

When the light source 25 is comprised of linear cold cathode fluorescent lamps 26 arranged in parallel as in the below-described embodiment shown in FIG. 23, variation of brightness due to the arrangement of the light emitters 26 can be eliminated only by diffusing light in the arrangement direction of the cold cathode fluorescent lamps 26. The protective film 50 shown in FIG. 20 can therefore be used especially preferably for such a light source.

Figure 21:
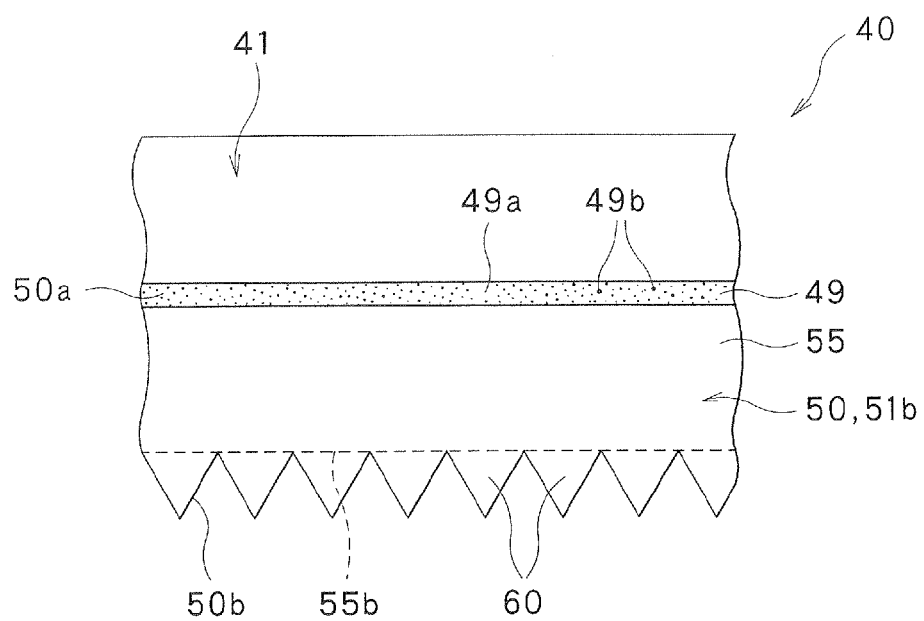
FIG. 21 is a diagram showing a polarizing plate in the same cross-section as FIG. 3, illustrating yet another variation of the protective film.

Though in the above-described embodiment the protective film 50 is bonded to the polarizer 41 by water bonding, it is also possible to dispose an adhesive layer 49, containing an adhesive 49*a* and a diffusing component 49*b* dispersed in the adhesive 49*a*, between the protective film 50 and the polarizer 41 as shown in FIG. 21. According to the embodiment shown in FIG. 21, the degree of the light diffusing function of the adhesive layer 49 can be arbitrarily adjusted independently of whether the protective film 50 has a light diffusing function or not and of the degree of the light diffusing function. The degree of the light diffusing function of the lower polarizing plate 40 can therefore be designed more freely. The same materials as described above with reference to the diffusing component 59*b* of the protective film 50 can be used as the diffusing component 49*b* of the adhesive layer 49. The degree of the light diffusing function of the adhesive layer 49 can be arbitrarily adjusted by the same method as described above with reference to the degree of the light diffusing function of the protective film 50.

The light diffusing function of the adhesive layer 49 may be either isotropic or anisotropic. When the adhesive layer 49 has an anisotropic light diffusing function, the light diffusing function of the adhesive layer 49 may be strongly exerted either in a direction parallel to the arrangement direction (in which the light condensing function is strong) of the unit optical elements 60 as in the embodiment shown in FIG. 20, or in a direction parallel to the longitudinal direction (in which the light condensing function is not strong) of the unit optical elements 60.

Though in the above-described embodiment the lower polarizing plate 40 consists of the polarizer 41 and the protective film 50 joined to the light entrance side of the polarizer 41, a protective film, e.g. a TAC film, may be provided also on the light exit side of the polarizer 41. In some cases, a phase plate for compensating for a phase difference of light is provided between the lower polarizing plate 40 and the liquid crystal cell 11. In that case, the protective film on the light exit side of the lower polarizing plate 40 may serve also as a protective film on the light entrance side of the phase plate. Further, as shown in FIG. 22, the lower polarizing plate 40 may further include a member located on the light entrance side of the polarizer 41.

Figure 22:
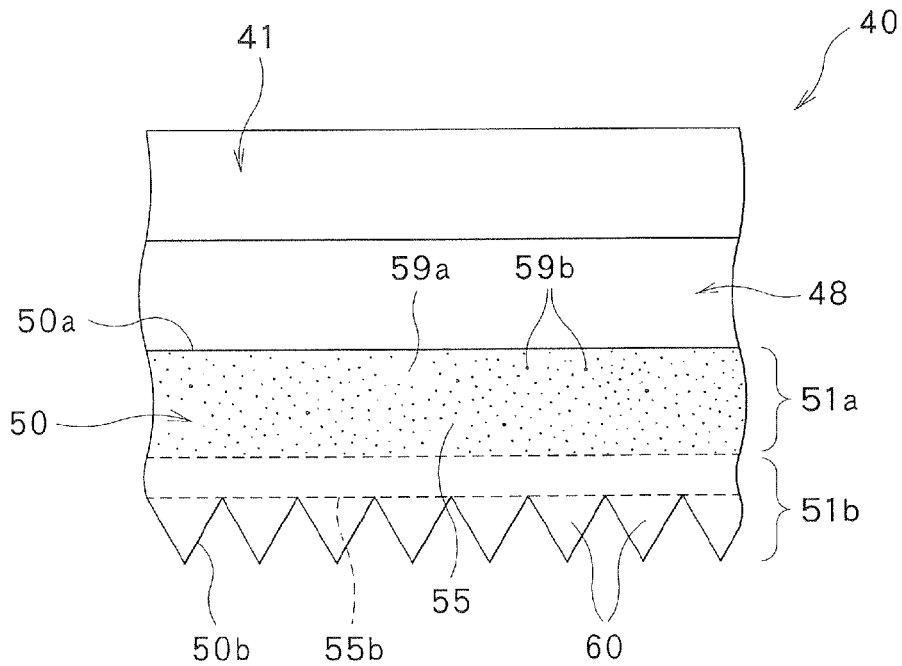
FIG. 22 is a diagram showing a polarizing plate in the same cross-section as FIG. 3, illustrating yet another variation of the protective film.

In the embodiment shown in FIG. 22, a polarization separation film 48, having a polarization separation function that transmits a particular polarization component and reflects the other polarization component(s) back toward the light source, is provided as an intermediate film 48 between the protective film 50 and the polarizer 41. Thus, the provision of the polarization separation film 48 enables a particular polarization component, which can pass through the polarizer 41, to selectively enter the polarizer 41 while turning the other polarization component(s) back toward the light source. The light which has turned back can later change the polarization state e.g. by reflection and re-enter the polarization separation film 48. A film "DBEF" (registered trademark), available from 3M Company, the United States, can be used as the polarization separation film 48 which can serve to increase luminance. A high-luminance polarization sheet "WRPS", available from Shinwha Intertek Co., Ltd., Korea, a wire grid polarizer, etc. can also be used as the polarization separation film 48.

A light diffusing sheet having a light diffusing function may be provided as the intermediate film 48 between the polarizer 41 and the protective film 50 of the lower polarizing plate 40. The light diffusing sheet may have either an isotropic light diffusing function or an anisotropic light diffusing function. When the light diffusing sheet has an anisotropic light diffusing function, the light diffusing function of the light diffusing sheet may be strongly exerted either in a direction parallel to the arrangement direction (in which the light condensing function is strong) of the unit optical elements 60 as in the embodiment shown in FIG. 20, or in a direction parallel to the longitudinal direction (in which the light condensing function is not strong) of the unit optical elements 60.

Though in the above-described embodiment the light emitters 26 of the light source 25 of the optical module 20 are point-like emitters, typically light emitting diodes, arranged two-dimensionally, it is possible to use various other types of known light emitters, such as cold cathode fluorescent lamps, a planar EL (electroluminescent) emitter, etc., as a light emitter(s) 26. FIG. 23 shows an embodiment which uses linear cold cathode fluorescent lamps as the light emitters 26. In the embodiment shown in FIG. 23, the linear cold cathode fluorescent lamps as the light emitters 26 are parallel to each other and arranged in a predetermined arrangement direction. The arrangement direction of the linear cold cathode fluorescent lamps is parallel to the arrangement direction of the unit optical elements 60 of the protective film 50. As described above with reference to the preceding embodiment, according to this embodiment, the unit optical elements 60 can reduce in-plane variation of luminance caused by the arrangement of the cold cathode fluorescent lamps 26, thereby making the images of the cold cathode fluorescent lamps 26 hardly visible.

Figure 24:
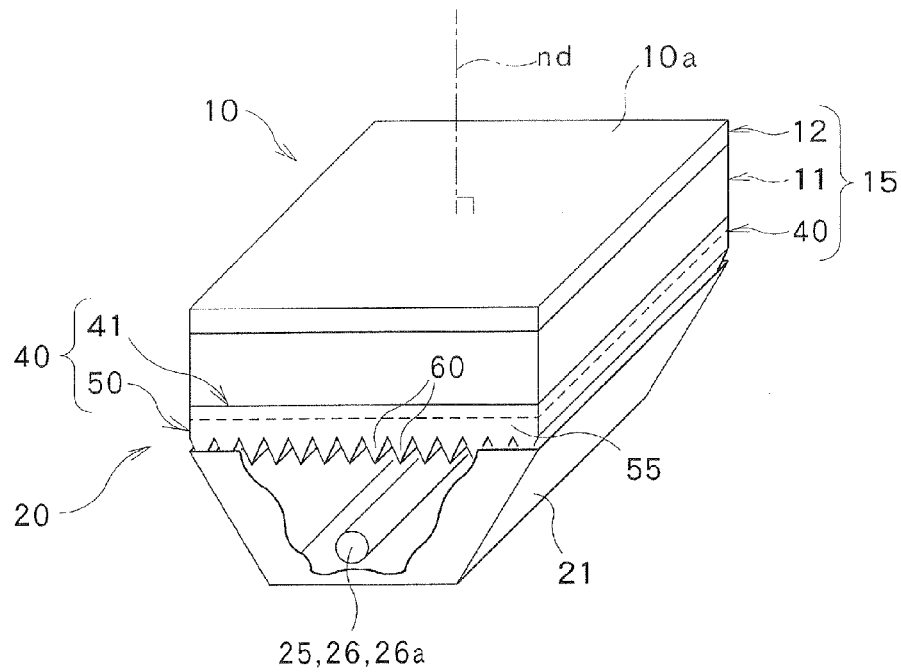
FIG. 24 is a diagram corresponding to FIG. 1, illustrating another variation of the light emitter of the light source.
Figure 25:
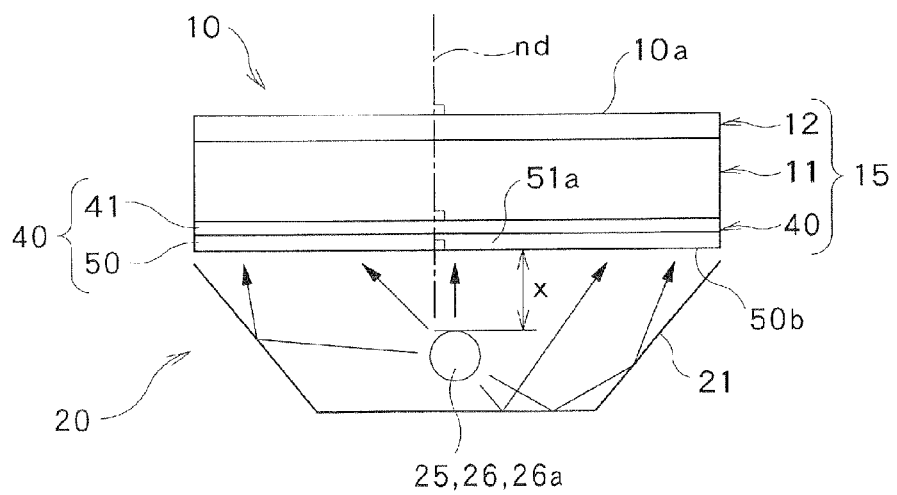
FIG. 25 is a cross-sectional side view showing the schematic construction of a variation of the optical module.

Though in the above-described embodiment the point-like light emitters 26 are arranged two-dimensionally, it is possible to arrange point-like light emitters in a line, especially in a straight line. Alternatively, as shown in FIGS. 24 and 25, the light source 25 may be comprised of a single linear light emitter 26*a*, e.g. a cold cathode fluorescent lamp. By using a single linear light emitter 26*a* as the light source 25 and disposing the linear light emitter 26*a* in the center of a plane which is parallel to and which directly faces the liquid crystal display panel 15, i.e. disposing the linear light emitter 26*a* such that it extends in a position directly facing the center of the liquid crystal display panel 15, brightness, typically the front direction luminance, can be increased in the center of the display surface 10*a* where the brightness is most sensitively perceived by a viewer. Thus, according to this variation, the construction of the light source 25 can also effectively improve brightness.

In addition, when the light source 25 is comprised of a single linear light emitter 26*a*, in-plane variation of brightness as perceived by a viewer can be effectively obscured. When a light emitter is disposed under the liquid crystal display panel 15, the display surface 10*a* is most likely to be brightest at a position just above the light emitter. Accordingly, when a plurality of light emitters, arranged at a considerable distance from each other, are disposed under the liquid crystal display panel 15, there will generally be bright areas on the display surface 10a at positions corresponding to the positions of the light emitters. Such in-plane variation of brightness is likely to be sensitively perceived by a viewer. On the other hand, when the linear light emitter 26a extends in a position directly facing the center of the liquid crystal display panel 15, an in-plane distribution of brightness will be produced in which the display surface 10a is brightest in the center where brightness is most sensitively perceived by a viewer, and the brightness of the display surface 10a decreases with distance from the center, and therefore the display surface 10a is dark in the peripheral area where brightness is insensitively perceived by a viewer. According to such an in-plane distribution of brightness, in-plane variation of brightness as perceived by a viewer can be solved more effectively than an evaluation which is made based on actual luminance measurement values.

Three types of optical modules, samples 1 to 3, were produced by the present inventors. For each of the samples, the distribution of luminance on the light exit-side surface of the optical module was measured. The results of the measurement are shown in FIGS. 26 through 31. The optical modules tested each consisted of a light source comprised of a single cold cathode fluorescent lamp, a polarizing plate disposed in a position directly facing the cold cathode fluorescent lamp, and a reflective plate which covers the light source from the back, as shown in FIG. 25. As shown in FIG. 13, the polarizing plate was composed of a protective film consisting solely of a light diffusing layer (i.e. having no unit optical elements) disposed in a position directly facing the cold cathode fluorescent lamp, and a polarizer joined to the protective film. The light diffusing layer was composed of a resin matrix and light diffusing particles (diffusing component) dispersed in the matrix. The refractive index of the matrix of the light diffusing layer and the refractive index of the light diffusing particles (diffusing component) were varied among the samples 1 to 3 as shown in Table 1 below. The other construction of the light diffusing layer, e.g. the concentration of the light diffusing particles, the thickness of the light diffusing layer, etc., was made the same among the samples 1 to 3. Further, the construction of each optical module other than the light diffusing layer (protective film), i.e. the construction of the polarizer, the light source and the reflective plate, was made the same among the samples 1 to 3.

TABLE 1

Samples 1-3 and evaluation results

Figure 26:
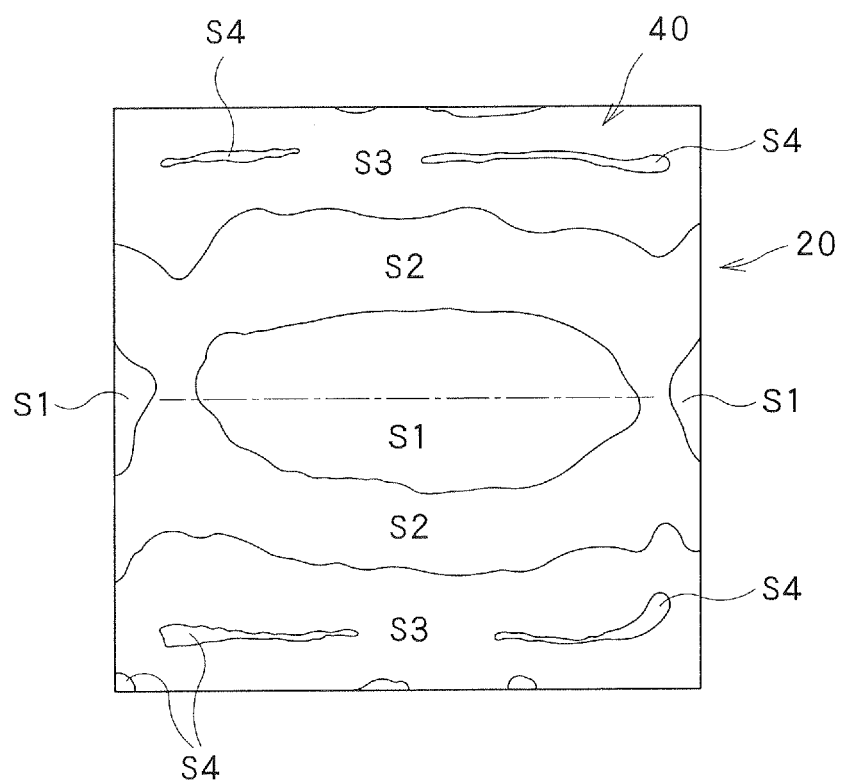
FIG. 26 is a diagram showing the in-plane distribution of front direction luminance on the light exit-side surface of a polarizing plate provided in an optical module (sample 1), the polarizing plate including, as a protective film, a light diffusing layer in which the refractive index of a diffusing component is lower than the refractive index of a matrix.
Figure 27:
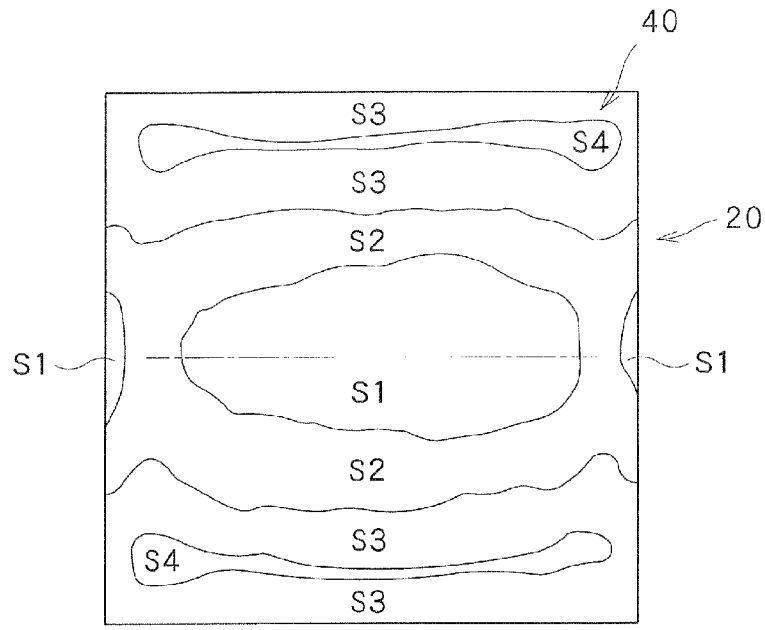
FIG. 27 is a diagram showing the in-plane distribution of front direction luminance on the light exit-side surface of a polarizing plate provided in an optical module (sample 2), the polarizing plate including, as a protective film, a light diffusing layer in which the refractive index of a diffusing component is higher than the refractive index of a matrix.
Figure 28:
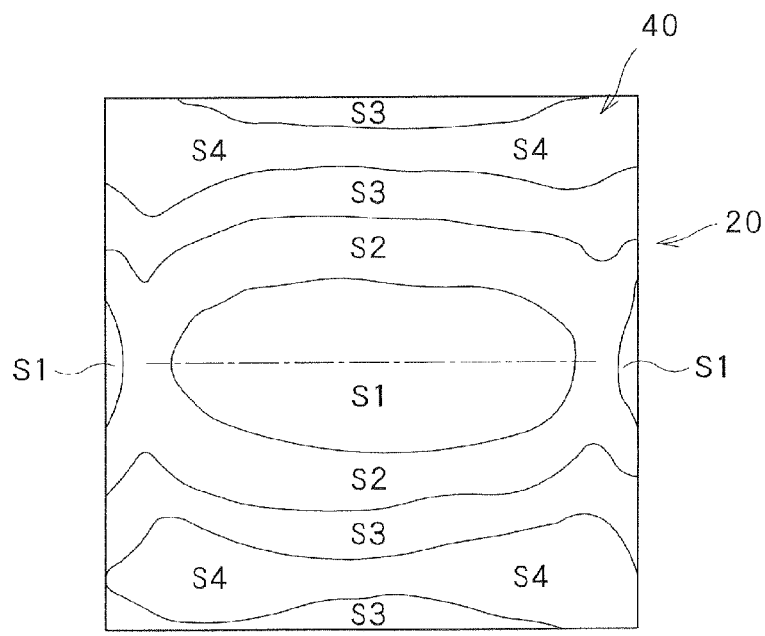
FIG. 28 is a diagram showing the in-plane distribution of front direction luminance on the light exit-side surface of a polarizing plate provided in an optical module (sample 3), the polarizing plate including, as a protective film, a light diffusing layer in which the refractive index of a diffusing component is equal to the refractive index of a matrix.
Figure 29:
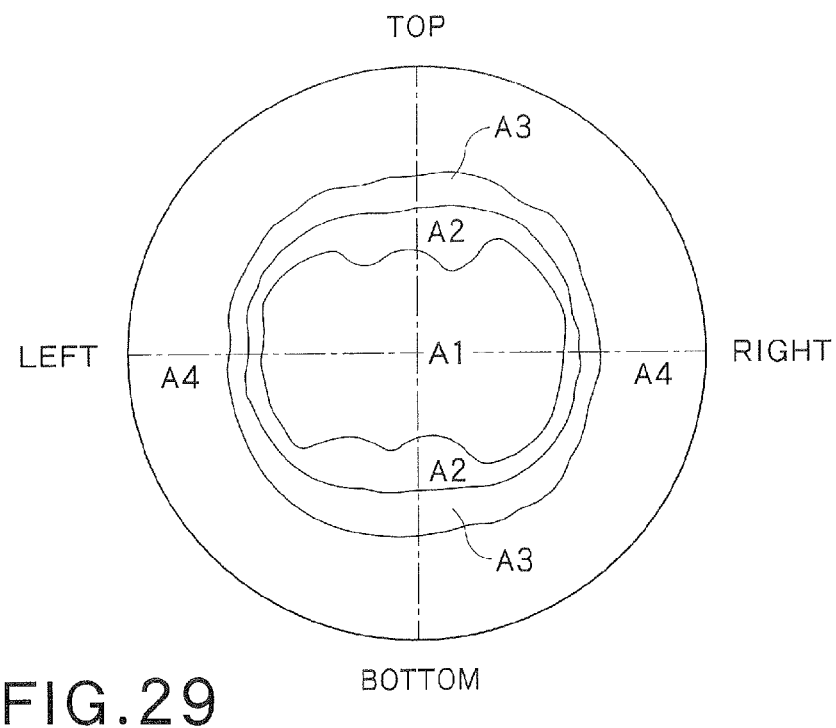
FIG. 29 is a diagram showing the angular distribution of luminance, measured in the center of the light exit-side surface of a polarizing plate provided in an optical module (sample 1), the polarizing plate including, as a protective film, a light diffusing layer in which the refractive index of a diffusing component is lower than the refractive index of a matrix.
Figure 30:
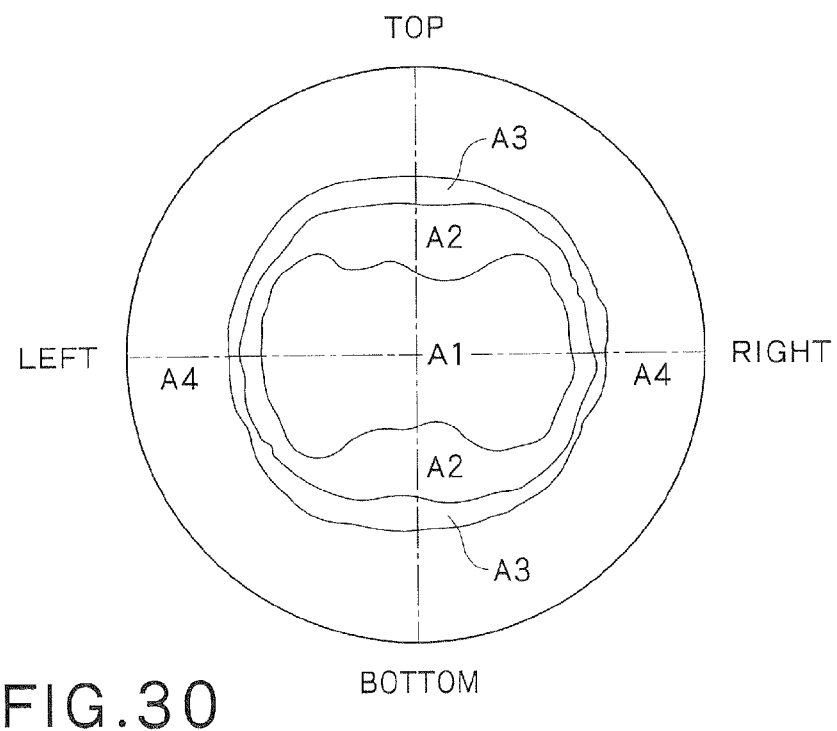
FIG. 30 is a diagram showing the angular distribution of luminance, measured in the center of the light exit-side surface of a polarizing plate provided in an optical module (sample 2), the polarizing plate including, as a protective film, a light diffusing layer in which the refractive index of a diffusing component is higher than the refractive index of a matrix.
Figure 31:
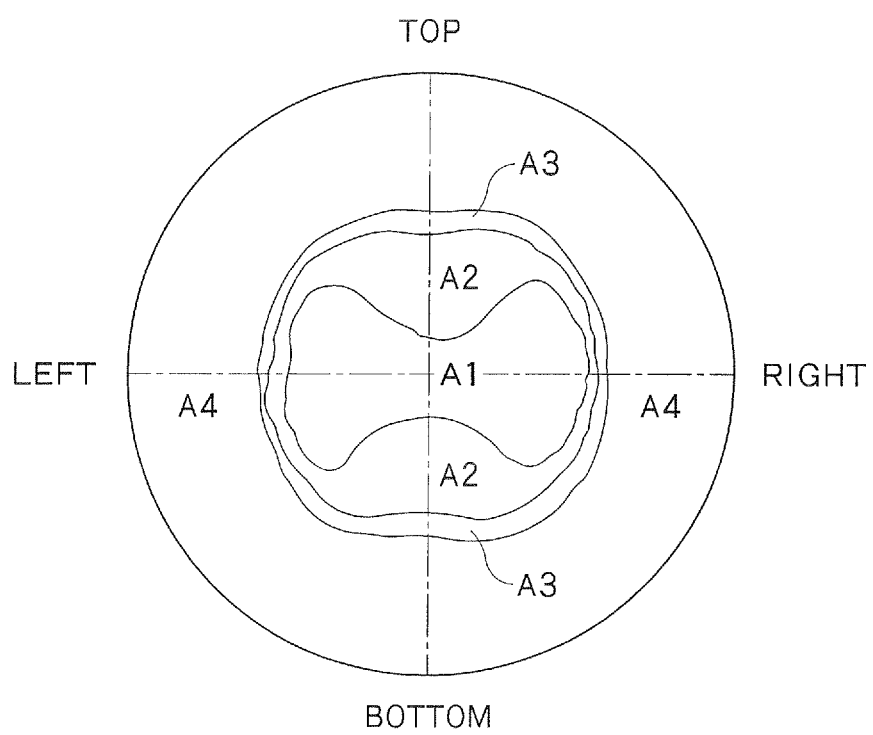
FIG. 31 is a diagram showing the angular distribution of luminance, measured in the center of the light exit-side surface of a polarizing plate provided in an optical module (sample 3), the polarizing plate including, as a protective film, a light diffusing layer in which the refractive index of a diffusing component is equal to the refractive index of a matrix.

| | | Sample 1 | Sample 2 | Sample 3 |
|---|---|---|---|---|
| Refractive index | Matrix | 1.59 | 1.50 | 1.59 |
| | Diffusing component | 1.50 | 1.59 | 1.59 |
| Front direction luminance ratio [%] | | 100 | 90 | 100 |
| Horizontal direction half-value angle [°] | | 108 | 108 | 94 |
| vertical direction half-value angle [°] | | 94 | 94 | 86 |
| In-plane distribution of front direction luminance | | FIG. 26 | FIG. 27 | FIG. 28 |
| Angular distribution of luminance in the center | | FIG. 29 | FIG. 30 | FIG. 31 |

FIGS. 26 through 28 show the in-plane distributions of front direction luminance (luminance measured in the normal direction of the plate plane of the polarizing plate), measured for the optical modules of the samples 1 to 3, respectively. In FIGS. 26 through 28, the boxed areas each represent an area on the polarizing plate which, when the optical module is incorporated in a display device, will face a display surface 10a lying over the polarizing plate. The dashed-dotted line in each boxed area indicates a position of the single linear cold cathode fluorescent lamp lying under the area. The front direction luminance was measured at various positions on the light exit-side surface (opposite from the surface facing the cold cathode fluorescent lamp) of the polarizing plate of each sample, and the ratios of the measured values to the maximum measured value of the front direction luminance are shown in FIG. 26 through 28. In the Figures, S1 indicates an area where the measured front direction luminance is not less than 75% and not more than 100% of the maximum front direction luminance value; S2 indicates an area where the measured front direction luminance is not less than 50% and less than 75% of the maximum front direction luminance value; S3 indicates an area where the measured front direction luminance is not less than 25% and less than 50% of the maximum front direction luminance value; and S4 indicates an area where the measured front direction luminance is not less than 0% and less than 25% of the maximum front direction luminance value.

FIGS. 29 through 31 each show the angular distribution of luminance, measured in varying measurement directions on the center of the light exit-side surface of the optical module of each of the samples 1 to 3 and expressed in terms of the ratios of the measured luminance values to the front direction luminance. In each of the circular graphs of FIGS. 29 through 31, the distribution of luminance in the direction connecting the "left" and the "right" represents the angular distribution of luminance measured in varying measurement directions in a horizontal plane (parallel to the direction in which the linear cold cathode fluorescent lamp extends in the optical module). Similarly, in each circular graph the distribution of luminance in the direction connecting the "top" and the "bottom" represents the angular distribution of luminance measured in varying measurement directions in a vertical plane (perpendicular to the longitudinal direction of the linear cold cathode fluorescent lamp of the optical module). The center of each circular graph represents the luminance measured in the front direction; and the measurement angle (angle between the front direction and a direction in which luminance is measured) increases with distance from the center of the circular graph. In FIGS. 29 through 31, A1 indicates an angular area where the measured luminance is not less than 75% and not more than 100% of the measured front direction luminance value; A2 indicates an angular area where the measured luminance is not less than 50% and less than 75% of the measured front direction luminance value; A3 indicates an angular area where the measured luminance is not less than 25% and less than 50% of the measured front direction luminance value; and A4 indicates an angular area where the measured luminance is not less than 0% and less than 25% of the measured front direction luminance value.

Table 1 shows the relative ratios of the measured front direction luminance values of the samples 1 to 3. Table 1 also shows the half-value angle in the angular distribution of luminance measured in the vertical plane ("vertical direction half-value angle"), i.e. the angular range of the measurement direction in the vertical plane in which at least one-half of the front direction luminance value is ensured, for each of the samples 1 to 3. Similarly, Table 1 shows the half-value angle in the angular distribution of luminance measured in the horizontal plane ("horizontal direction half-value angle"), i.e.

the angular range of the measurement direction in the horizontal plane in which at least one-half of the front direction luminance value is ensured, for each of the samples 1 to 3.

As demonstrated by the results shown in FIGS. 26 through 31 and in Table 1, compared to the use, as a protective film, of the light diffusing layer in which the refractive index of the diffusing component is higher than the refractive index of the matrix (sample 2), and to the use of the light diffusing layer in which the refractive index of the diffusing component is equal to the refractive index of the matrix (sample 3), the front direction luminance can be increased and the viewing angle can be broadened by using, as a protective film 50, the light diffusing layer 51a in which the refractive index of the diffusing component 59b is lower than the refractive index of the matrix 59a (sample 1). This indicates that the use, as a protective film 50, of a light diffusing layer 51a in which the refractive index of the diffusing component 59b is lower than the refractive index of the matrix 59a, makes it possible to use light, emitted by a light emitter(s) of a light source, with high efficiency.

Besides the results shown in FIGS. 26 through 31, it has been found that the in-plane variation of brightness and the angular variation of brightness can be reduced also in visual evaluation by using, as a protective film 50, the light diffusing layer 51a in which the refractive index of the diffusing component 59b is lower than the refractive index of the matrix 59a (sample 1), as compared to the use, as a protective film, of the light diffusing layer in which the refractive index of the diffusing component is higher than the refractive index of the matrix (sample 2), and to the use of the light diffusing layer in which the refractive index of the diffusing component is equal to the refractive index of the matrix (sample 3).

As described above, according to this variation, the efficiency of the use of light from the light source 25 can be optically improved, making it possible to appropriately adjust the optical properties. In particular, the optical properties can be controlled e.g. by adjusting the degree of a light diffusing function that the light diffusing layer 51a can exert, the distance x (see FIG. 25) from the linear light emitter 26a of the light source 25 to the polarizing plate 40, etc. Optical modules 20 as shown in FIG. 25 were produced by the present inventors. For each of the optical modules 20, research was conducted to determine the influence of the degree of diffusion of the light diffusing layer 51a and the distance x (see FIG. 25) from the linear light emitter 26a to the polarizing plate 40 on the front direction luminance and the in-plane distribution of brightness. The results of the research are shown in Table 2 below.

The optical modules tested, samples A to F, each consisted of a light source comprised of a single cold cathode fluorescent lamp, a polarizing plate disposed in a position directly facing the cold cathode fluorescent lamp, and a reflective plate which covers the light source from the back, as shown in FIG. 25. As shown in FIG. 13, the polarizing plate was composed of a protective film consisting solely of a light diffusing layer disposed in a position directly facing the cold cathode fluorescent lamp, and a polarizer joined to the protective film. The light diffusing layer was composed of a resin matrix and light diffusing particles (diffusing component) dispersed in the matrix. The refractive index of the matrix of the light diffusing layer and the refractive index of the light diffusing particles (diffusing component), and the thickness of the light diffusing layer were varied among the samples A to F as shown in Table 2 below. The other construction of the light diffusing layer, e.g. the concentration of the light diffusing particles, was made the same among the samples A to F. As shown in FIG. 2, the distance x from the linear light emitter 26a of the light source 25 to the polarizing plate 40 along the normal direction of the plate plane of the polarizing plate 40 were set at 50 mm in the samples A to C and 100 mm in the samples D to F.

For each of the optical modules of the samples A to F, brightness (front direction luminance) on the light exit-side surface was evaluated. The results of evaluation are shown in the column "brightness" in Table 2. The symbol ⊚ indicates highest brightness, and the brightness decreases in the order of ⊚→○→Δ. Furthermore, for each of the optical modules of the samples A to F, the degree of variation of brightness on the light exit-side surface was evaluated. The results of evaluation are shown in the column "variation" in Table 2. The symbol ⊚ indicates least variation of brightness, and the degree of variation increases in the order of ⊚→○→Δ.

As demonstrated by the results in Table 2, there is a tendency that when the degree of diffusion of the light diffusing layer 51a is increased, the in-plane variation of luminance is reduced though the front direction luminance decreases. In contrast, when the degree of diffusion of the light diffusing layer 51a is decreased, the front direction luminance increases though the in-plane variation of luminance becomes larger. On the other hand, there is a tendency that when the distance x from the linear light emitter 26a to the polarizing plate 40 is increased, the in-plane variation of luminance is reduced though the front direction luminance decreases. In contrast, when the distance x from the linear light emitter 26a to the polarizing plate 40 is decreased, the front direction luminance increases though the in-plane variation of luminance becomes larger.

TABLE 2

Samples A-F and evaluation results

| | Light diffusing film | | | | Evaluation | |
| | Refractive index | | Thickness | Degree of | Distance x | | |
| | Matrix | Light diffusing particles | [μm] | diffusion | [mm] | Brightness | Variation |
| --- | --- | --- | --- | --- | --- | --- | --- |
| Sample A | 1.59 | 1.49 | 160 | High | 50 | Δ | ⊚ |
| Sample B | 1.59 | 1.49 | 80 | Intermediate | 50 | ⊚ | ⊚ |
| Sample C | 1.59 | 1.52 | 80 | Low | 50 | ⊚ | Δ |
| Sample D | 1.59 | 1.49 | 160 | High | 100 | Δ | ⊚ |
| Sample E | 1.59 | 1.49 | 80 | Intermediate | 100 | ○ | ⊚ |
| Sample F | 1.59 | 1.52 | 80 | Low | 100 | ⊚ | ○ |

Figure 32:
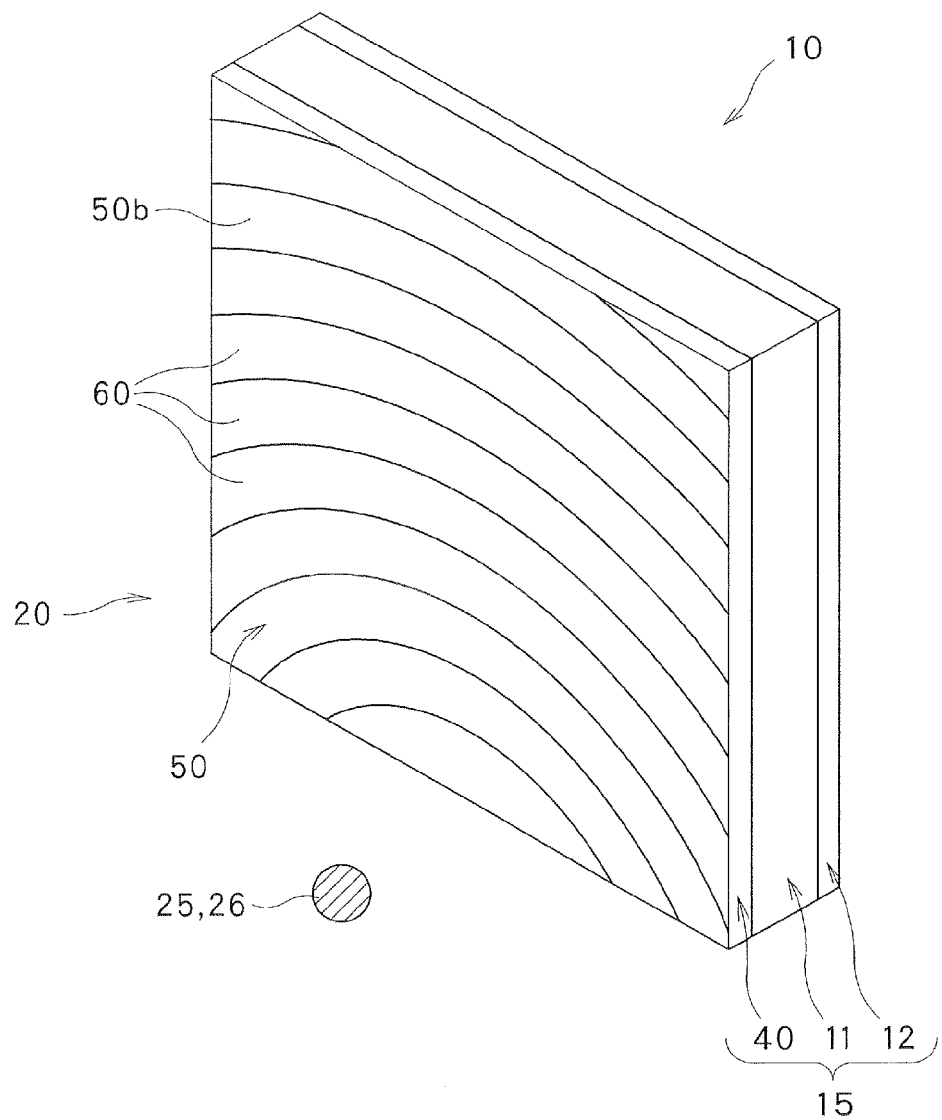
FIG. 32 is a perspective view illustrating yet another variation of the display device and the optical module.
Figure 33:
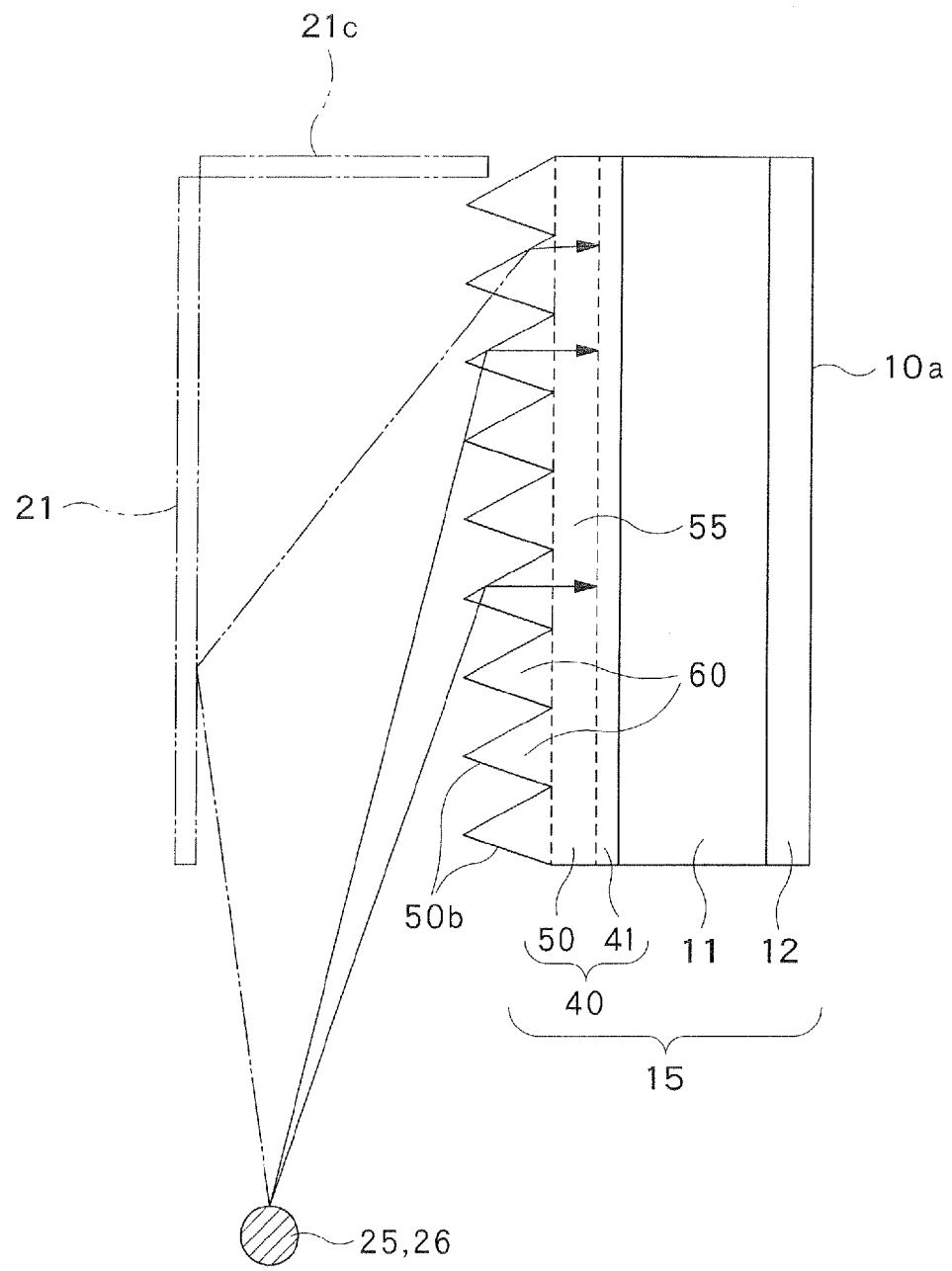
FIG. 33 is a vertical sectional view of the display device of FIG. 32.
Figure 34:
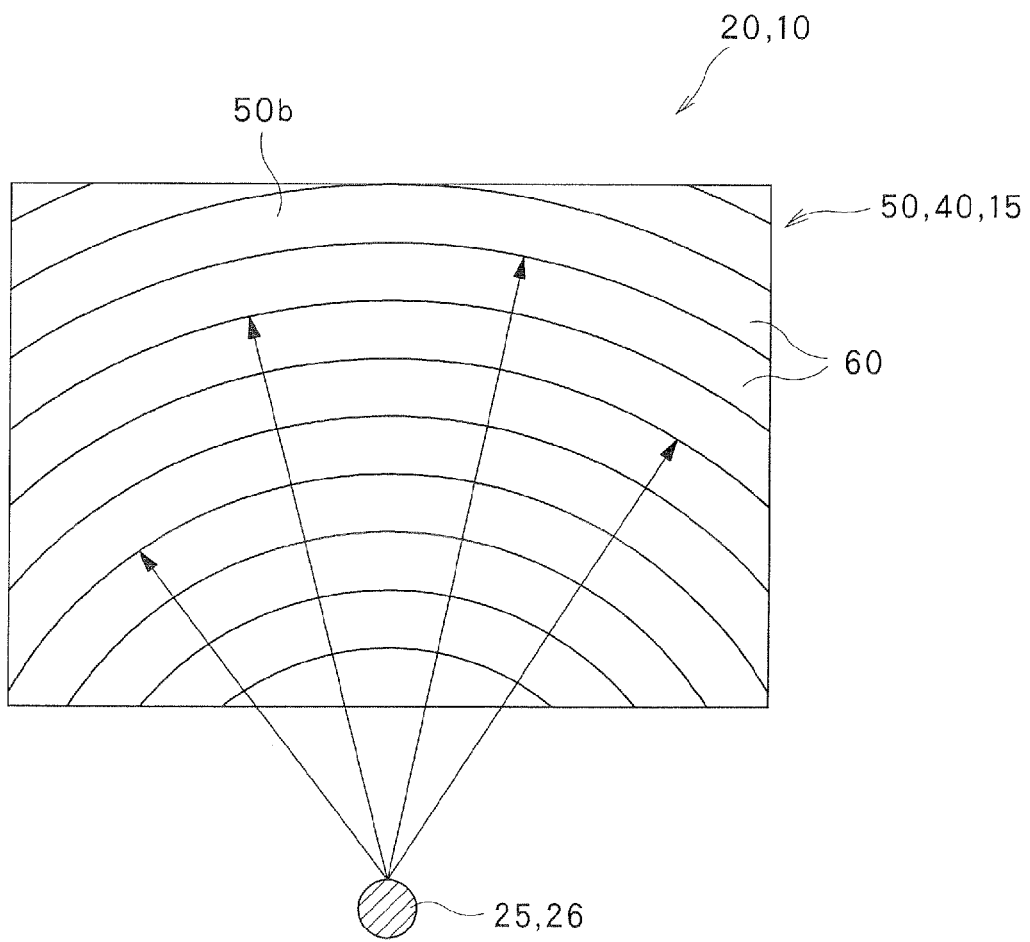
FIG. 34 is a back plan view of the display device of FIG. 32.

Though in the above-described embodiments the light emitter(s) 26 of the light source 25 is disposed in a position directly facing the protective film 50 of the polarizing plate 40, i.e. in a position facing the protective film 50 in the front direction without any other member interposed between them, it is also possible to dispose a light emitter(s) 26 of a light source 25 in a position deviated, in a direction parallel to the film plane of the protective film 50, from an area directly facing the protective film 50 of the lower polarizing plate 40. Thus, as shown in FIGS. 32 through 34, a light emitter 26 may be disposed in a position at a distance from the protective film 50 not only in the normal direction of the film plane of the protective film 50 but also in a direction parallel to the film plane of the protective film 50. In the embodiment shown in FIGS. 32 through 34, the light emitter 26 and the protective film 50 of the polarizing plate 40 are positioned so that light emitted by the light emitter 26 can directly enter the protective film 50 of the polarizing plate 40. In the embodiment shown in FIGS. 32 through 34, the light source 25 is composed of a single point-like light emitter (e.g. LED) 26. In response to such construction of the light source 25, the unit optical elements 60 provided in the protective film 50 shown in FIG. 34 are arranged such that they extend concentrically. The unit optical elements 60 of the protective film 50 shown in FIG. 34 may form a Fresnel lens, in particular a circular Fresnel lens, so that they can exert a higher light condensing function. The variation shown in FIGS. 32 through 34 can achieve the same advantageous effects as the above-described embodiment.

In the variation shown in FIGS. 32 through 34, the protective film 50 may contain the diffusing component 59b or, as in the above-described embodiment, may comprise the resin layer 51b and the light diffusing layer 51a.

Figure 35:
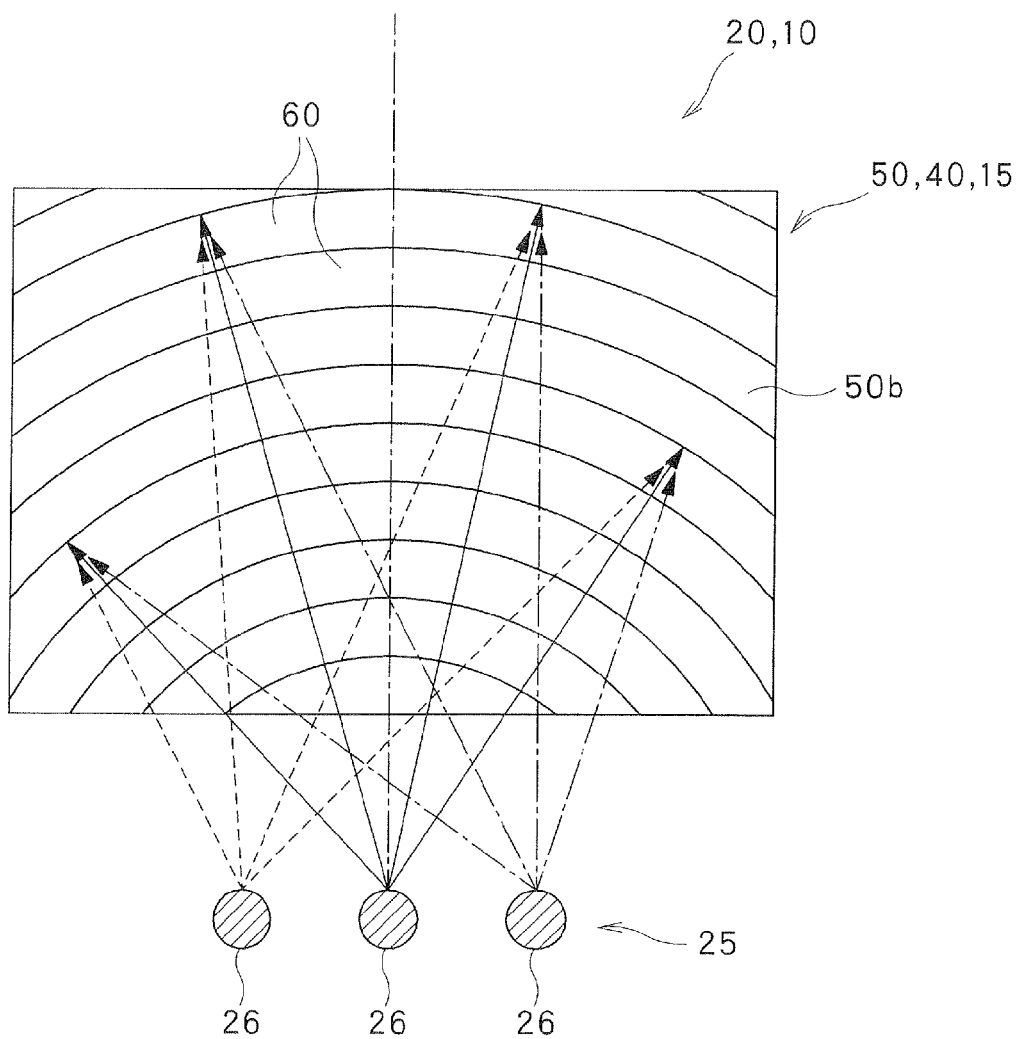
FIG. 35 is a diagram corresponding to FIG. 34, illustrating yet another variation of the display device and the optical module.
Figure 36:
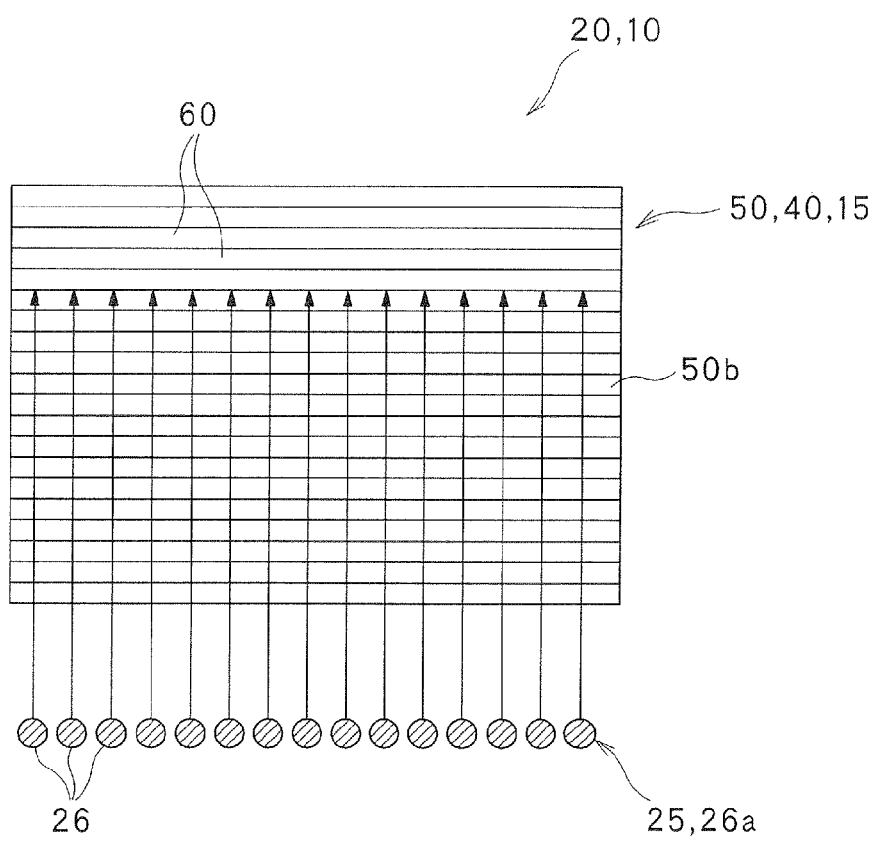
FIG. 36 is a diagram corresponding to FIG. 34, illustrating yet another variation of the display device and the optical module.
Figure 37:
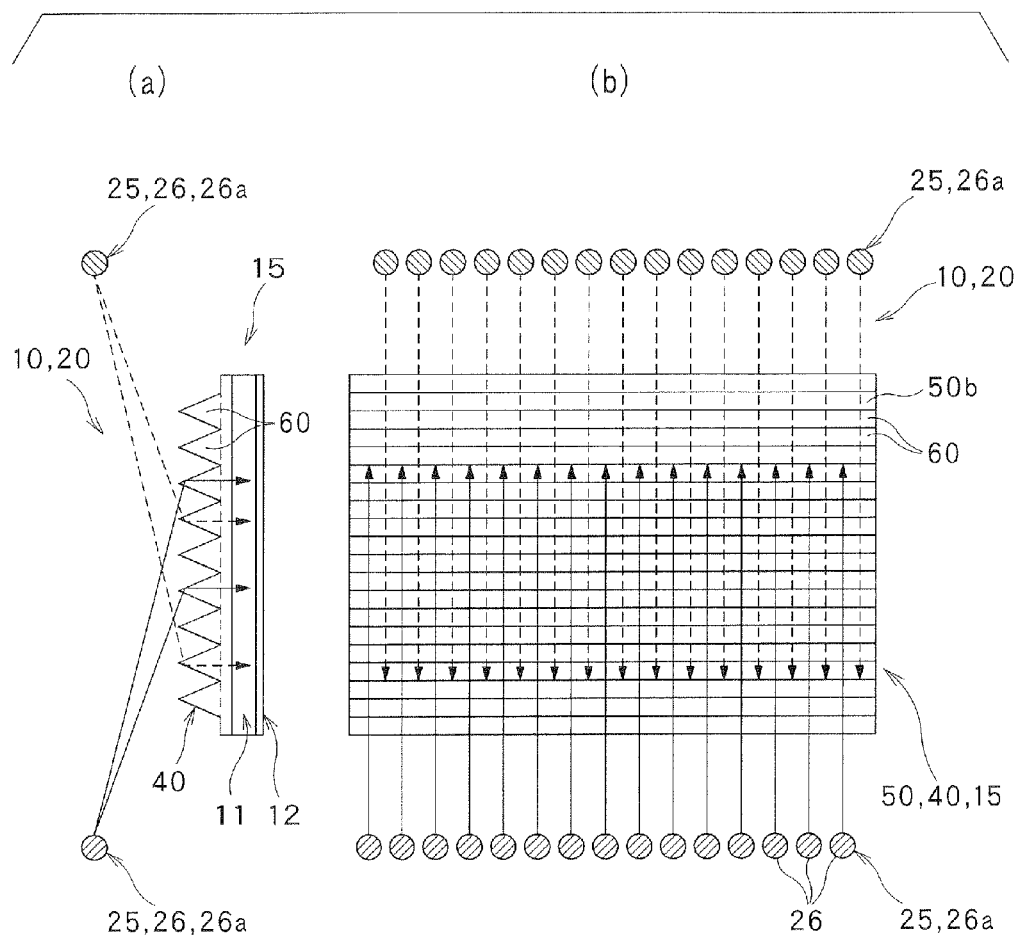
FIGS. 37(a) and 37(b) are diagrams corresponding to FIGS. 33 and 34, respectively, illustrating yet another variation of the display device and the optical module.

It is also possible to arrange light emitters 26 of a light source 25 as shown in FIGS. 35 through 37. In the embodiment shown in FIG. 35, the light source 25 includes a plurality of spaced-apart point-like light emitters 26 arranged in a line. Except for the construction of the light source, the embodiment shown in FIG. 35 has the same construction as the embodiment shown in FIGS. 32 through 34. Therefore, the embodiment shown in FIG. 35 can reduce variation of brightness along the direction in which the light emitters 26 are arranged. In the embodiment shown in FIG. 36, the light source 25 is configured as a linear light emitting part (linear light emitting part) 26a comprising point-like light emitters 26 arranged in a line at a smaller pitch. In the embodiment shown in FIG. 37, the light emitters 26 of the light source 25 are disposed on both sides of the liquid crystal display panel 15 (protective film 50). The light emitters 26 on each side constitute a linear light emitting part 26a. In the embodiments shown in FIGS. 36 and 37, the linear light emitting part 26a may also be comprised of a linear light emitter such as a cold cathode fluorescent lamp. In the embodiments shown in FIGS. 36 and 37, in response to such construction of the light source 25, the unit optical elements 60 of the protective film 50 extend parallel to the linear light emitting part(s) 26a and are arranged in a direction perpendicular to the longitudinal direction of the linear light emitting part(s) 26a. The unit optical elements 60 may constitute a linear Fresnel lens. The embodiments shown in FIGS. 36 and 37 can more effectively reduce variation of brightness in a direction parallel to the longitudinal direction of the linear light emitting part(s) 26a.

In the variations shown in FIGS. 32 through 37, a reflective plate 21 may be provided in a position directly facing the protective film 50 as shown by the two-dot chain lines in FIG. 33. A second reflective plate 21c may further be provided which closes the gap between the protective film 50 and the reflective plate 21 provided in a position directly facing the protective film 50. In that case, some light components of light emitted by the light emitter(s) 26 may enter the protective film 50 after undergoing a change in the traveling direction by the reflective plates 21, 21c. Such an embodiment can achieve the same advantageous effects as the above-described embodiments. Thus, in those embodiments which use a reflective plate(s), a light emitter 26 and the polarizing plate 40 may be positioned so that light emitted by the light emitter 26 can directly enter the protective film 50 of the polarizing plate 40, or light emitted by the light emitter 26, after undergoing a later change in the traveling direction by the reflective plate 21, 21b, 21c, can enter the protective film 50 of the polarizing plate 40, or light emitted by the light emitter 26 can directly enter the protective film 50 of the polarizing plate 40 and light emitted by the light emitter 26, after undergoing a later change in the traveling direction by the reflective plate 21, 21b, 21c, can enter the protective film 50 of the polarizing plate 40.

Figure 38:
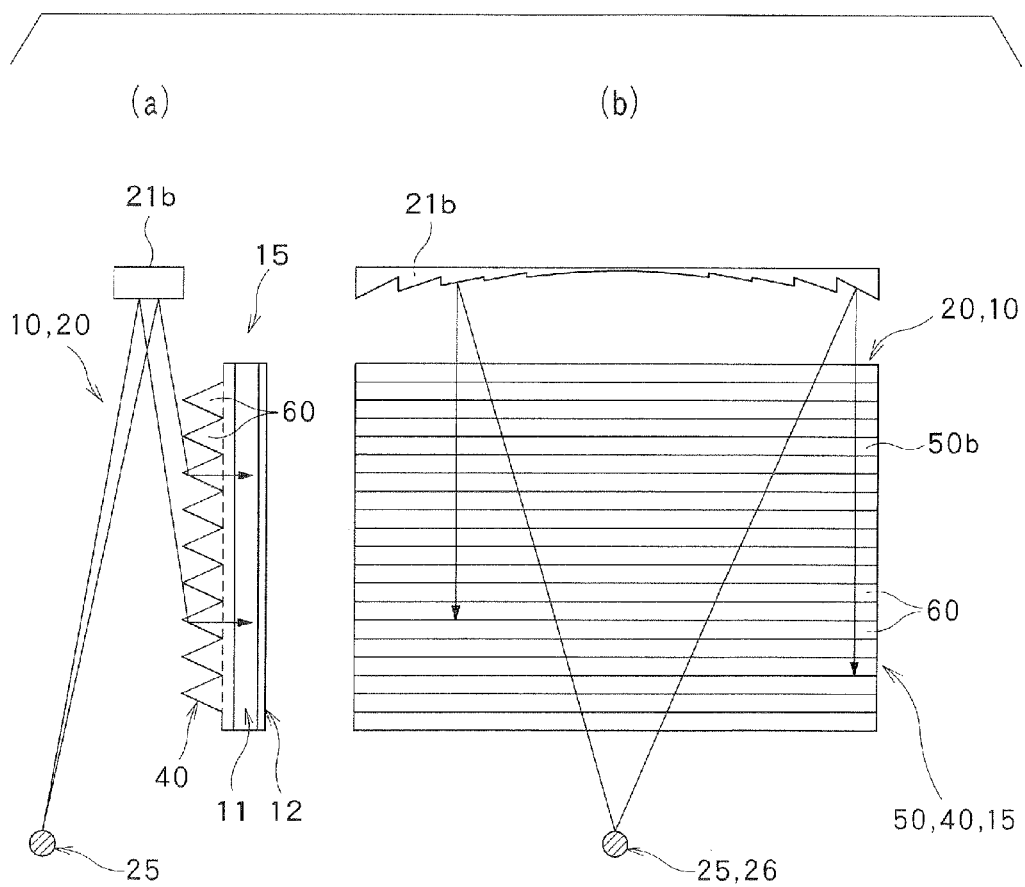
FIGS. 38(a) and 38(b) are diagrams corresponding to FIGS. 33 and 34, respectively, illustrating yet another variation of the display device and the optical module.

In the embodiment shown in FIG. 38, a reflective plate 21b, located in the path of light from a light emitter 26 to the protective film 50, has an anisotropic reflecting function. In the embodiment shown in FIG. 38, the reflective plate 21b is disposed in a position facing the light emitter 26 along the panel plane (the film plane of the protective film 50) of the liquid crystal display panel 15 and on the opposite side of the liquid crystal display panel 15 from the light emitter 26. As with the embodiment shown in FIGS. 32 through 34, the light source 25 is comprised of a single point-like light emitter 26. The direction in which light from the light emitter 26 enters the reflective plate 21b changes with the distance of the incident position from the light emitter 26 in the longitudinal direction of the reflective plate 21b. The reflecting surface of the reflective plate 21b has varying inclination angles so that light, radially emitted by the light emitter 26, can be reflected as approximately parallel light rays. This embodiment can effectively adjust the angular distribution of luminance.

Though in the above-described embodiment the liquid crystal display panel 15 consists of the pair of the polarizing plates 12, 40 and the liquid crystal cell 11 lying between the polarizing plates 12, 40, the liquid crystal display panel 15 may be provided with various functional optical sheets, such as an antireflective film, an anti-glare film, an antistatic film, a hard coating film, etc.

Figure 5:
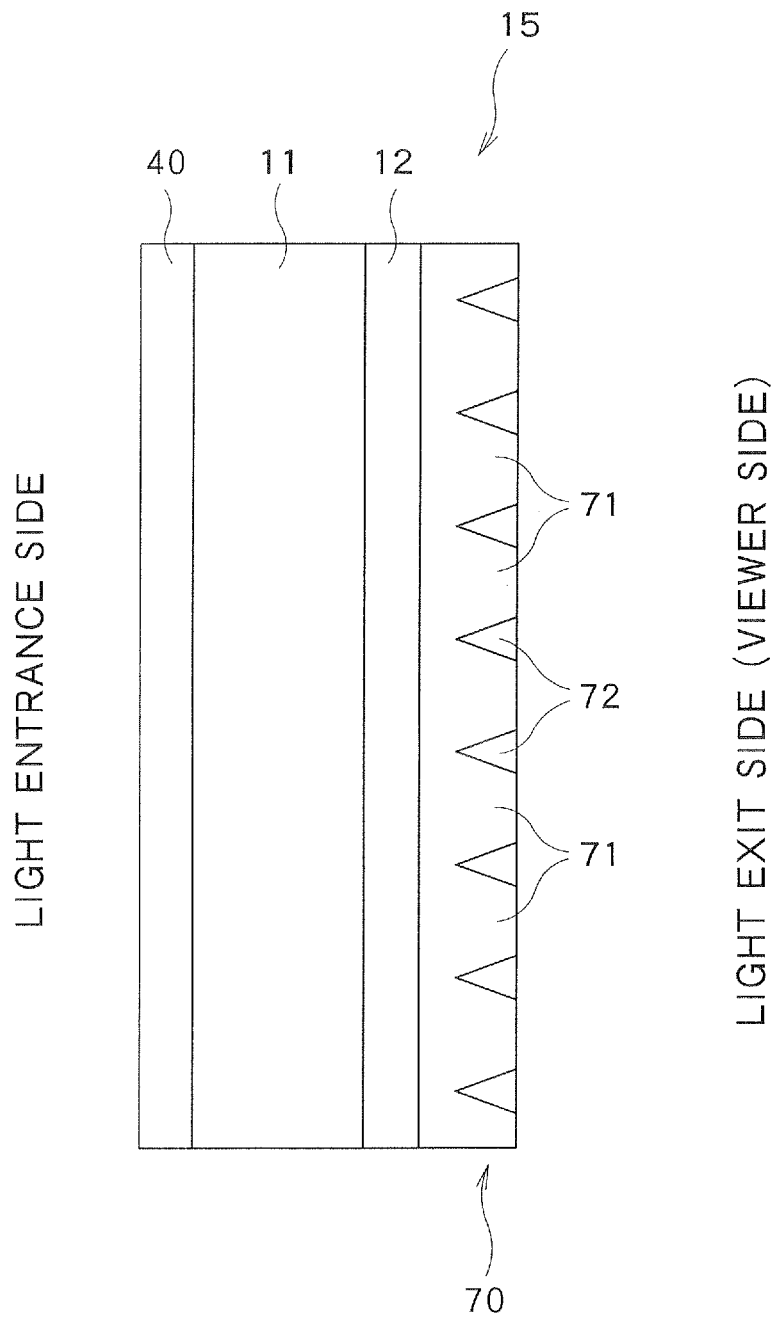
FIG. 5 is a side view of a variation of the liquid crystal display panel.

For instance, FIG. 5 illustrates an embodiment in which the liquid crystal display panel 15 has a surface diffusion sheet 70 disposed on the light exit side of the upper polarizing plate 12. Various sheet-like members having a light diffusing function can be used as a surface diffusion sheet. Examples may include a sheet including a binder resin and light diffusing particles, and a diffusing element containing a diffraction grating, such as a hologram grating.

The surface diffusion sheet 70 illustrated in FIG. 5 is a member having a function that changes the traveling direction of light, and including light transmissive portions (primary portions) 71 and diffusing portions (filling portions) 72. In the shown in FIG. 5, each diffusing portion 72 has a columnar shape and extends in the direction perpendicular to the paper plane of FIG. 5. The light transmissive portions 71 lie on both sides of each diffusing portion 72 and each extend in a columnar shape having a generally-trapezoidal cross-section.

The light transmissive portions 71 mainly function to transmit light. As shown in FIG. 5, each light transmissive portion 71 is disposed such that in the trapezoidal cross-sectional shape, the longer base faces to the light entrance side and the shorter base faces to the light exit side. The light transmissive portions 71 are arranged at predetermined intervals along the panel plane of the liquid crystal display panel 15. Each diffusing portion 72, having a generally-triangular cross-sectional shape, is formed between two adjacent light transmissive portions 71. The material of the light transmissive portions 71 and the material of the diffusing portions 72 have different refractive indices so that the light control member 70 can exert a light diffusing function due to reflection or refraction at the interface between the light transmissive portion 71 and the diffusing portion 72. The cross-sectional shape of the diffusing portion 72 is not limited to a triangular shape, and may be changed into various shapes and, according to the cross-sectional shape of the diffusing portion 72, the cross-sectional shape of the light transmissive portion 71 may be changed from a trapezoidal shape. For example, the diffusing portion 72 may have a trapezoidal shape. Further, the oblique sides of the trapezoidal shape may be changed into polygonal lines or curved lines.

In the above-described embodiments, the light emitter(s) 26 of the light source 25 is disposed just below the polarizing plate 40 including the protective film 50 having a light control function, that is to say, the polarizing plate 40 including the protective film 50 having a light control function is applied in the direct-light type liquid crystal display device 10. However, as shown in FIG. 39, the polarizing plate 40 including the protective film 50 having a light control function may be disposed in a position directly facing a light guide plate 23 which receives light from light emitters 26.

Figure 39:
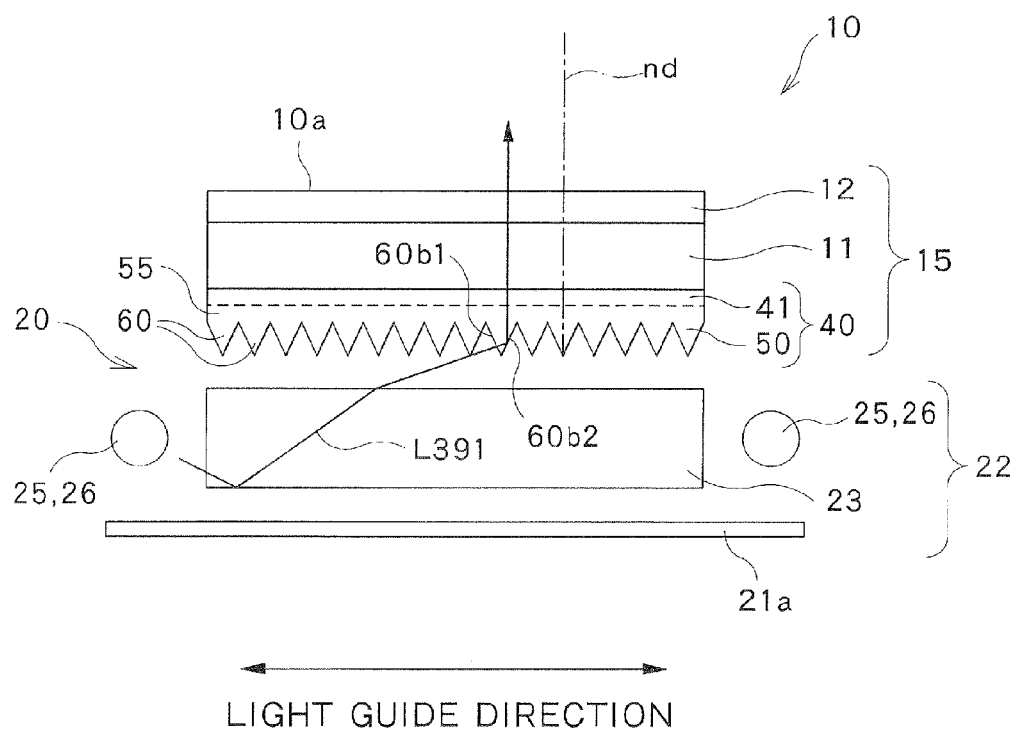
FIG. 39 is a vertical sectional view illustrating yet another variation of the display device and the optical module.

In the embodiment shown in FIG. 39, the polarizing plate 40 is used together with a surface light source device 22 including the light emitters 26 and the light guide plate 23 which receives light from the light emitters 26. The polarizing plate 40 is disposed in a position directly facing the light guide plate 23 of the surface light source device 22. In this embodiment the optical module 20 has the polarizing plate 40, and the light guide plate 23 disposed in a position directly facing the protective film 50 of the polarizing plate 40. In the embodiment shown in FIG. 39, the liquid crystal display panel including the polarizing plate 40 may have the same construction as in the above-described embodiment.

In the embodiment shown in FIG. 39, the surface light source device 22 is configured as a so-called edge-light type backlight (side-light type backlight) including the light guide plate 23, the light emitters 26 disposed on both sides of the light guide plate 23, and a reflective plate (reflective sheet) 21a disposed behind the light guide plate 23. Light from the light emitters 26 of the light source 25 enters the light guide plate 23 through the side surface (light entrance surface), and travels in the light guide plate 23 along the light guide direction while repeating reflection between the pair of the main surfaces of the light guide plate 23. The light guide plate 23 is provided with a not-shown light takeout element such as, for example, white dots provided on the back surface, facing the reflective plate 21a, of the light guide plate 23, or a diffusing component dispersed in the light guide plate 23 so that light traveling in the light guide plate 23 will exit light toward the viewer side in such a manner that the amount of exiting light is approximately uniform along the light guide direction. As shown by light L391 in FIG. 39, light mostly exits the light guide plate 23 in a direction highly inclined from the front direction nd.

The protective film 50 is positioned with respect to the light guide plate 23 such that the arrangement direction of the unit optical elements 60 is parallel to the light guide direction of the light guide plate 23. Further, the unit optical elements 60 project from the protective film 50 toward the light guide plate 23. Light L391, traveling toward the liquid crystal display panel in a direction highly inclined from the front direction nd, enters the protective film 50 through one surface 60b1 of a unit optical element 60, and thereafter is reflected (in particular totally reflected) at the other surface 60b2 of the unit optical element 60 and changes its traveling direction toward the front direction nd. In this manner, the protective film 50 can exert a light condensing function (light collecting function).

Figure 41:
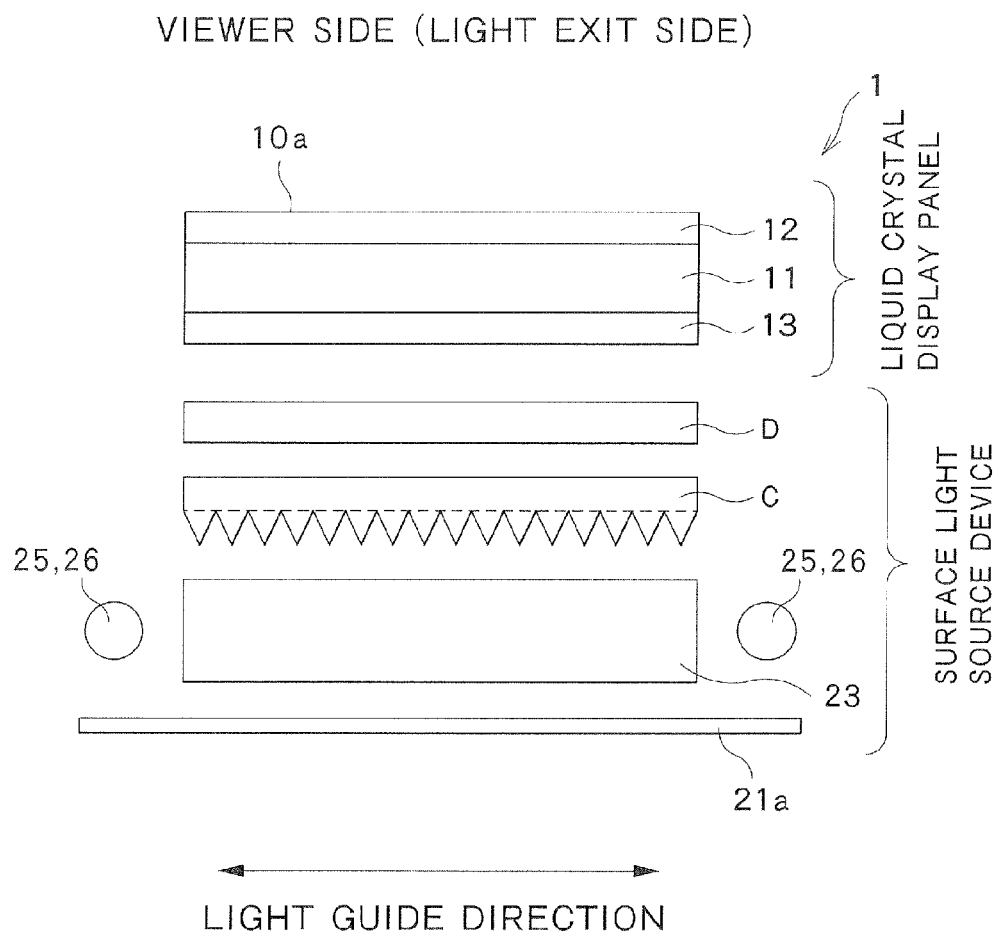
FIG. 41 is a vertical sectional view corresponding to FIG. 39, illustrating a conventional display device.

On the other hand, as shown in FIG. 41, a conventional edge-light type surface light source device, which is used in combination with a liquid crystal display panel including a conventional lower polarizing plate 13, is in most cases provided with a condensing sheet (prism sheet, reflective prism sheet, inverted prism sheet) C disposed on the light exit side of the light guide plate 23. By designing the protective film 50 to have the same light condensing function as the condensing sheet (reflective prism sheet, inverted prism sheet) C of the conventional surface light source device shown in FIG. 41, it becomes possible to eliminate the light condensing sheet C from the surface light source device while maintaining the optical characteristics of the overall display device 1. The conventional surface light source device shown in FIG. 41 is also provided with a light diffusing sheet D disposed on the light exit side of the light condensing sheet C. By adjusting the degree of the light diffusing function of the protective film 50, attributable to the diffusing component 59b, it becomes possible to also eliminate the light diffusing sheet D as well. Thus, the embodiment shown in FIG. 39 can achieve the same advantageous effects as the above-described embodiment.

The same reference numerals as used for the above-described display devices are used to indicate the same elements or members of the conventional display device 1 shown in FIG. 41, and a duplicate description thereof is omitted.

The above-described modifications may also be made in an appropriate combination to the above-described embodiments.

EXPERIMENTAL EXAMPLES

Experiments were conducted to evaluate the effects of the display device 10, the optical module 20, the polarizing plate 40 and the protective film 50 which have been described hereinabove. The particulars of the experiments are as follows.

[Research 1]

An angular distribution of luminance was simulated for an optical module in which a protective film according to the above-described embodiment, having a light condensing function and a light diffusing function, is joined to a polarizer, and for an optical sheet which uses a light diffusing sheet and a light condensing sheet both as a separate member not joined to a polarizer. LightTools, available from Synopsys, Inc., the United States, was used as simulation soft wafer.

Figure 42:
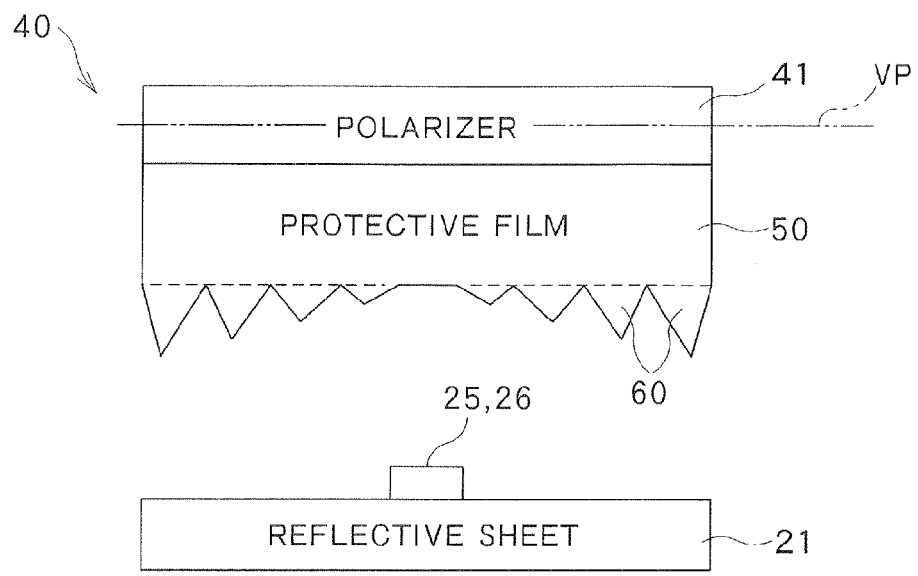
FIG. 42 is a schematic diagram showing the construction of a model 1 as a simulation object.
Figure 43:
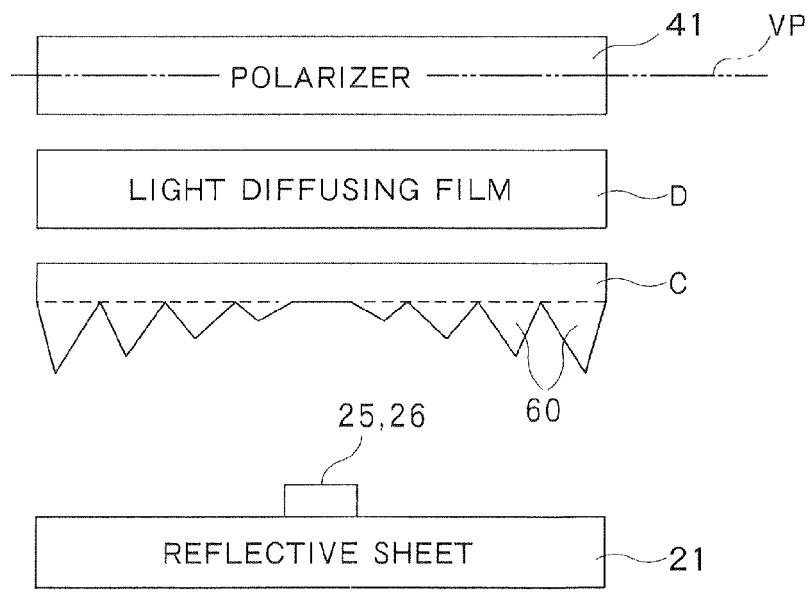
FIG. 43 is a schematic diagram showing the construction of a model 2 as a simulation object.
Figure 44:
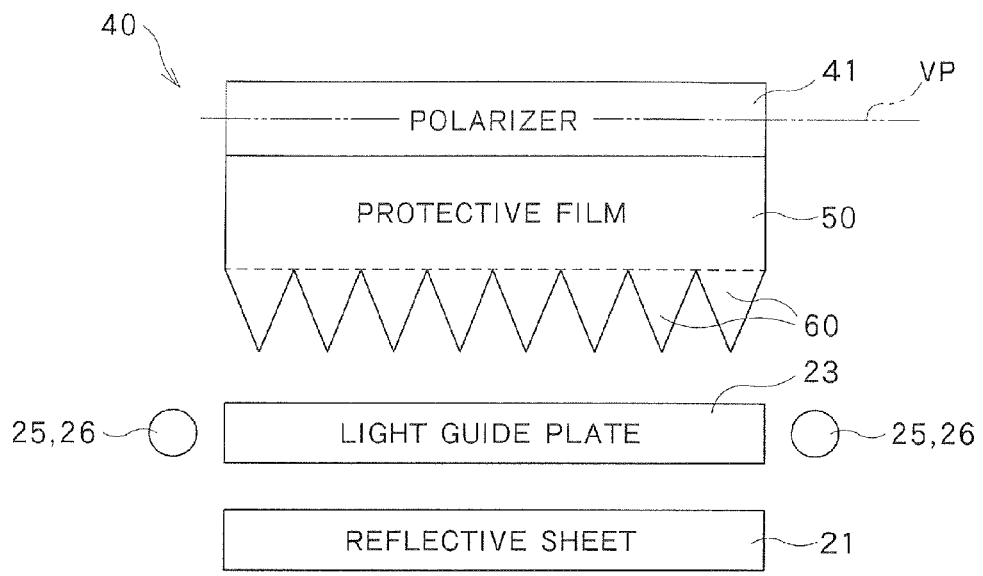
FIG. 44 is a schematic diagram showing the construction of a model 3 as a simulation object.
Figure 45:
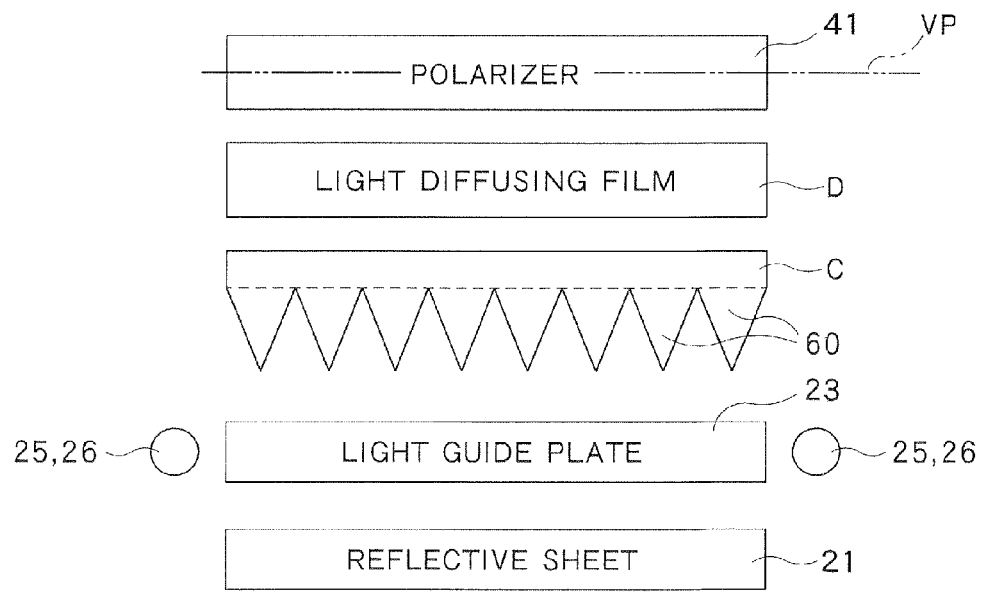
FIG. 45 is a schematic diagram showing the construction of a model 4 as a simulation object.

The direct-light type optical modules shown in FIGS. 42 and 43, referred to as models 1 and 2, respectively, and the edge-light type optical modules shown in FIGS. 44 and 45, referred to as models 3 and 4, respectively, were set as simulation objects. The models 1 to 4 were designed to have a suitable size for incorporation into a 32-inch (700 mm×400 mm) liquid crystal display device.

The model 1 shown in FIG. 42 consisted of a polarizer 41, a protective film 50 bonded to the polarizer 41, a light source 25 disposed in a position directly facing the protective film 50, and a reflective plate 21 disposed behind the light source 25. The model 2 shown in FIG. 43 consisted of a polarizer 41, a light diffusing film D disposed in a position facing the polarizer 41, a light condensing sheet C disposed in a position facing the light diffusing film D, a light source 25 disposed in a position directly facing the light condensing sheet C, and a reflective plate 21 disposed behind the light source 25. The model 3 shown in FIG. 44 consisted of a polarizer 41, a protective film 50 bonded to the polarizer 41, a light guide plate 23 disposed in a position directly facing the protective film 50, a reflective plate 21 disposed behind the light guide plate 23, and a light source 25 disposed lateral to the light guide plate 23. The model 4 shown in FIG. 45 consisted of a polarizer 41, a light diffusing film D disposed in a position facing the polarizer 41, a light condensing sheet C disposed in a position facing the light diffusing film D, a light guide plate 23 disposed in a position facing the light condensing sheet C, a reflective plate 21 disposed behind the light guide plate 23, and a light source 25 disposed lateral to the light guide plate 23.

The reflective plates 21 and the polarizers 41 were the same among the models 1 to 4. The light sources 25 of the models 1 and 2 had the same construction and each included 30 LEDs 26 linearly arranged on the reflective plate 21. The 30 LEDs were arranged at approximately equal intervals over a length of 700 mm. The light sources 25 of the models 3 and 4 had the same construction and each included LEDs 26 linearly arranged on both sides of the light guide plate 23. 30 LEDs 26 were arranged on each side of the light guide plate 23 at approximately equal intervals over a length of 700 mm. The total amount of light emitted was set equal among the models 1 to 4.

As with the protective film 50 shown in FIGS. 2 and 3, the protective films 50 of the models 1 and 3 each consisted of a resin layer 51b including unit optical elements 60, and a light diffusing layer 51a disposed on the light exit side. The unit optical elements 60 of the protective film 50 of the model 1 and the unit optical elements 60 of the light condensing sheet C of the model 2 had the same construction and both formed a linear Fresnel lens. The unit optical elements 60 of the protective film 50 of the model 3 and the unit optical elements 60 of the light condensing sheet C of the model 4 had the same construction and were both prisms having a triangular cross-sectional shape and linearly extending in a direction perpendicular to the arrangement direction of the prisms.

Figure 54:
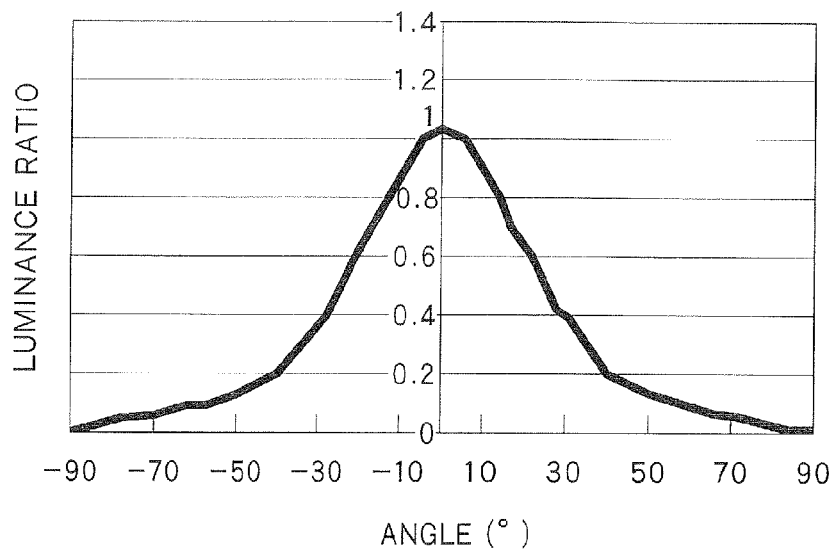
Figure 55:
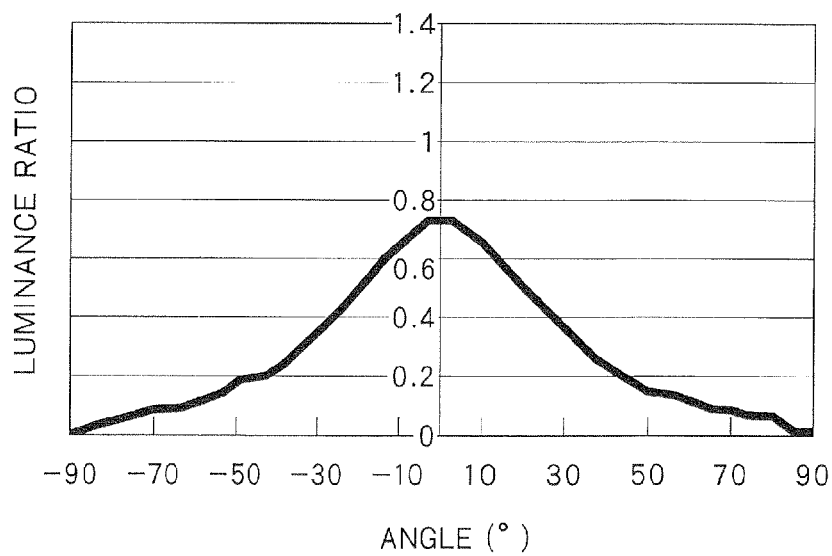
FIG. 55 is a diagram illustrating the light diffusing properties of the light diffusing film b, being a graph showing the angular distribution of luminance as measured on the light exit surface of the light diffusing film b when parallel light rays, traveling in the front direction, enter the light diffusing film b.

For each of the models 1 to 4, the angular distribution of luminance attributable to light that was passing through the polarizer, i.e. the angular distribution of luminance on a virtual plane VP within the polarizer, was simulated. The angular distribution of luminance was obtained by simulating the luminance in varying directions in a plane parallel to both the arrangement direction of the unit optical elements and the front direction. The simulation of the angular distribution of luminance for each model was conducted in the case of incorporating a light diffusing film a having the light diffusing properties shown in FIG. 54 and in the case of incorporating a light diffusing film b having the light diffusing properties shown in FIG. 55. The graphs of FIGS. 54 and 55 each show the angular distribution of luminance on one surface of the film, when parallel light rays traveling in the normal direction enter the film from the other surface.

Figure 46:
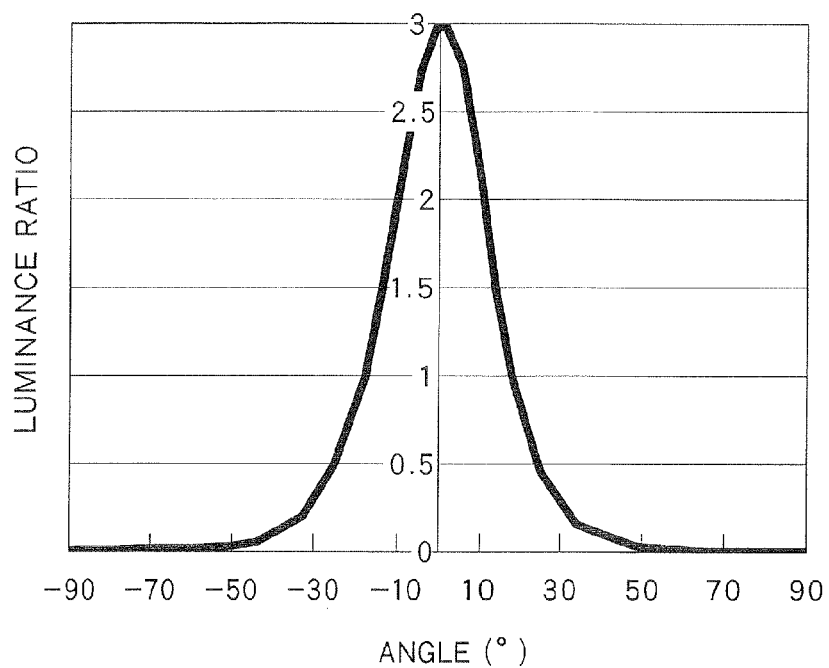
Figure 47:
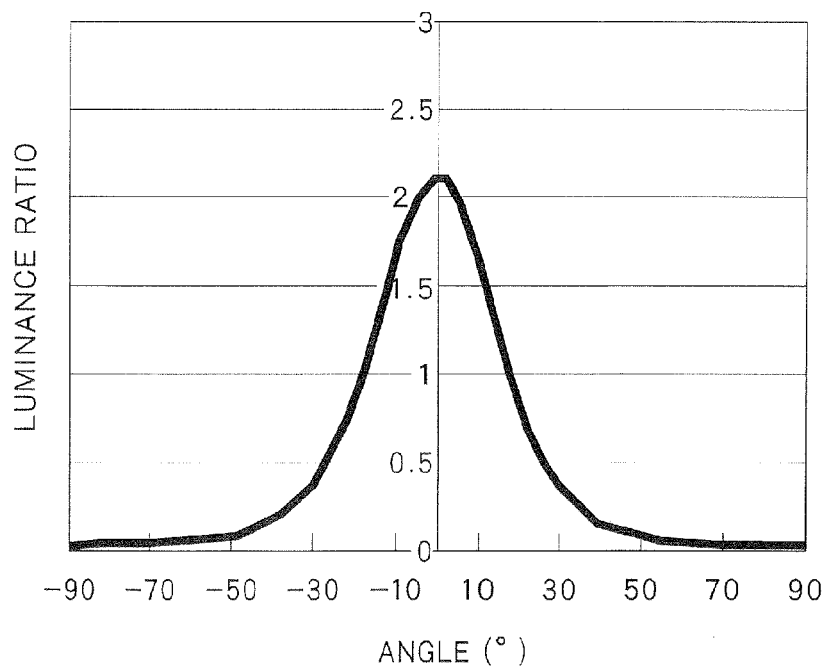
FIG. 47 is a diagram showing the results of a simulation of the angular distribution of luminance, conducted on a model 1 using a light diffusing film b.
Figure 48:
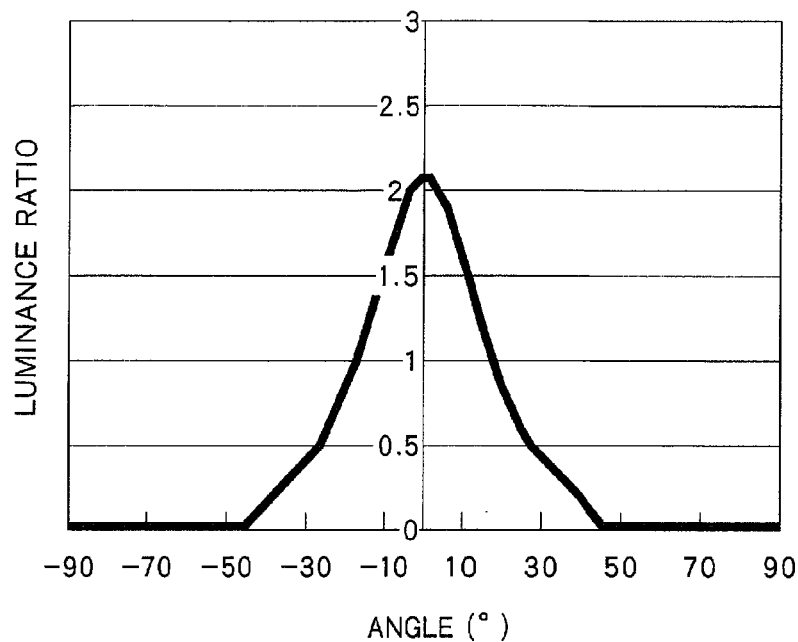
Figure 49:
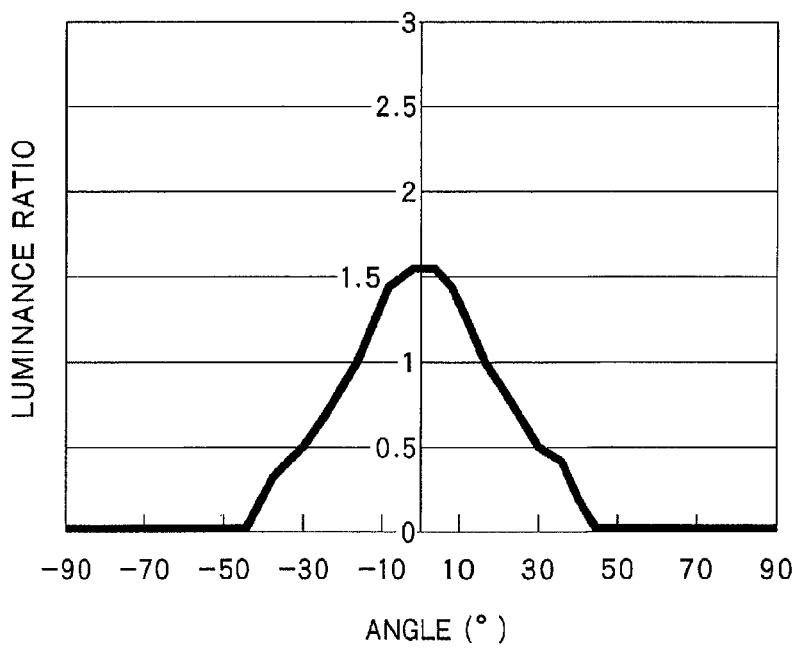
FIG. 49 is a diagram showing the results of a simulation of the angular distribution of luminance, conducted on a model 2 using a light diffusing film b.

The angular distributions of luminance shown in FIGS. 46 and 47 show the simulation results for the model 1 in the case of using the light diffusing film a and in the case of using the light diffusing film b, respectively. The angular distributions of luminance shown in FIGS. 48 and 49 show the simulation results for the model 2 in the case of using the light diffusing film a and in the case of using the light diffusing film b, respectively. There is no significant difference in the half-value angle in the angular distribution of luminance between the model 1 and the model 2, whereas the front direction luminance of the model 1 is considerably higher than the front direction luminance of the model 2. The simulation results indicate that the model 1 uses light, emitted by the light source, more efficiently than the model 2.

Figure 50:
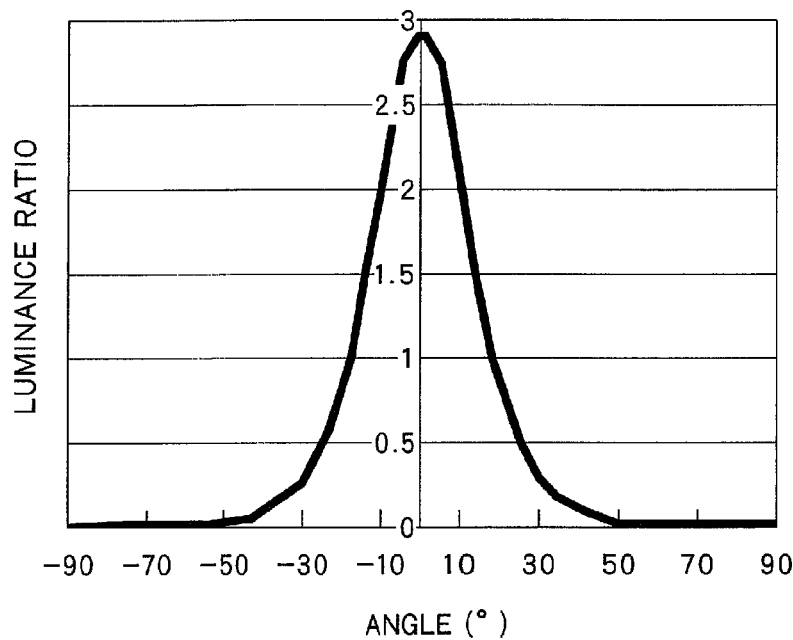
Figure 51:
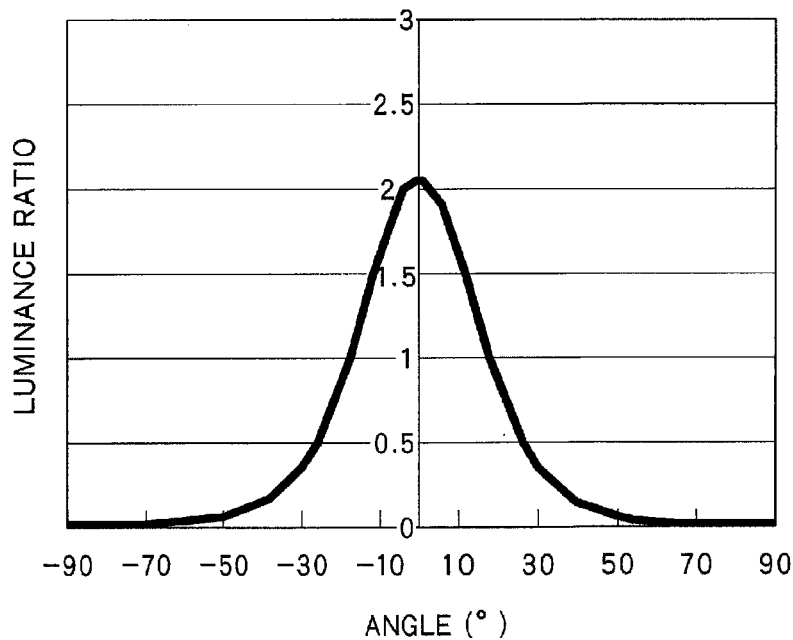
FIG. 51 is a diagram showing the results of a simulation of the angular distribution of luminance, conducted on a model 3 using a light diffusing film b.
Figure 52:
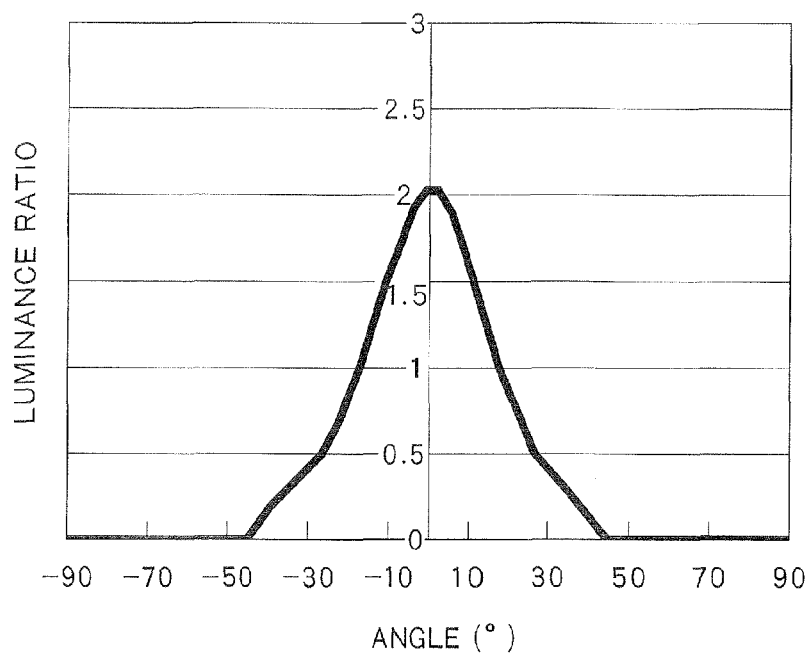
Figure 53:
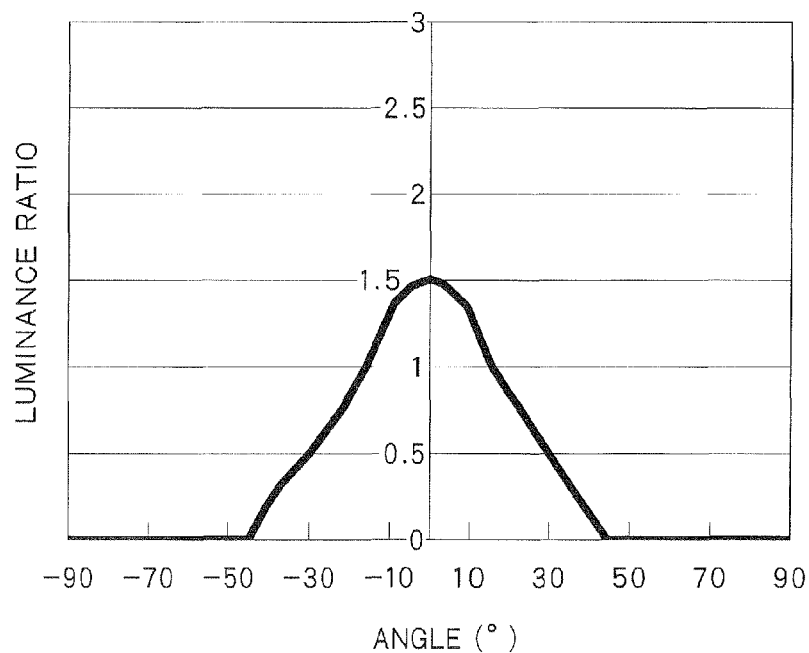
FIG. 53 is a diagram showing the results of a simulation of the angular distribution of luminance, conducted on a model 4 using a light diffusing film b.

The angular distributions of luminance shown in FIGS. 50 and 51 show the simulation results for the model 3 in the case of using the light diffusing film a and in the case of using the light diffusing film b, respectively. The angular distributions of luminance shown in FIGS. 52 and 53 show the simulation results for the model 4 in the case of using the light diffusing film a and in the case of using the light diffusing film b, respectively. There is no significant difference in the half-value angle in the angular distribution of luminance between the model 3 and the model 4, whereas the front direction luminance of the model 3 is considerably higher than the front direction luminance of the model 4. The simulation results indicate that the model 3 uses light, emitted by the light source, more efficiently than the model 4.

In the luminance distribution graphs of FIGS. 46 through 53, the ordinate represents luminance ratio to a reference value common to all the simulation tests.

[Research 2]

A display device having the constriction shown in FIG. 1 was produced as a display device of Example 1. Further, display devices, each having the constriction shown in FIG. 40, were produced as display devices of Comparative Examples 1 to 3. Each display device was produced using a commercially-available 32-inch (706 mm×398 mm) liquid crystal display device (liquid crystal television). In particular, as the chassis of each display device, a liquid crystal display panel incorporated in the chassis, a reflective plate incorporated in the chassis, and LED light emitters two-dimensionally arranged on the reflective plate were used corresponding members incorporated in the commercially-available liquid crystal display device. In the display device of Example 1, a protective film, which was an extrudate of a polycarbonate resin in which light diffusing particles as a light diffusing component are dispersed, was bonded to the liquid crystal display panel. In the display devices of Comp. Examples 1 to 3, on the other hand, a diffusion plate A, a lower diffusion sheet B and an upper diffusion sheet D, which had been incorporated in the commercially-available 32-inch liquid crystal display device, and a light condensing sheet C, which had been produced by extrusion of a thermoplastic resin, were incorporated into each display device in the arrangement shown in FIG. 40. The display devices of Comp. Examples 1 to 3 only differed in the resin material used for the light condensing sheet and were otherwise the same. The unit optical elements of the protective film incorporated in the display device of Example 1 had the same construction as the unit optical elements of the light condensing sheet C incorporated in the display devices of Comp. Examples 1 to 3. The light condensing sheet C of the display device of Comp. Example 2 was produced by using the same polycarbonate resin as the protective film of Example 1. The light condensing sheet C of the display device of Comp. Example 1 was produced by using a urethane acrylate resin having a lower restorability (higher hardness) than the polycarbonate resin used in Comp. Example 2. The light condensing sheet C of the display device of Comp. Example 3 was produced by using a caprolactone-containing urethane acrylate resin having a higher restorability (lower hardness) than the polycarbonate resin used in Comp. Example 2.

The following vibration test was conducted on the display devices: Each display device was placed on a horizontal vibrating table of a vibration tester (BF-50UL, Idex Co., Ltd.). The display device was fixed to the vibrating table with a fixing band so that the display device would not move during the actuation of the vibration tester. The display device was then subjected to simultaneous three-axis vibrations in the vertical and horizontal directions at a vibration acceleration of 7.3 G and a vibration frequency of 67 Hz for 30 minutes. For the unit optical elements of the protective film of the display device of Example 1 after the vibration test and for the unit optical elements of the light condensing sheet C of the display devices of Comp. Examples 1 to 3 after the vibration test, a visual observation was conducted to determine if there is any optical adhesion between the unit optical elements and the adjacent member. Furthermore, the surface state of the unit optical elements was observed under a microscope at 500-fold magnification to check the presence or absence of a scratch. The observation results are shown in FIG. 3.

TABLE 3

Display devices and evaluation results

|  |  | Example 1 | Comp. Ex. 1 | Comp. Ex. 2 | Comp. Ex. 3 |
|---|---|---|---|---|---|
| Construction of display device | | FIG. 1 | FIG. 40 | FIG. 40 | FIG. 40 |
| Restorability of unit optical elements | | Intermediate | Low | Intermediate | High |
| Evaluation | Optical adhesion | None | None | None | Observed |
| | Scratch | None | Observed | Observed | None |
| | Overall evaluation | Good | Poor | Poor | Poor |

The invention claimed is:

1. An optical module comprising:
a polarizing plate including a polarizer and a protective film joined to the polarizer, the protective film having a light control function that changes a traveling direction of light; and
a light emitter disposed in a position directly facing the protective film of the polarizing plate,
wherein the protective film has a light diffusing layer including a matrix of a resin material and a diffusing component dispersed in the matrix, and a resin layer containing no diffusing component,
wherein the protective film has unit optical elements which form a surface of the protective film opposite to a side facing the polarizer, and
wherein the unit optical elements are contained in the resin layer.

2. The optical module according to claim 1,
wherein the refractive index of the diffusing component is lower than the refractive index of the matrix.

3. The optical module according to claim 1,
wherein the unit optical elements are arranged in an arrangement direction; and
wherein each unit optical element extends in a direction, the direction intersecting the arrangement direction of the unit optical elements and being parallel to the film plane of the protective film.

4. The optical module according to claim 1,
wherein the protective film has unit optical elements which form a surface of the protective film facing light emitters and are arranged in an arrangement direction;
wherein each unit optical element extends in a direction, the direction intersecting the arrangement direction of the unit optical elements and being parallel to the film plane of the protective film; and
when viewed in a direction parallel to a normal direction of a plate plane of the polarizing plate, the unit optical elements are arranged in a direction parallel to an arrangement direction of the light emitters.

5. The optical module according to claim 1,
wherein the polarizing plate further includes an adhesive layer disposed between the protective film and the polarizer.

6. The optical module according to claim 5,
wherein the adhesive layer includes an adhesive and a diffusing component dispersed in the adhesive.

7. The optical module according to claim 1,
wherein the light source includes a single linear light emitting part composed of a single linearly-extending light emitter, or a single linear light emitting part composed of point-like light emitters arranged linearly.

8. The optical module according to claim 1,
wherein two-dimensionally arranged light emitters are provided in positions directly facing the protective film of the polarizing plate.

9. The optical module according to claim 1,
wherein the protective film has a plurality of unit optical elements which form a surface of the protective film facing the light emitters;
the unit optical elements are two-dimensionally arranged and constitute a fly's eye lens;
the light emitters are arranged in a first arrangement direction and are also arranged in a second arrangement direction intersecting the first arrangement direction; and
when viewed in a direction parallel to a normal direction of a plate plane of the polarizing plate, the unit optical elements are arranged in a direction parallel to the first arrangement direction of the light emitters and are also arranged in a direction parallel to the second arrangement direction of the light emitters.

10. A display device comprising the optical module according to claim 1.

11. An optical module comprising:
a polarizing plate including a polarizer and a protective film joined to the polarizer, the protective film having a light control function that changes a traveling direction of light; and
a light guide plate which receives light from a light emitter and which is disposed in a position directly facing the protective film of the polarizing plate,
wherein the protective film has a light diffusing layer including a matrix of a resin material and a diffusing component dispersed in the matrix, and a resin layer containing no diffusing component,
wherein the protective film has unit optical elements which form a surface of the protective film opposite to a side facing the polarizer, and
wherein the unit optical elements are contained in the resin layer.

12. An optical module comprising:
a polarizing plate including a polarizer and a protective film joined to the polarizer, the protective film having a light control function that changes a traveling direction of light; and
a light emitter disposed in a position deviated, in a direction parallel to a film plane of the protective film, from an area directly facing the protective film of the polarizing plate,
wherein the light emitter and the polarizing plate are positioned such that light emitted by the light emitter can directly enter the protective film of the polarizing plate, or light emitted by the light emitter, after undergoing a change in the traveling direction by a reflective plate, can enter the protective film of the polarizing plate, or light emitted by the light emitter can directly enter the protective film of the polarizing plate and light emitted by the light emitter, after undergoing a change in the traveling direction by a reflective plate, can enter the protective film of the polarizing plate, wherein the protective film has a light diffusing layer including a matrix of a resin material and a diffusing component dispersed in the matrix, and a resin layer containing no diffusing component, wherein the protective film has unit optical elements which form a surface of the protective film opposite to a side facing the polarizer, and wherein the unit optical elements are contained in the resin layer.

* * * * *